(12) United States Patent
Bloodworth et al.

(10) Patent No.: US 8,186,747 B2
(45) Date of Patent: May 29, 2012

(54) MODULAR COMPOSITE STRUCTURAL COMPONENT AND STRUCTURES FORMED THEREWITH

(75) Inventors: Jeff Bloodworth, Cary, NC (US); Lincoln Grant Godwin, Raleigh, NC (US); Paul Willard Peterson, Jr., Apex, NC (US); Joseph Anthony Seiter, Raleigh, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 347 days.

(21) Appl. No.: 12/177,639

(22) Filed: Jul. 22, 2008

(65) Prior Publication Data

US 2010/0019536 A1   Jan. 28, 2010

(51) Int. Cl.
*B62D 25/20* (2006.01)

(52) U.S. Cl. ............... 296/181.1; 296/184.1; 280/149.1; 180/209

(58) Field of Classification Search ............... 296/181.3, 296/181.2, 182.1, 203.02, 184.1, 181.1; 410/313, 410/130; 180/209; 280/149.1, 149.2
See application file for complete search history.

(56) References Cited

U.S. PATENT DOCUMENTS

| 4,003,728 | A |   | 1/1977  | Rath           |          |
|-----------|---|---|---------|----------------|----------|
| 4,358,233 | A |   | 11/1982 | Morris et al.  |          |
| 4,403,804 | A | * | 9/1983  | Mountz et al.  | 296/181.5|
| 4,505,126 | A |   | 3/1985  | Jones et al.   |          |
| 4,553,403 | A |   | 11/1985 | Taylor         |          |
| 4,726,196 | A |   | 2/1988  | Zajic          |          |
| 4,957,521 | A |   | 9/1990  | Cullen et al.  |          |
| 5,161,848 | A |   | 11/1992 | Lutton         |          |
| 5,403,062 | A |   | 4/1995  | Sjostedt et al.|          |
| 5,794,402 | A |   | 8/1998  | Dumlao et al.  |          |
| 5,807,046 | A |   | 9/1998  | Onken          |          |
| 5,890,435 | A |   | 4/1999  | Thoman et al.  |          |
| 5,947,812 | A |   | 9/1999  | Henning et al. |          |
| 5,979,684 | A | * | 11/1999 | Ohnishi et al. | 220/1.5  |
| 5,992,117 | A |   | 11/1999 | Schmidt        |          |
| 6,023,806 | A |   | 2/2000  | Dumlao et al.  |          |
| 6,044,607 | A |   | 4/2000  | Dumlao et al.  |          |
| 6,076,693 | A | * | 6/2000  | Reiter et al.  | 220/9.1  |
| 6,089,639 | A |   | 7/2000  | Wojnowski      |          |
| 6,108,998 | A |   | 8/2000  | Dumlao         |          |
| 6,299,246 | B1|   | 10/2001 | Tomka          |          |
| 6,364,388 | B1|   | 4/2002  | Ziegler et al. |          |
| 6,422,642 | B1|   | 7/2002  | Grimm et al.   |          |
| 6,431,549 | B1| * | 8/2002  | Hill et al.    | 277/316  |
| 6,439,649 | B1|   | 8/2002  | Lorenzo et al. |          |
| 6,467,118 | B2|   | 10/2002 | Dumlao et al.  |          |
| 6,505,883 | B1|   | 1/2003  | Ehrlich        |          |

(Continued)

*Primary Examiner* — Glenn Dayoan
*Assistant Examiner* — Pinel Romain
(74) *Attorney, Agent, or Firm* — Nelson Mullins Riley & Scarborough LLP

(57) ABSTRACT

The present invention provides an integrated composite floor unit and front wall assembly that can be used in a variety of structures. The integrated composite floor unit and front wall assembly is formed of a floor unit having a front portion and a front wall integrally formed with and rising up from the front portion of the floor unit. The assembly can include other structural features and may be easily combined with a number of further structural components to form a structure. In specific embodiments, the assembly forms part of a modular trailer. In particular, the trailer can be formed of the composite assembly, a composite roof, composite side walls, and a composite rear frame. Such composite trailers advantageously provide a storage volume approximately equal to or greater than conventional trailers but are lighter in weight, thus allowing for storage and/or hauling of a greater weight of cargo than in conventional trailers.

49 Claims, 33 Drawing Sheets

U.S. PATENT DOCUMENTS

| | | |
|---|---|---|
| 6,543,827 B2 | 4/2003 | Miller |
| 6,554,342 B1 | 4/2003 | Burnett |
| 6,645,333 B2 | 11/2003 | Johnson et al. |
| 6,676,785 B2 | 1/2004 | Johnson et al. |
| 6,702,365 B2 | 3/2004 | Semple et al. |
| 6,745,470 B2 | 6/2004 | Foster et al. |
| 6,814,397 B2 | 11/2004 | Henderson et al. |
| 6,832,809 B2 * | 12/2004 | Wang et al. ............ 296/186.5 |
| 6,843,525 B2 | 1/2005 | Preisler |
| 6,871,904 B2 | 3/2005 | Bhat et al. |
| 6,893,076 B1 | 5/2005 | Lewis |
| 6,902,228 B2 | 6/2005 | Kikuchi |
| 6,945,591 B2 | 9/2005 | Durand |
| 6,945,865 B1 | 9/2005 | Turek |
| 7,055,892 B2 * | 6/2006 | Buchholz et al. ......... 296/186.1 |
| 7,152,911 B1 | 12/2006 | McNulty et al. |
| 7,322,640 B2 | 1/2008 | Ni et al. |
| 2002/0148196 A1 | 10/2002 | Barry et al. |
| 2005/0194381 A1 | 9/2005 | Zupancich et al. |
| 2006/0043771 A1 | 3/2006 | Ehrlich |
| 2006/0121244 A1 | 6/2006 | Godwin et al. |
| 2006/0123725 A1 | 6/2006 | Godwin |
| 2006/0201081 A1 | 9/2006 | Godwin |
| 2007/0024017 A1 * | 2/2007 | Ramsey ................... 280/149.2 |
| 2007/0069500 A1 * | 3/2007 | Bloodworth et al. ......... 280/433 |
| 2007/0095092 A1 | 5/2007 | Wuerfel, III |
| 2007/0216197 A1 | 9/2007 | Wuerfel, III |

* cited by examiner

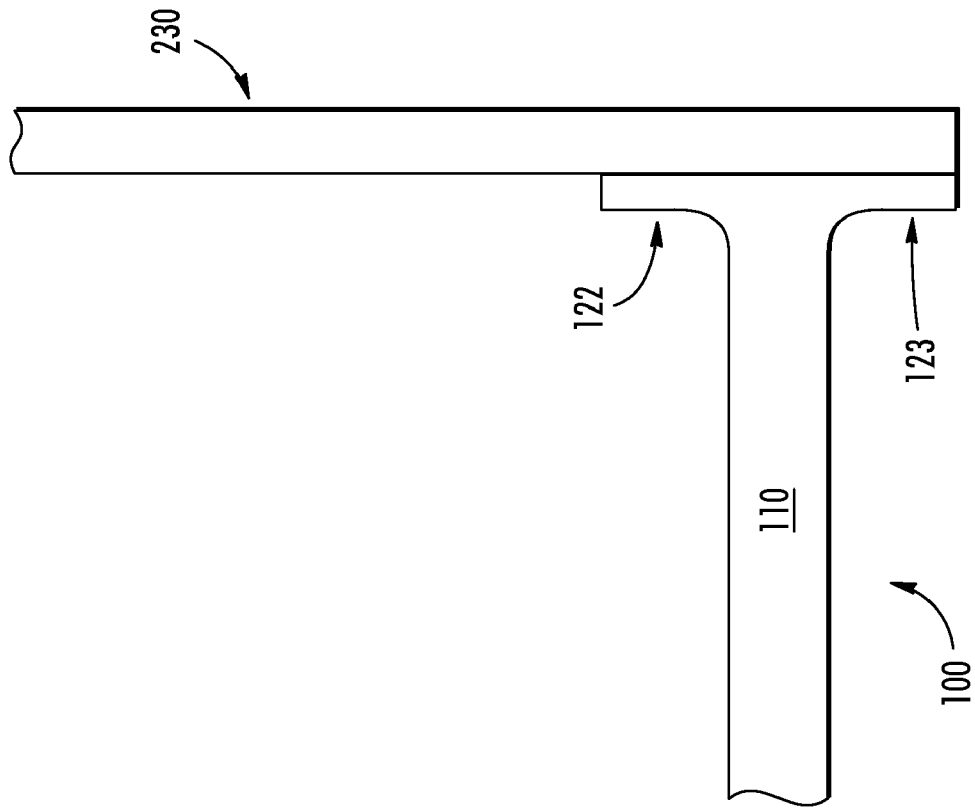
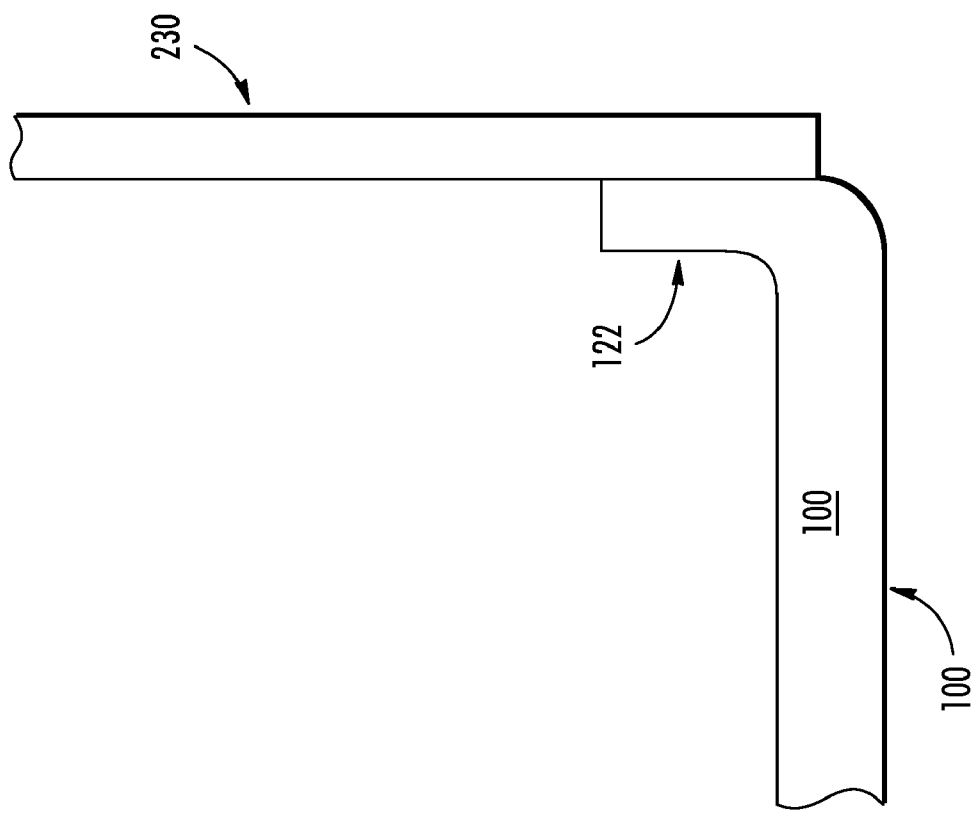

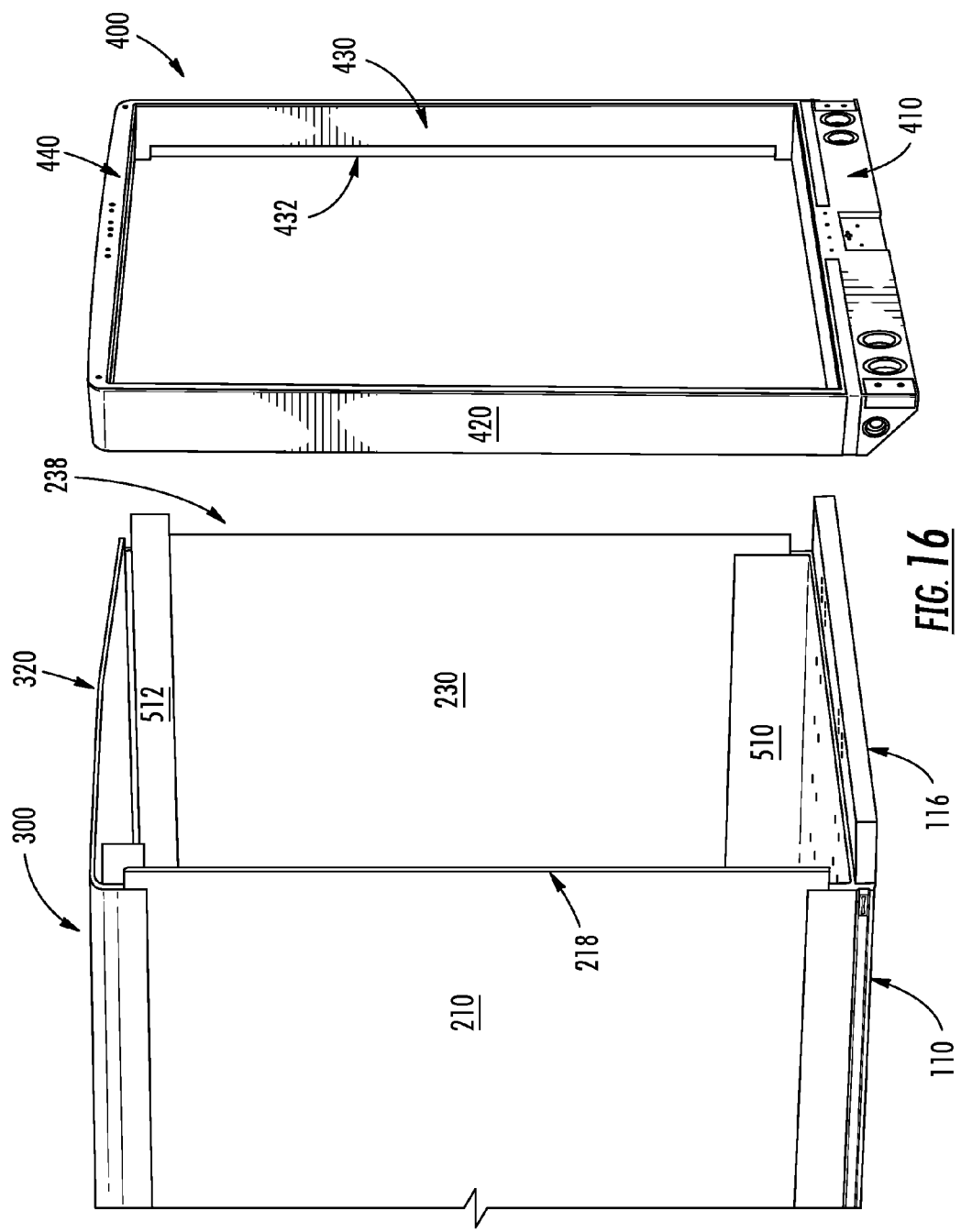

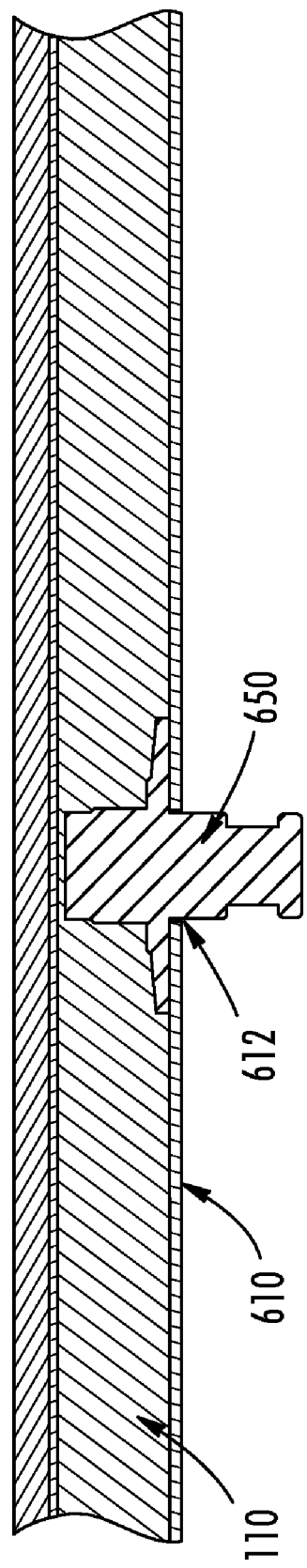

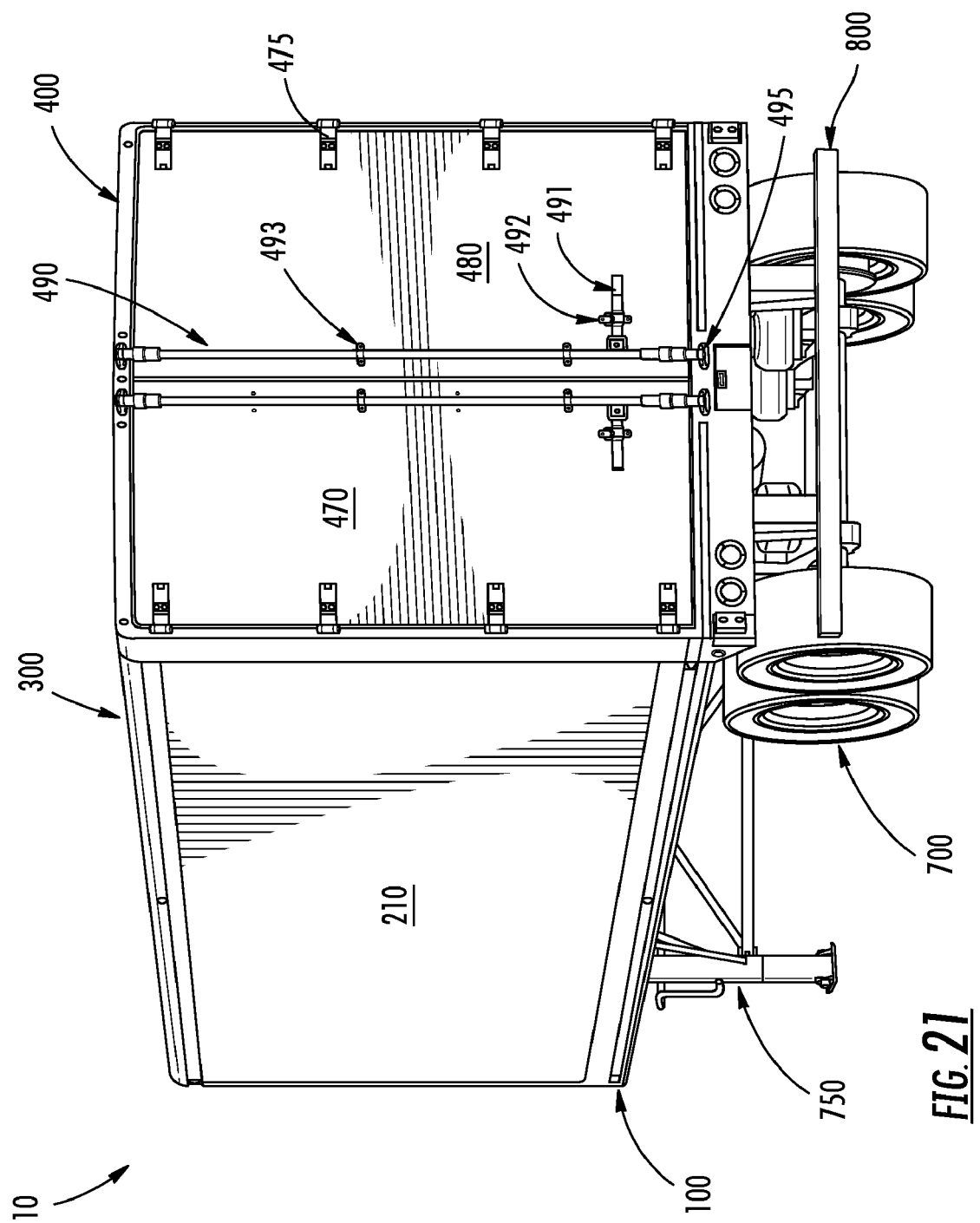

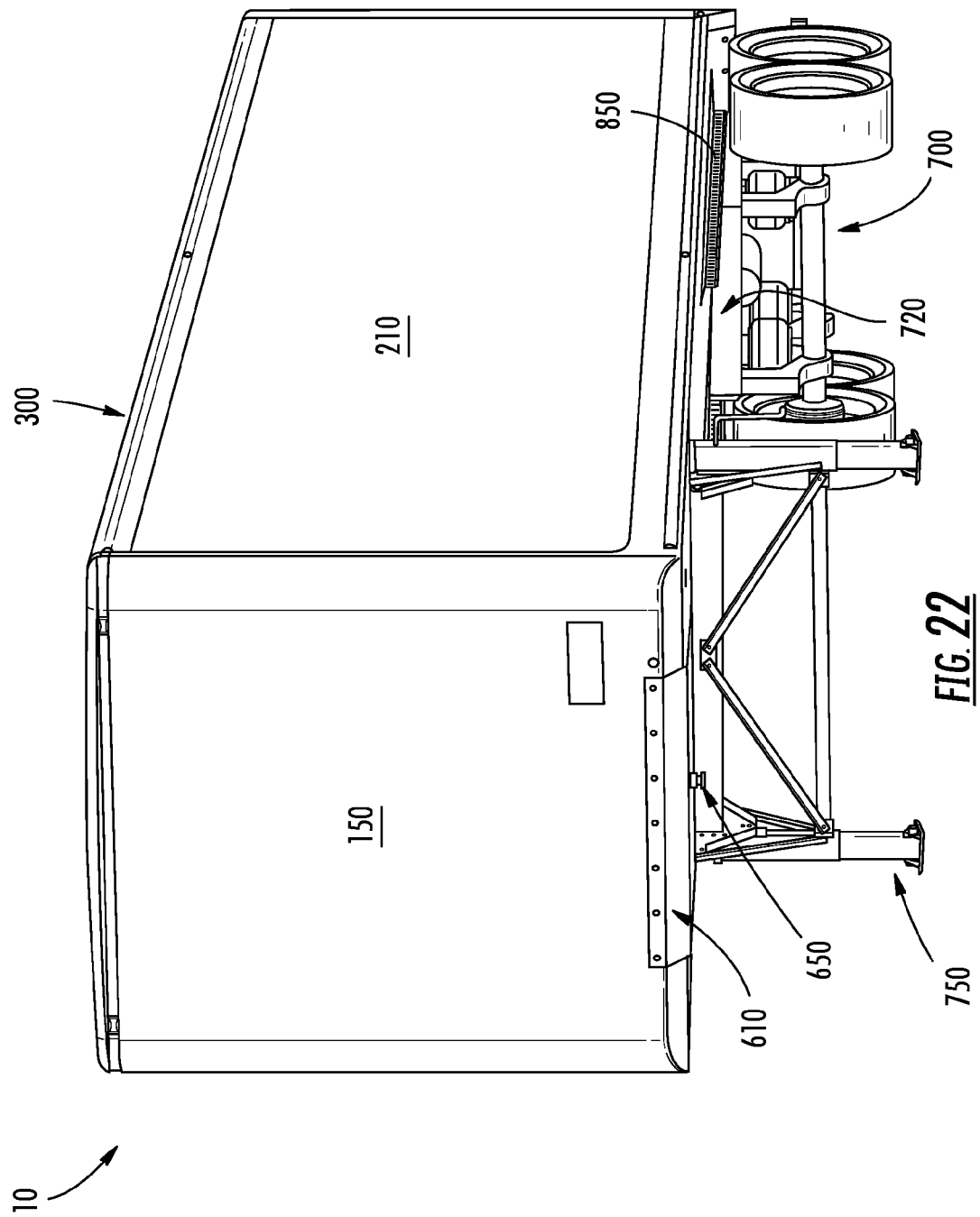

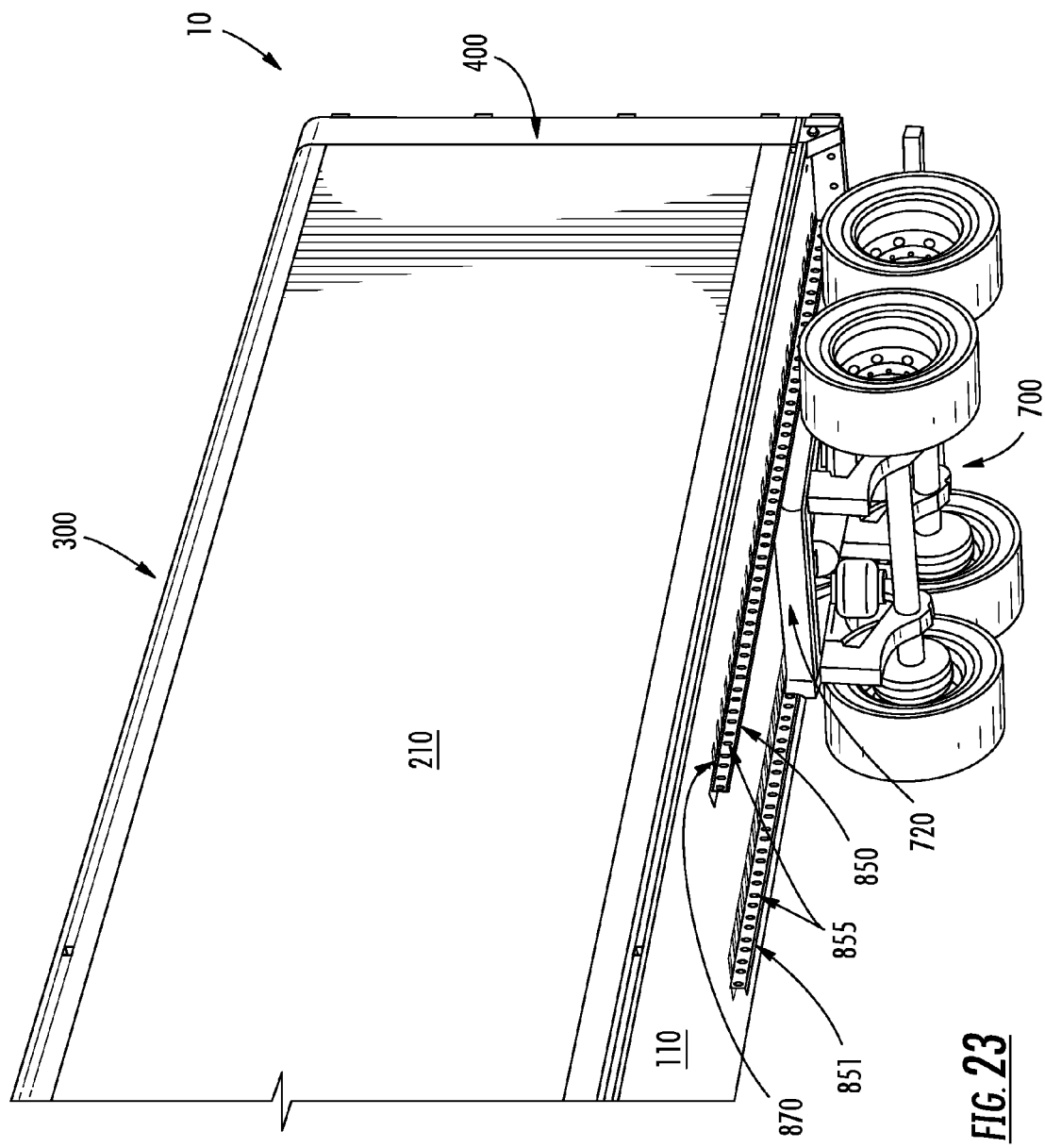

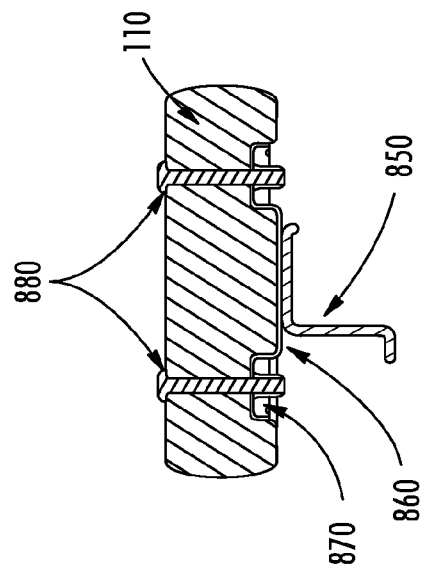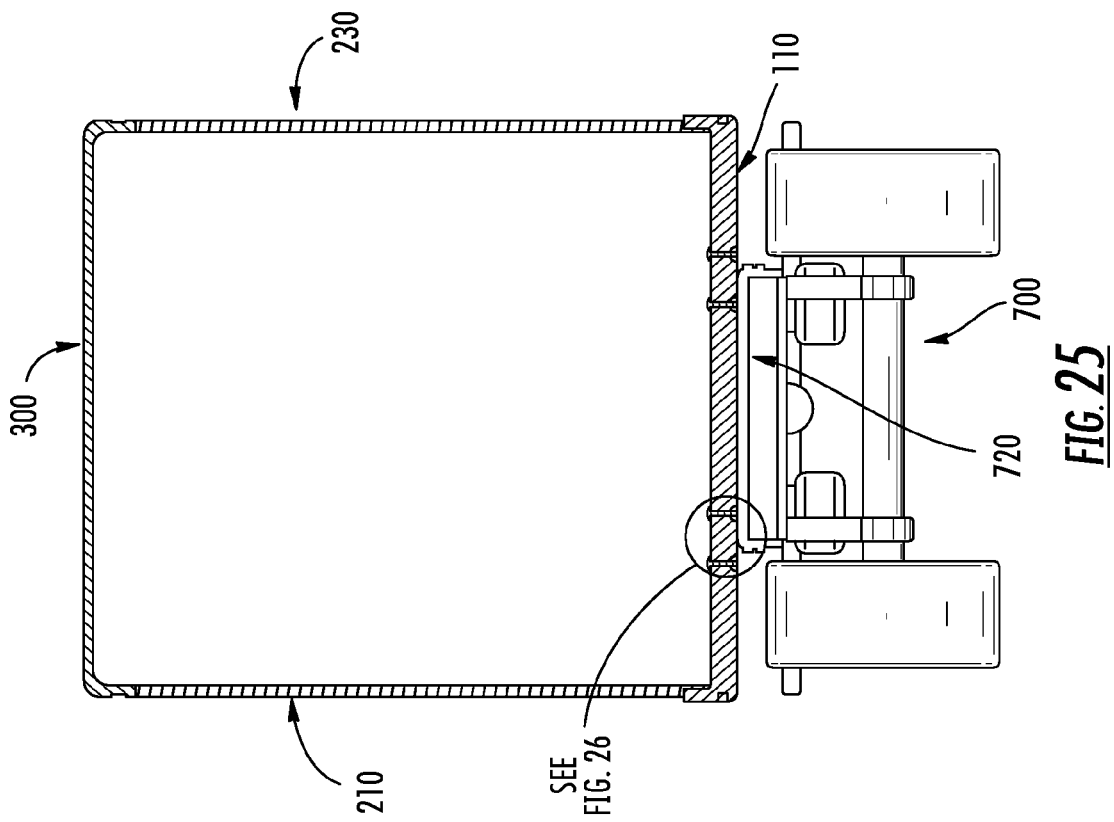

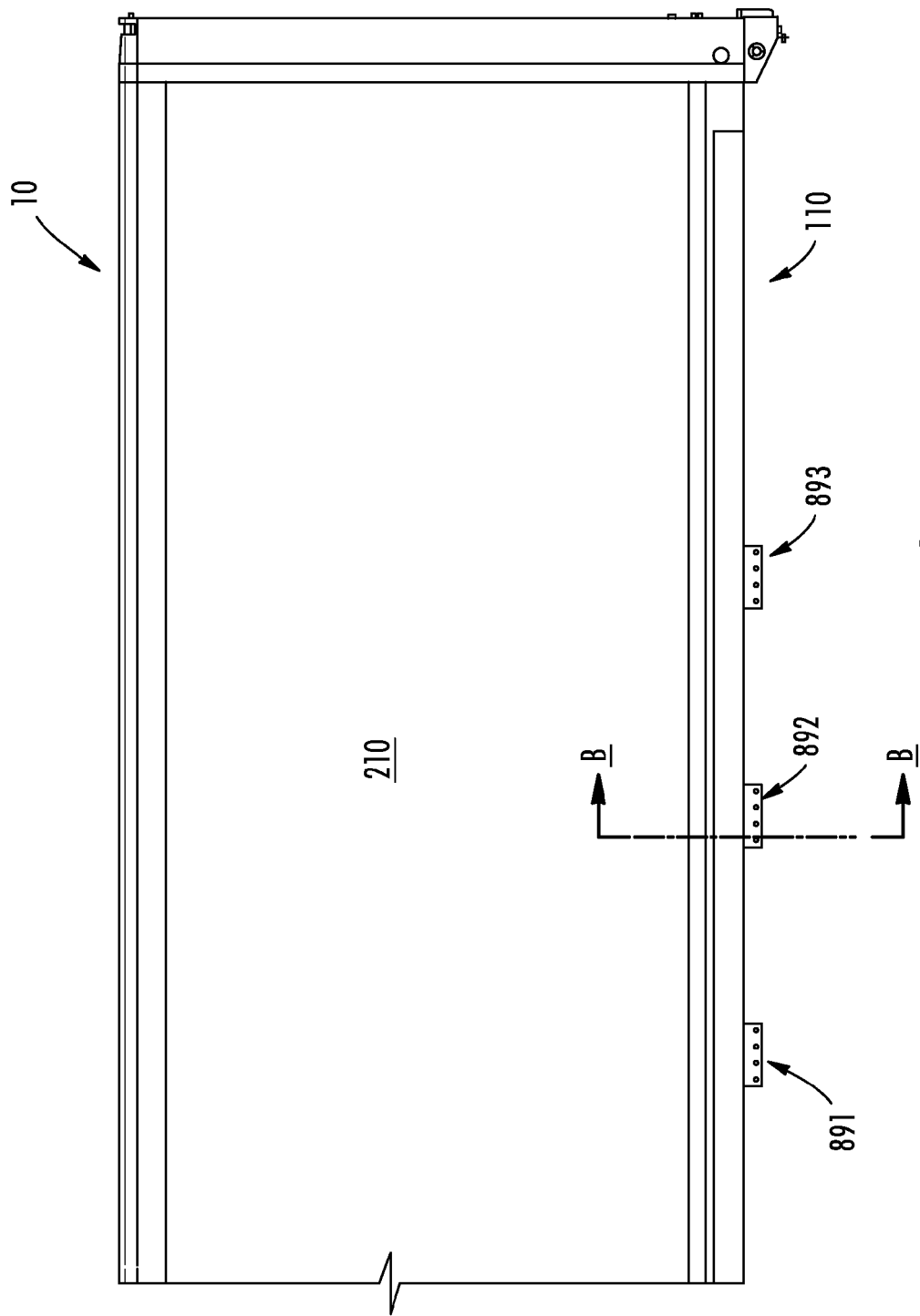

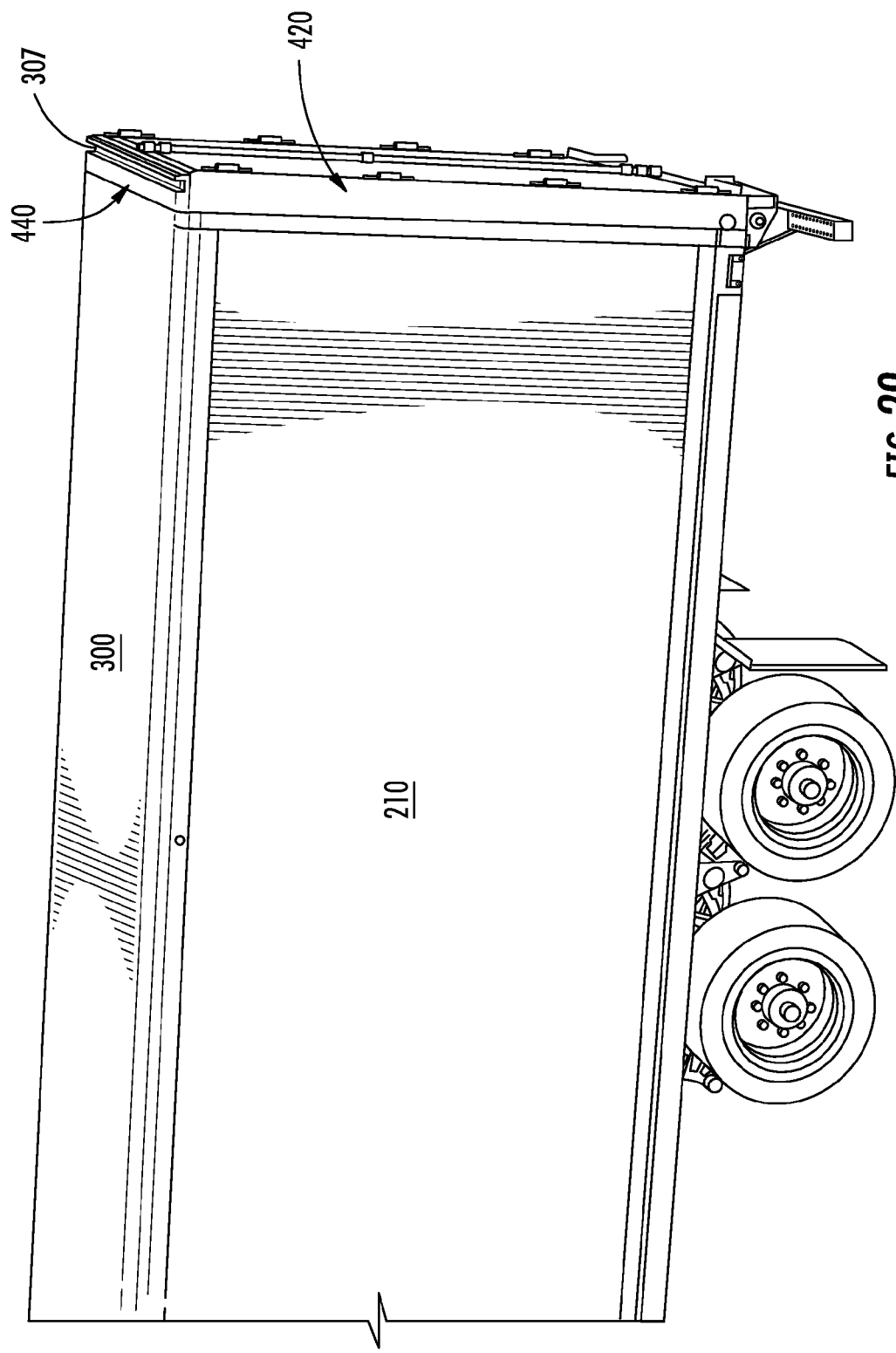

MODULAR COMPOSITE STRUCTURAL COMPONENT AND STRUCTURES FORMED THEREWITH

FIELD OF THE INVENTION

The present invention is directed to structural components and particularly to modular structures prepared using the components. In specific embodiments, the invention is directed to trailers, and particularly modular composite trailers.

BACKGROUND OF THE INVENTION

The modern world-wide economy is strongly dependent upon storage and transportation of large volumes of goods. Generally box-shaped structures make up the bulk of the storage and transportation means in use today. Cargo containers, railcars, and tractor trailers (also known as semi-trailers) are all typically box-shaped structures formed of a floor, a roof, sidewalls, and front and back walls. Such containers are usually rectangular, have one or more doors, and have a defined interior volume for containing cargo.

Such containers are conventionally formed of materials, such as metal and wood. A conventional semi-trailer, for example, is often formed of steel or aluminum frame members, aluminum sidewalls and roof, and a wood floor. Although these materials provide structural strength, they limit the useful lifetime of the trailer since metal components are subject to corrosion, and wood components are subject to rotting. Moreover, these materials also impart great weight to the empty structure. A typical semi-trailer having a standard length of 53 feet has an average overall weight of 15,000 pounds.

Cargo containers are often limited by the amount of cargo that can be stored or transported therein. For example, U.S. highways typically have a federally mandated maximum weight limit of 80,000 pounds. Thus, the total maximum combined weight of a tractor, trailer, and cargo being shipped on a U.S. highway is 80,000 pounds. The average weight of a conventional tractor is 18,000 pounds. The average weight of a conventional trailer is 15,000 pounds. Knowing the average empty weight of a typical trailer, conventional trailers can only haul around 45,000 to 47,000 pounds of cargo. Thus, the weight of conventional trailers can limit the total amount of cargo that can be hauled. In light of the transportation costs associated with hauling cargo, it would be very useful to be able to have a storage and/or transportation structure, such as a trailer, that is of reduced weight and can thus haul a greater overall weight of cargo, all without substantially forfeiting trailer structural strength. The present invention fills this need.

SUMMARY OF THE INVENTION

The present invention provides structural components formed of composite materials and specific structures that can be formed using the component. The structural components incorporate multiple attributes making them particularly beneficial as components of structures typically used in the storage and transportation of cargo. For example, the inventive structural components can be a component part of a shipping cargo container, a railcar, or a semi-trailer. The inventive composite structural components provide strength and durability, ease of manufacture, and can be modular in nature facilitating the easy and simple combination of the structural component with other components to form a trailer, or the like. Moreover, multiple structural components formed of composite materials may be combined according to the invention to provide a structure, such as a trailer, that is formed substantially completely of composite materials as the main structural components (e.g., the floor unit, roof, sidewalls, end walls, and frame components).

In one aspect, the present invention is directed to a modular structural component. In some embodiments, the modular structural component comprises an integrated composite assembly formed of at least two structural components. For example, the integrated composite assembly may be an integrated floor unit and front wall assembly. In another example, the integrated composite assembly may be an integrated roof and front wall assembly. Although the integrated composite assembly of the invention may comprise a number of combinations of structural components, for ease of discussion, the integrated composite assembly may be particularly described herein in terms of a specific embodiment, such as the integrated floor unit and front wall assembly. This should not be construed, however, as limiting the scope of the invention.

In particular embodiments, the integrated floor unit and front wall assembly may be formed of a floor unit having a front portion and a front wall integrally formed with and rising up from the front portion of the floor unit. Such structural component is highly beneficial in the modular construction of a trailer (or like structure) because the integrated floor unit and front wall provide the foundation for the easy and simple addition of the further structural components to form the final structure. In particular, the floor unit and front wall may include portions that are specifically designed to facilitate the simple, yet structurally sound, connection of further parts. The further components combinable with the integrated floor unit and front wall assembly may also be comprised of composite materials or may include, at least partially, conventional components, such as steel or aluminum. In a specific embodiment, the integrated floor unit and front wall assembly is particularly combinable with further composite materials, which can be specifically formed with jointing means for easily and simply connecting with the integrated floor unit and front wall assembly.

Accordingly, in another aspect, the present invention also provides a modular structure, such as a trailer or other structure useful in the storage and/or transportation of cargo. In particular, the inventive modular structure may be a semi-trailer. In some embodiments, the modular trailer comprises the following components: A) two opposing sidewalls; B) a roof; and C) an integrated composite floor unit and front wall assembly comprising: i) a floor unit having a front portion; ii) a front wall integrally formed with and rising up from the front portion of the floor unit; and iii) one or more hardpoint connectors integrally formed within the floor unit. In specific embodiments, the one or all of the opposing sidewalls and the roof may comprise composite materials.

In another embodiment, a modular trailer according to the invention may comprise the following components: A) two opposing sidewalls; B) a floor unit; and C) an integrated composite roof and front wall assembly comprising: i) a roof having a front portion; and ii) a front wall integrally formed with and extending down from the front portion of the roof. In specific embodiments, the one or all of the opposing sidewalls and the floor unit may comprise composite materials.

In addition to the noted components, the trailer of the invention may also comprise further structural components that may comprise composite materials. For example, the trailer may further comprise one or more frame members, as well as one or more doors. In particular, one or more frame members may be used to form the rear portion of the trailer and thus define a doorway into the trailer. Optionally, one or more doorways may be formed in one or both sidewalls and/or in a rear wall component.

Still further, the various components of the inventive modular trailer can each comprise portions specifically designed to facilitate the easy and simple interconnection of the various structural components. Also, additional components may be provided to reinforce the one or more joints formed by the interconnection of the various structural components.

In a specific embodiment, a modular composite trailer according to the present invention may comprise the following components: A) two opposing composite sidewall panels, each having a top edge, a bottom edge, a front edge, and a rear edge; B) a composite roof panel having two side portions, a front edge, and a rear edge, the roof panel side portions being adapted to receive the top edges of the two sidewall panels; C) an integrated composite floor unit and front wall assembly defining the floor unit and the front wall; and D) a molded, composite rear frame having a bottom frame component adapted to receive the rear edge of the floor unit, two side frame components adapted to receive the rear edges of the sidewall panels, and a top frame component adapted to receive the rear edge of the roof panel. In certain embodiments, the integrated composite floor unit and front wall assembly may comprise the following: i) a floor unit having a front portion, a rear edge, and two side portions, the floor unit side portions being adapted to receive the bottom edges of the two sidewall panels; and ii) a front wall integrally formed with and rising up from the front portion of the floor unit, the front wall having a top portion adapted to receive the front edge of the roof panel and having two side portions adapted to receive the front edges of the sidewall panels. All of these components may be combined to form the trailer having an interior (which defines a cargo containing space having a specific volume) and an exterior (i.e., outward facing surfaces).

The various structural components used to form a trailer according to the invention may particularly comprise composite materials. For example, one or more of the sidewall panels, the roof panel, the integrated floor unit and front wall assembly, and the rear frame may comprise a composite material selected from the group consisting of a fiber reinforced polymer material; a fiber reinforced polymer composite; a solid laminate; and combinations thereof. More particularly, a fiber reinforced polymer composite useful according to the invention may be selected from the group consisting of: a pultruded sandwich panel comprising an upper skin, a lower skin, and a core disposed substantially between the upper and lower skins; a vacuum-infused sandwich panel comprising an upper skin and a lower skin and a core disposed substantially between the upper and lower skins; a pultruded panel comprising an upper skin and a lower skin and a web material disposed substantially between the upper and lower skins; and combinations thereof.

In some embodiments, a trailer according to the invention may still comprise further frame components. For example, the trailer may comprise one or more sidewall frames attached to the sidewalls. Specifically, the frames may at least partially define the edges of the sidewalls. Such sidewall frames may comprise one or more composite materials and may be described as plates or composite plates. Such sidewall frames may be a single formed component or may comprise two, three, or four individual plates combined to form the sidewall frame. Alternately, the sidewall frame may be absent, and the one or more plates may be individually combined with the sidewall after interconnection of the sidewall with the other trailer structural components, as described herein.

Various structural components used to form the trailer of the invention may have portions that are particularly designed to facilitate attachment with the remaining structural components. For example, the roof panel may comprise side portions that have a downward orientation. More particularly, the ends of the downwardly oriented side portions may align with the top edges of the sidewalls to form joints. For example, in a specific embodiment, the downwardly oriented side portions of the roof panel may be adapted to receive the top edges of the sidewall panels by comprising a first terminal edge that is jointed to the top edge of the sidewall and an overhang component that extends beyond the first terminal edge and covers the joint between the first terminal edge of the downwardly oriented side portion and the top edge of the sidewall on the exterior of the trailer. Thus, in one embodiment, the joint may be a lap joint. In further embodiments, though, other types of joints may be formed by the meeting of the structural components. In one further embodiment, the joint may be a tongue and groove joint.

Yet further, the trailer may comprise a joint plate attached to the downwardly oriented side portions of the roof panel on the interior of the trailer. This joint plate may be further attached to the sidewall, such as near the top edge of the sidewall, and the joint plate may also comprise a composite material. In some embodiments, the joint plate may have a length that substantially corresponds to the length of the sidewall and a width of about 1 inch to about 12 inches.

The presence of the downwardly oriented side portions on the roof provides many benefits. For example, this extension of the roof effectively reduces the overall height of the trailer sidewall, which can provide for an increase in the structural integrity of the sidewall and reduce or eliminate the need for frame components along the length of the sidewall. Moreover, a reduction in the overall height of the sidewall simplifies the production of the composite sidewall.

The dimensions of the downwardly oriented side portions of the roof can vary based upon many factors. In some embodiments, the downwardly oriented side portions have a length of up to about 18 inches, more particularly about 3 inches to about 12 inches.

The downwardly oriented side portions of the roof component can also be formed to decrease wind resistance of the trailer. A semi-trailer, in particular, is designed with transportation in mind. Thus, the trailer should be durable and provide adequate cargo capacity. A less recognized aspect of trailers is the need to reduce wind resistance of the trailer. A semi-trailer can be a very unwieldy vehicle to control, particularly when traveling at high speeds and/or traveling in windy conditions. Minimizing wind resistance on the trailer can be very useful to improve the stability of the trailer and therefore improve the ability to safely steer and handle the tractor-trailer. Moreover, a reduction in wind resistance can improve fuel efficiency, and this can be a driving force in trailer selection in light of ever-increasing fuel prices.

The downwardly oriented side portions of the roof can be simple extensions of the roof that may diverge from the roof at substantially right angles. In some embodiment, however, the downwardly oriented side portions may be curved in nature such that the exterior of the downwardly oriented side portions have an exterior curvature (e.g., are rounded). This rounded nature, particularly with the use of composite materials, makes for a profile that maximizes wind flow over and around the trailer, reducing sway caused by wind resistance, and improving fuel efficiency of the tractor-trailer.

Similar to the roof component, the floor unit component of the integrated floor unit and front wall assembly can comprise side portions that have an upward orientation. The upwardly oriented side portions of the floor unit component can, in certain embodiments, be substantially a mirror image of the downwardly oriented side portions of the roof. Thus, the description provided above in relation to the downwardly oriented side portions of the roof may also be applicable to the upwardly oriented side portions of the floor unit.

Still further, the front wall component of the integrated floor unit and front wall assembly may comprise side portions that have a rearward orientation. Again, these rearwardly oriented side portions provide similar benefits as the downwardly oriented roof side portions and the upwardly oriented floor unit side portions and may likewise have similar structure and function. In particular, the rearwardly oriented side portions of the front wall may be adapted to align with the front edges of the sidewalls to form joints (e.g., lap joints or tongue and groove joints). More specifically, the rearwardly oriented side portions of the front wall may be adapted to receive the front edges of the sidewall panels by comprising a first terminal edge that is jointed to the front edge of the sidewall and an overhang component that extends beyond the first terminal edge and covers the joint between the first terminal edge of the rearwardly oriented side portion and the front edge of the sidewall on the exterior of the trailer. As with the roof and the floor unit, the front wall may further comprise a joint plate attached to the rearwardly oriented side portions on the interior of the trailer, and this joint plate may be further attached to the sidewall, such as near the front edge of the sidewall.

In addition to the rearwardly oriented side portions, the front wall component may comprise further adaptations to facilitate the modular interaction with the further structural components. For example, in some embodiment, the front wall may comprise a top portion that includes an indentation for receiving the front edge of the roof panel. Moreover, the top portion of the front wall may be rounded or curved in relation to the exterior surface thereof to provide beneficial properties, such as described herein.

As previously noted, the inventive trailer may also comprise a rear frame component. This rear frame component functions to structurally secure the rear portions of the roof, sidewalls, and floor unit and form a single, cohesive trailer structure. In specific embodiments, the rear frame is a one-piece, molded structure; however, the rear frame may comprise two, three, or four individual frame components that are combined to form the final frame structure. Regardless, the frame may be described as comprising a bottom frame component, a top frame component, and two side frame components, and these components may themselves comprise specific features to facilitate the combination of the rear frame component with the remaining structural components of the trailer.

The bottom component of the rear frame may comprise a groove for receiving the rear edge of the floor unit. The side components of the rear frame may comprise an indentation for receiving the rear edge of the sidewall. Moreover, the top component of the rear frame may comprise an indentation for receiving the rear edge of the roof panel. Again, these designs are highly beneficial and help define the modular nature of the inventive trailer. Of course, the rear frame component also provides further advantages. For example, in some embodiments, the rear frame component may define a doorway for entrance into the trailer. Accordingly, the modular composite trailer of the invention may further comprise one or more doors. It is not a requirement for the doors to be located at the rear of the trailer, however, and the trailer may include any components necessary to locate the one or more doors at other areas of the trailer, such as in a sidewall component. In a specific embodiment, the one or more doors may be hingedly attached to the rear frame component. Moreover, the doors may comprise composite panels.

The composite structure of the trailer structural components is also beneficial in other aspects. For example, in some embodiments, one or more of the sidewall panels, the roof panel, the integrated floor unit and front wall assembly, and the rear frame may comprise a molded recess for receiving an accessory component or for providing integrated channels (e.g., water flow channels on the roof or wire guide channels for concealing electrical or other wiring within the structural component).

In another embodiment, the inventive trailer may also comprise a metal coupler plate. This coupler plate may specifically be attached to the exterior of the floor unit component of the integrated composite floor unit and front wall assembly near the front wall.

The trailer may also further comprise a king pin assembly for securing the trailer to a vehicle (e.g., a tractor, such as a fifth wheel). In some embodiments, the king pin may be attached to the metal coupler plate. In other embodiments, the king pin may be attached to the floor unit component of the trailer. In certain embodiments, the king pin may be bonded to the floor unit, such as by being integrally molded within the floor unit.

Even further, the trailer of the invention may comprise one or more suspension elements attached to the exterior of the floor unit component of the integrated composite floor unit and front wall assembly. Such suspension elements can be anything that facilitates attachment of a suspension assembly to the trailer. In some embodiments, the exterior of the floor unit component comprises one or more grooves for recessedly accepting the one or more suspension elements for attachment of a suspension assembly to the trailer. The suspension elements may be bonded to the floor unit, bolted to the floor unit, or both. In specific embodiments, the trailer comprises a metal connection plate that is attached to the exterior of the floor unit component. At least a portion of the metal connection plate may be recessed in the above-described grooves. Further, the metal connection plate may be bonded to the floor unit component, bolted to the floor unit component, or both. The trailer can also comprise one or more metal rails attached to the metal connection plate. Such rails can be particularly beneficial to facilitate attachment of the suspension assembly to the floor unit component of the trailer. In another embodiment, the one or more metal plates may be integrally formed within the floor unit.

The modular composite trailer according to certain embodiments of the invention is particularly advantageous because of the decreased weight of the trailer (relative to a trailer formed of conventional materials) in combination with the maintained or even improved structural integrity of the trailer. In some embodiments, a 53 foot trailer according to the invention has an average overall empty weight of less than about 14,000 pounds, less than about 13,000 pounds, less than about 12,000 pounds, less than about 11,000 pounds, or less than about 10,000 pounds. A trailer of lesser standard length can have even lesser average overall empty weight. For example, a 48 foot trailer according to the invention can have an average overall empty weight of less than 10,000 pounds or even less than 9,000 pounds.

In another aspect, the present invention provides methods of making a composite structural component (such as a trailer floor unit) having a hardpoint connector integrally formed therein (e.g., resin infused). In one embodiment, the invention provides a method of making a composite trailer floor unit having a king pin integrally formed therein. Such methods can particularly include the use of a reinforcing plug that is positioned around the hardpoint connector. In particular, the hardpoint connector may be bonded to or integrally formed within the reinforcing plug (e.g., when the plug itself is a hardened, fiber reinforced resin), which combination is then bonded to or formed within the composite floor unit structure.

BRIEF DESCRIPTION OF THE DRAWINGS

Figure 1:
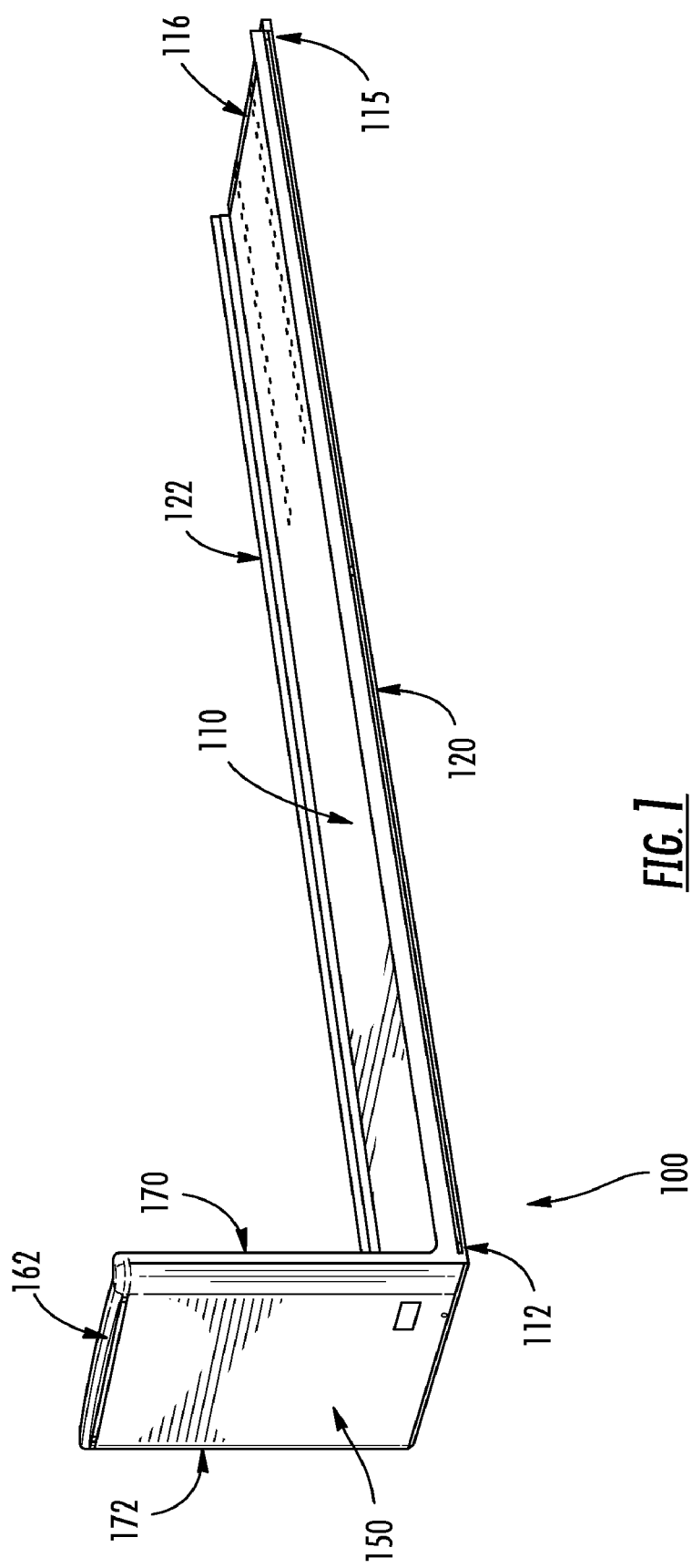
Figure 2:
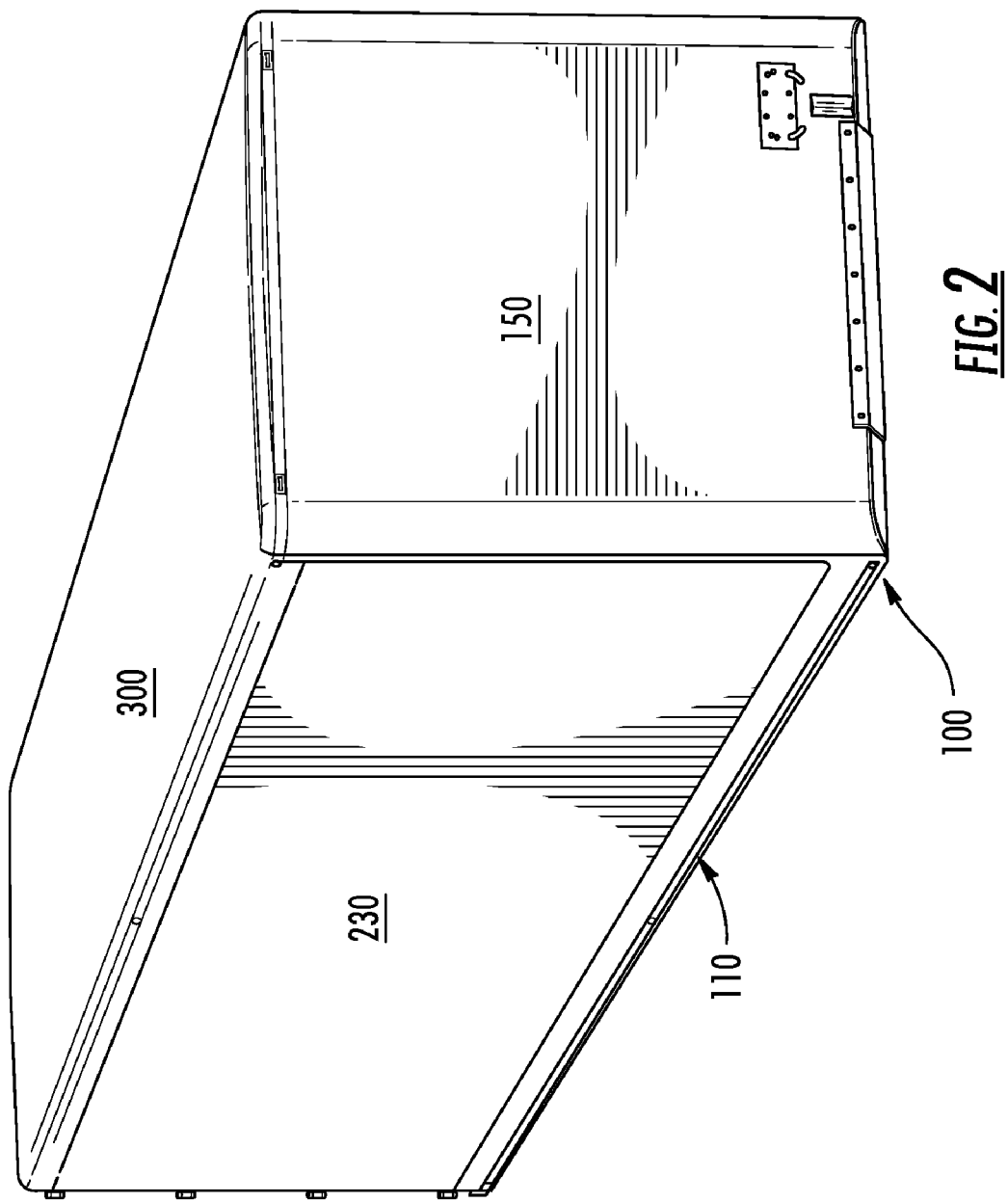
Figure 3:
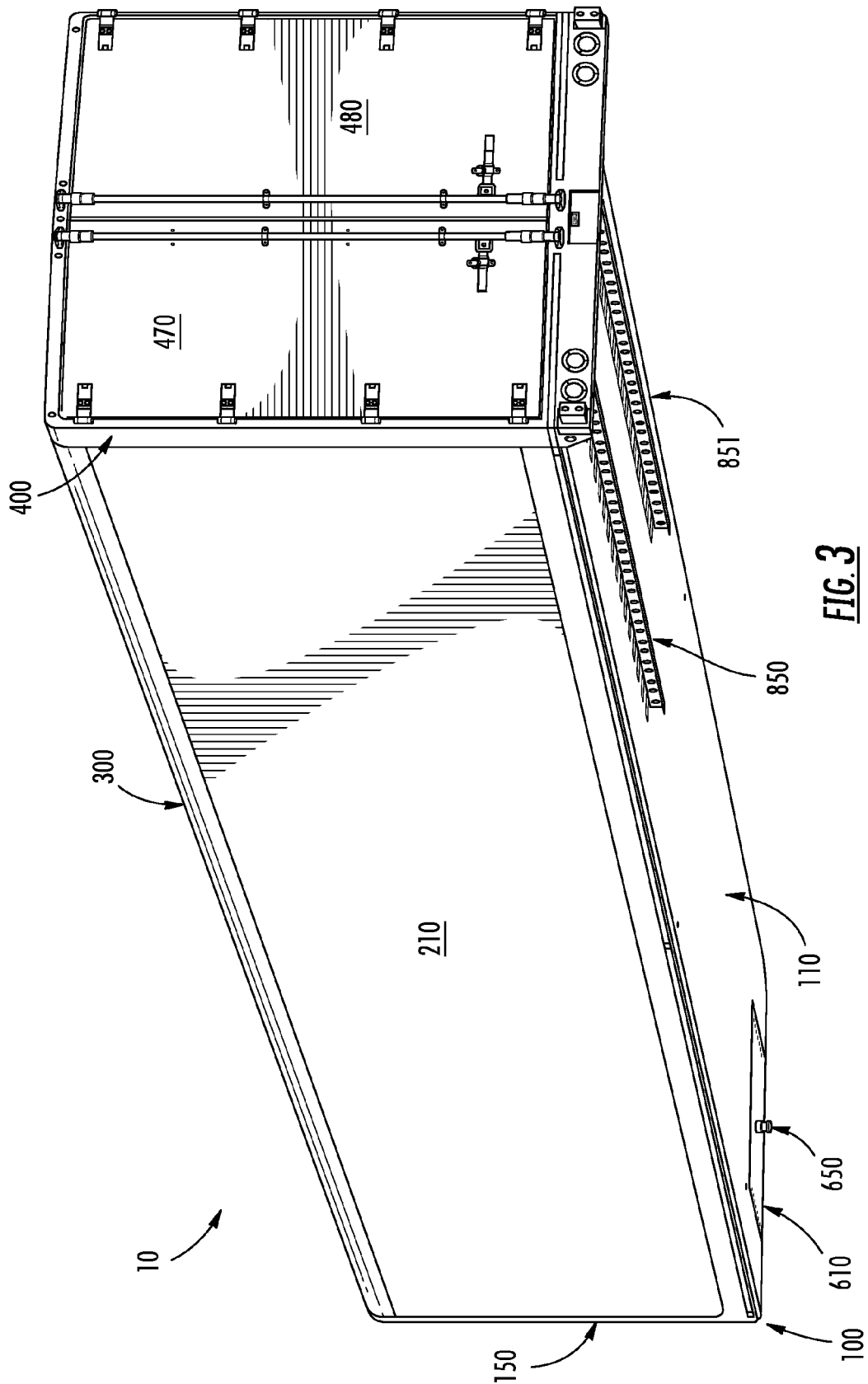
Figure 4:
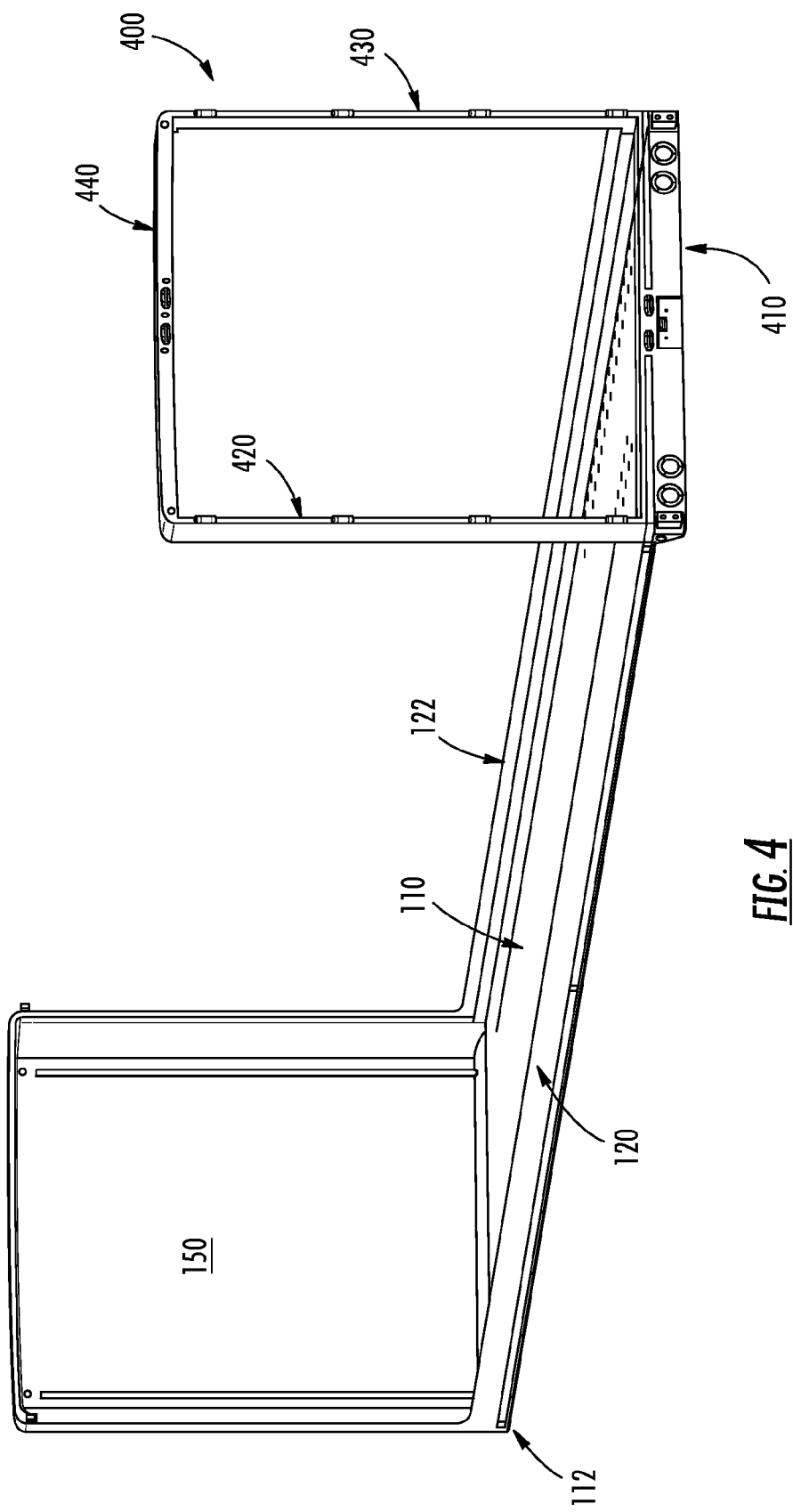
Figure 5:
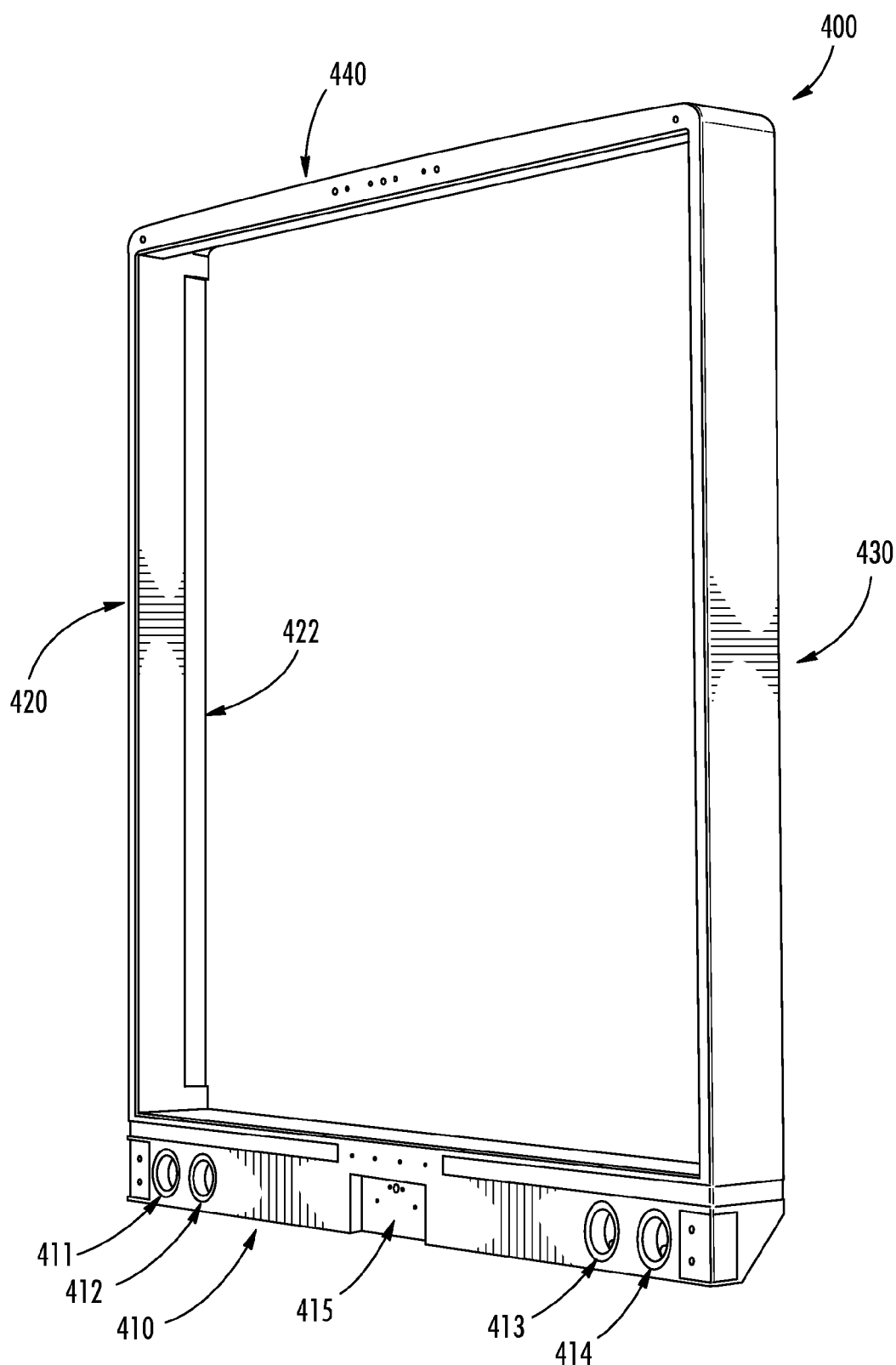
Figure 6:
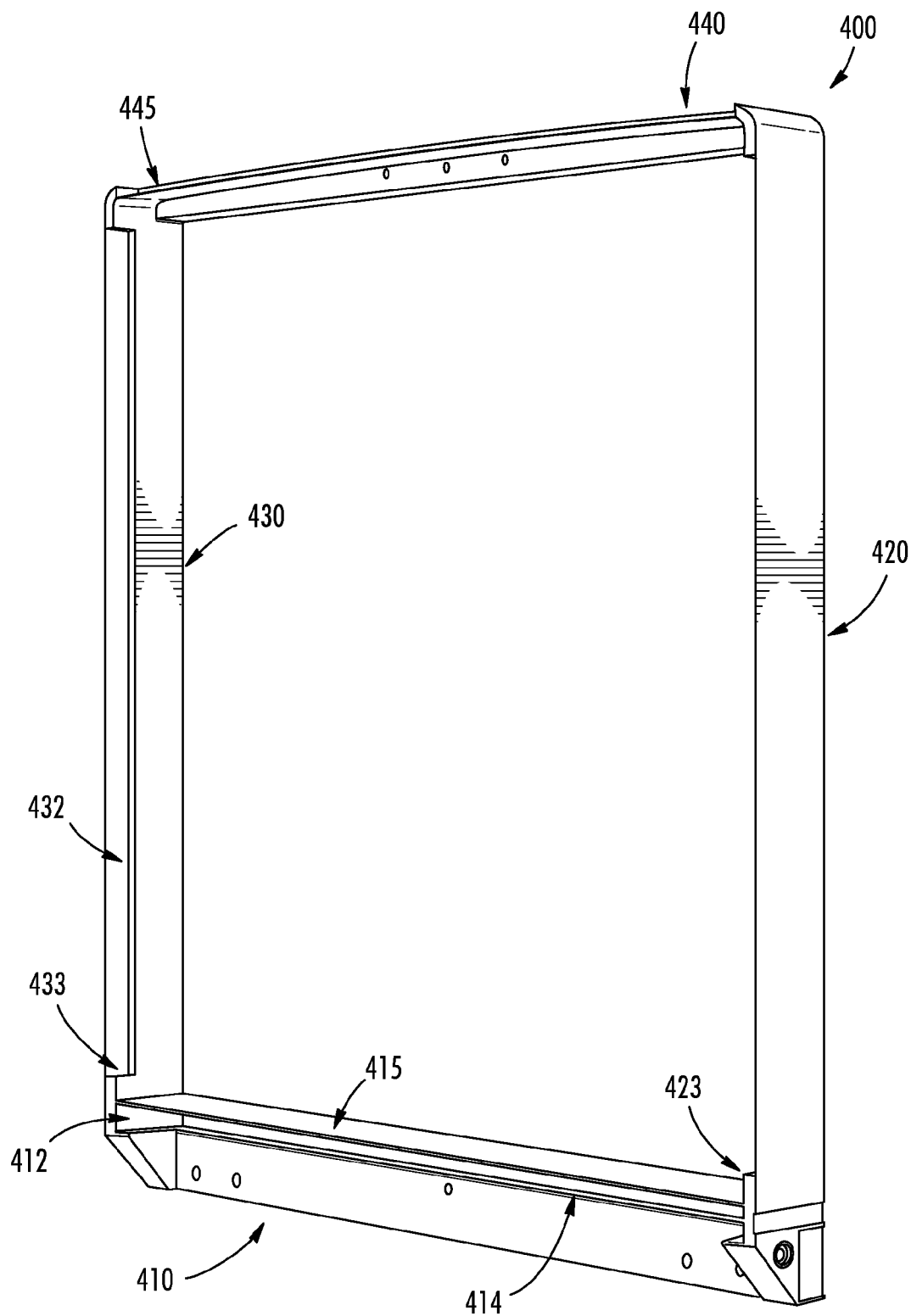
Figure 7:
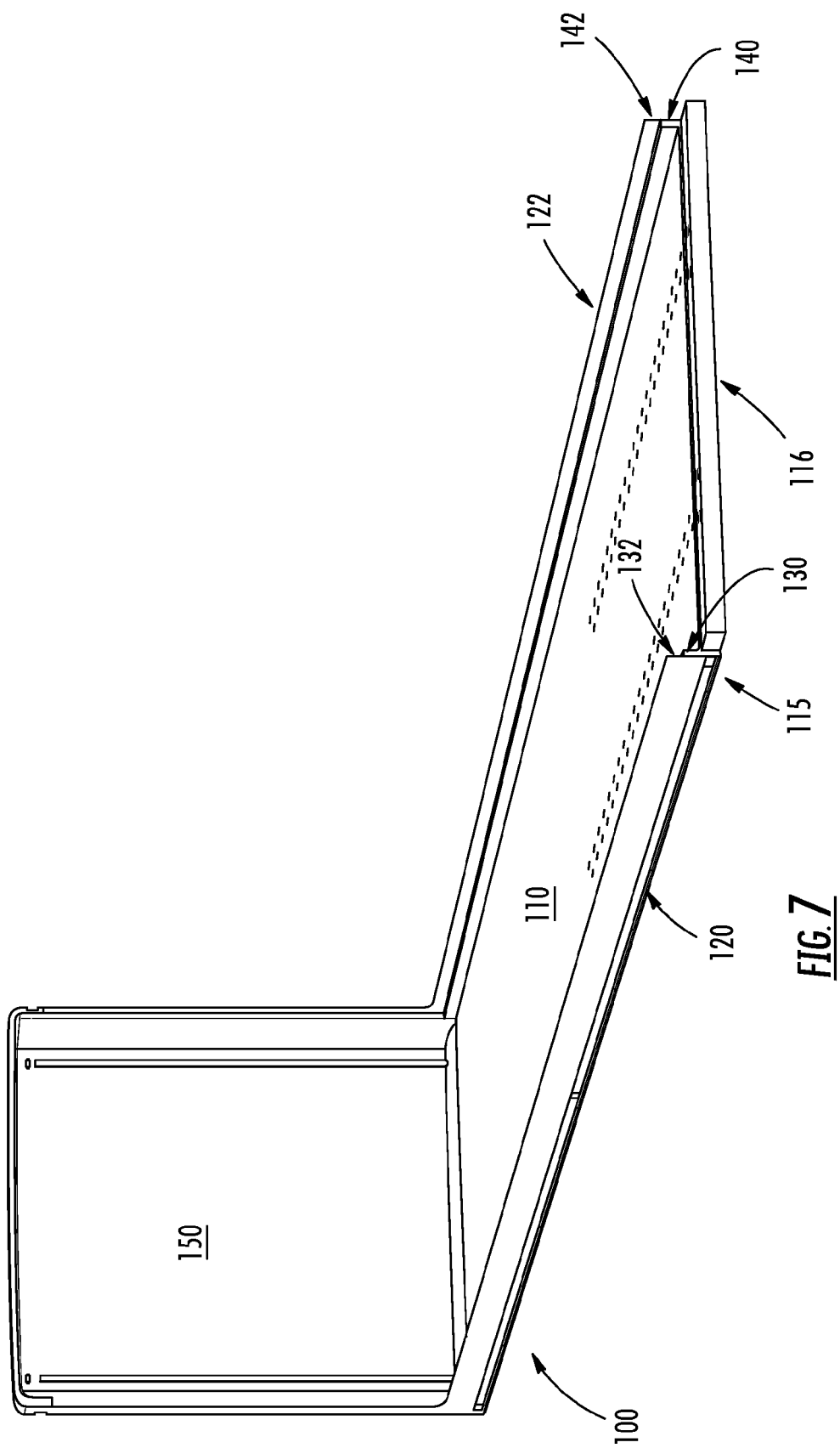
Figure 8:
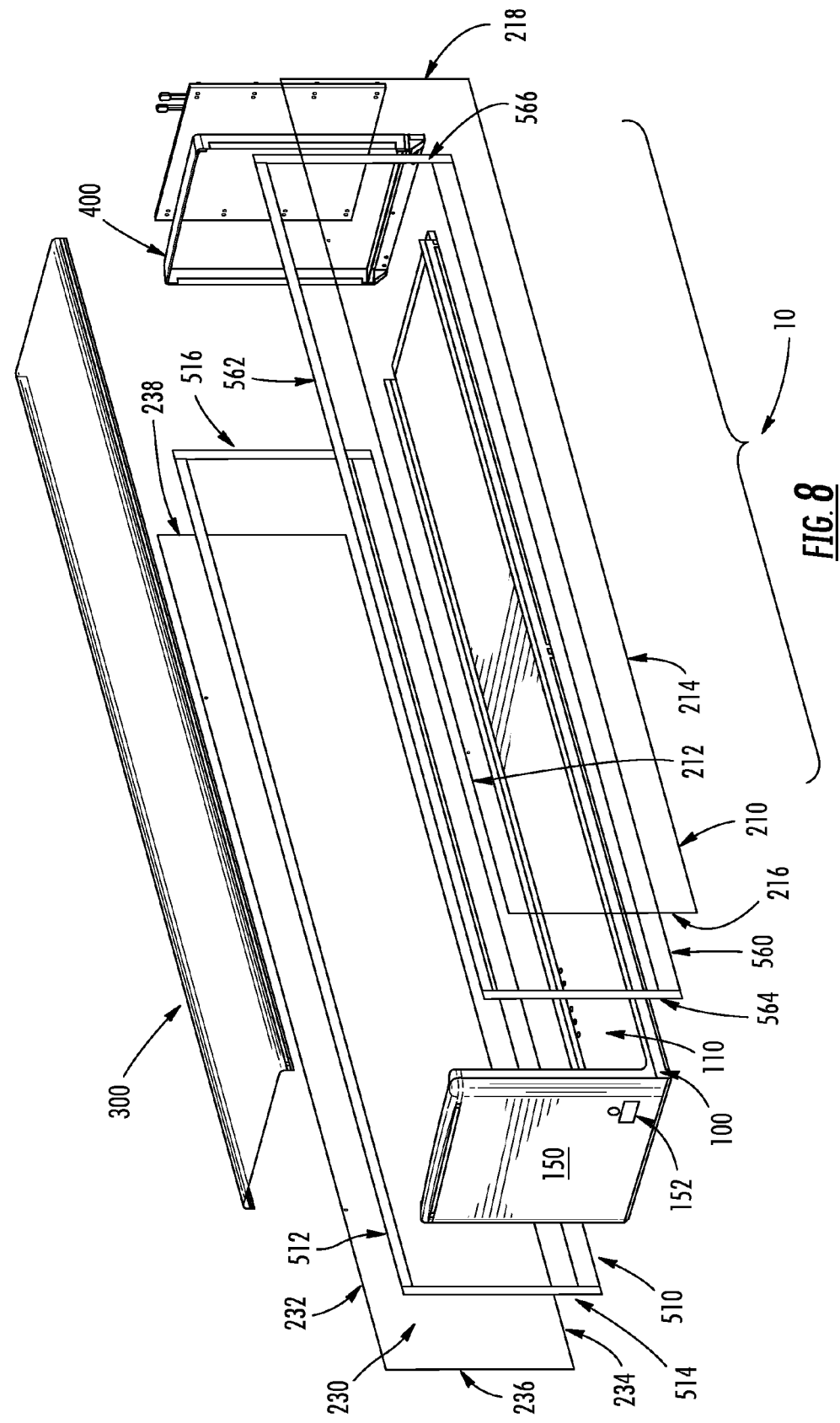
Figure 9A:
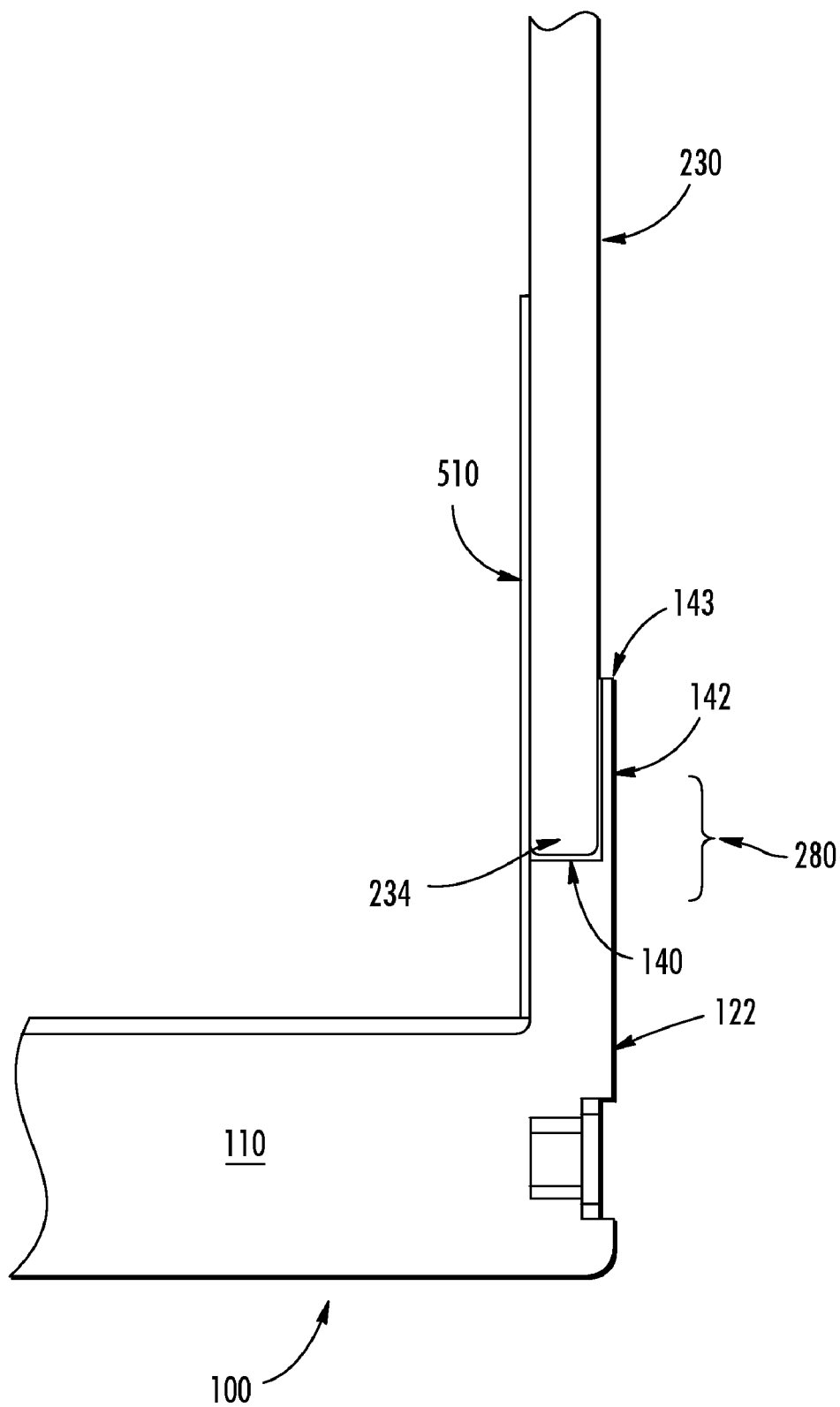
Figure 9B:
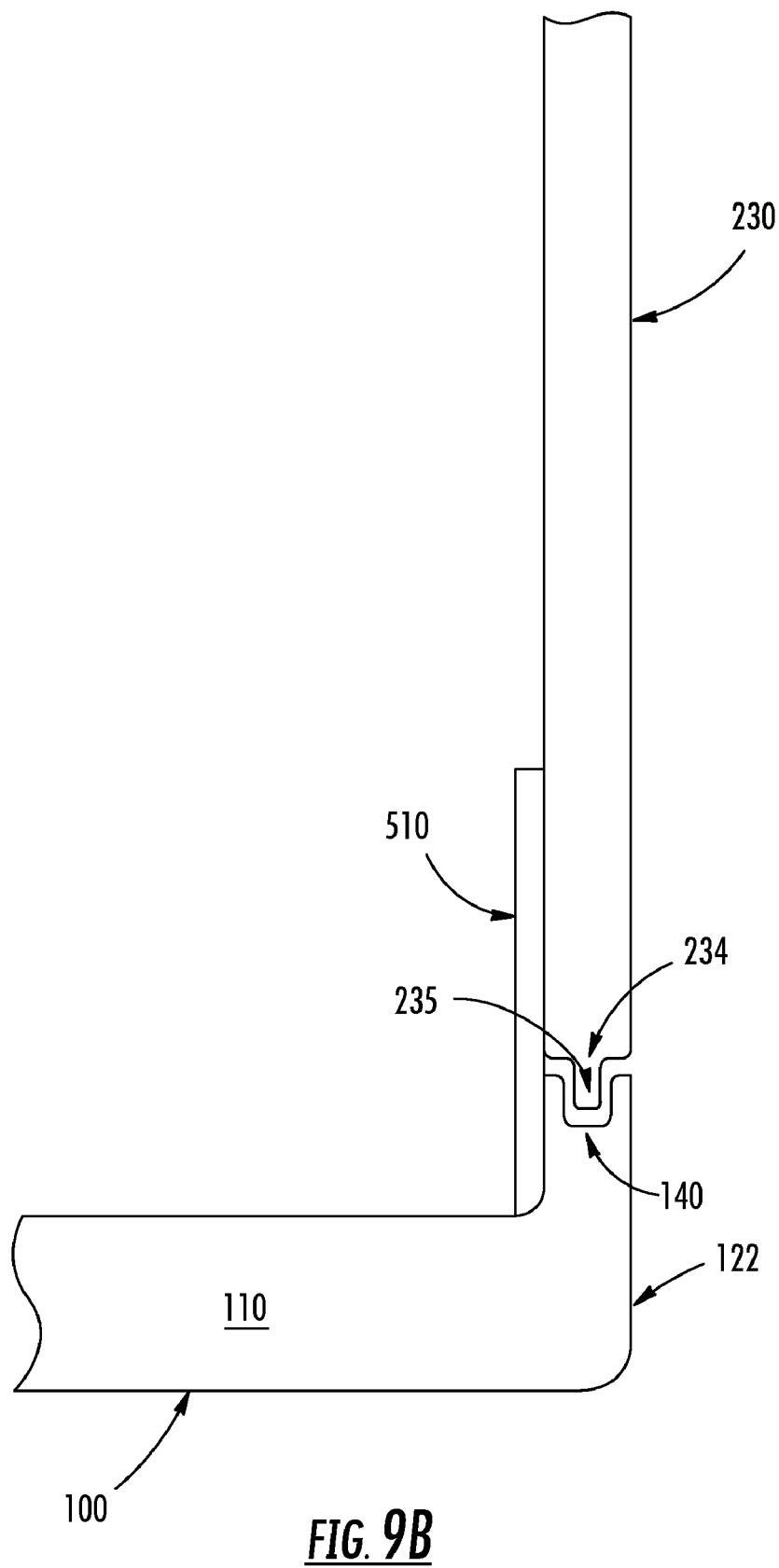
Figure 10:
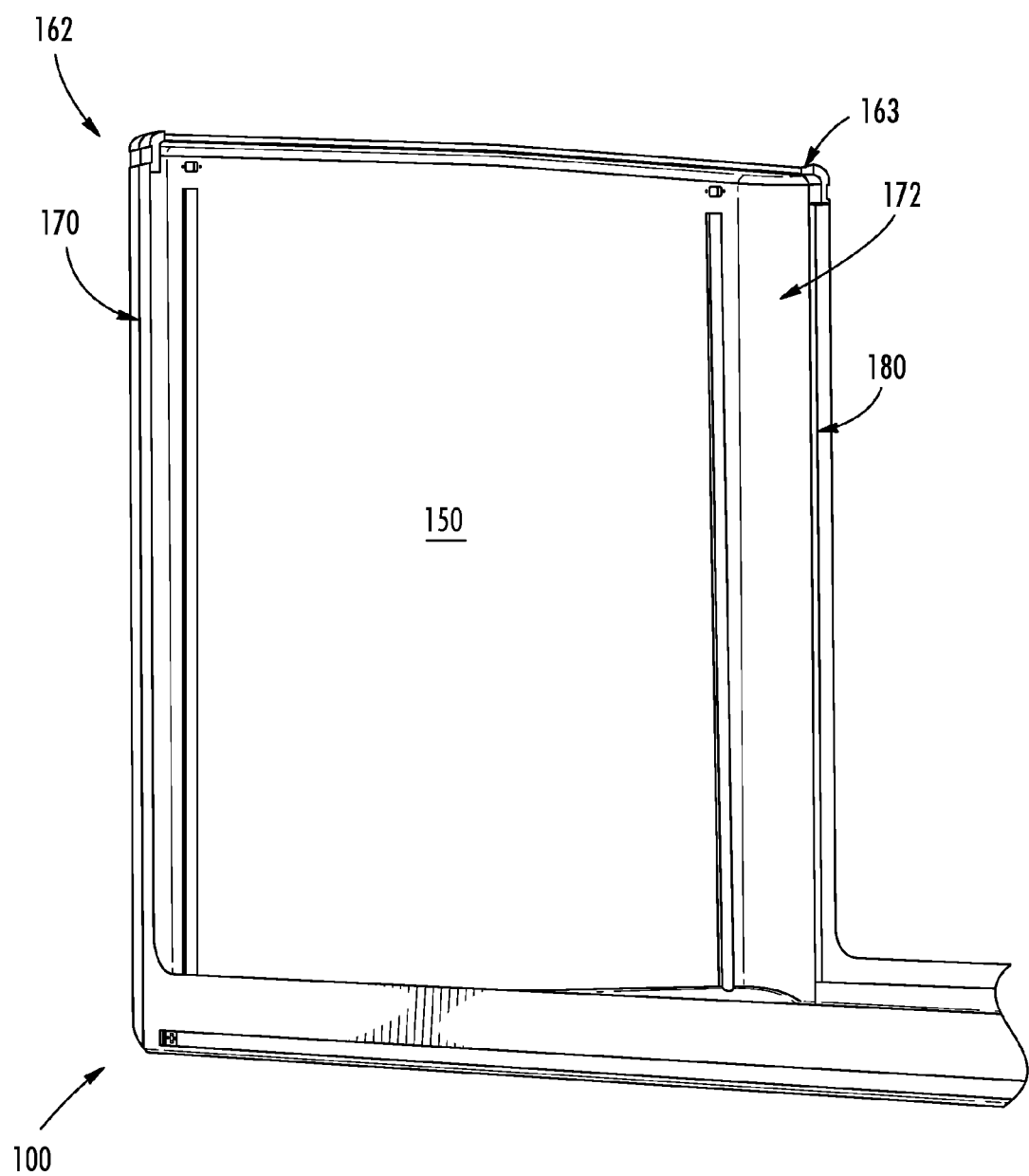
Figure 11:
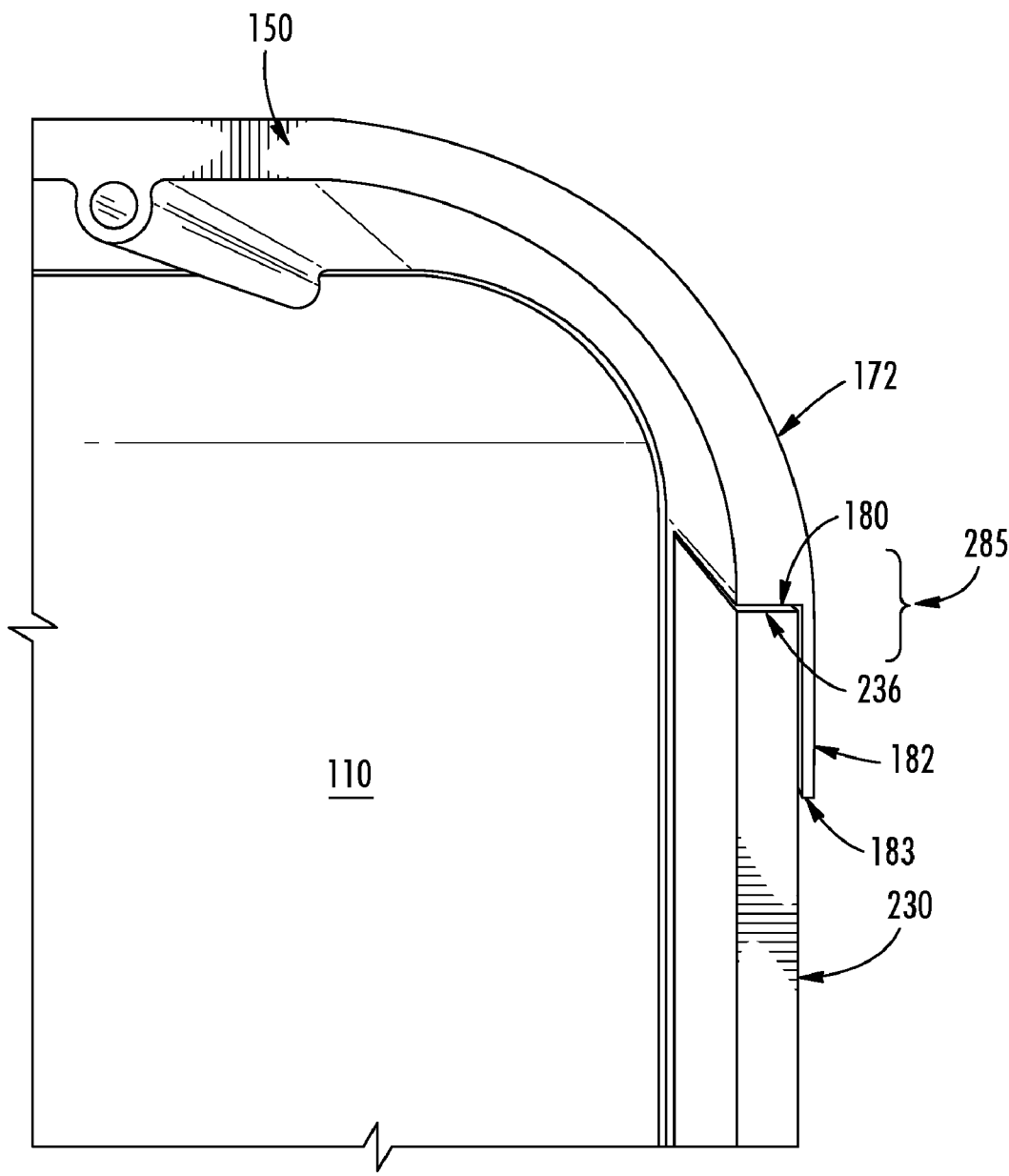
Figure 12:
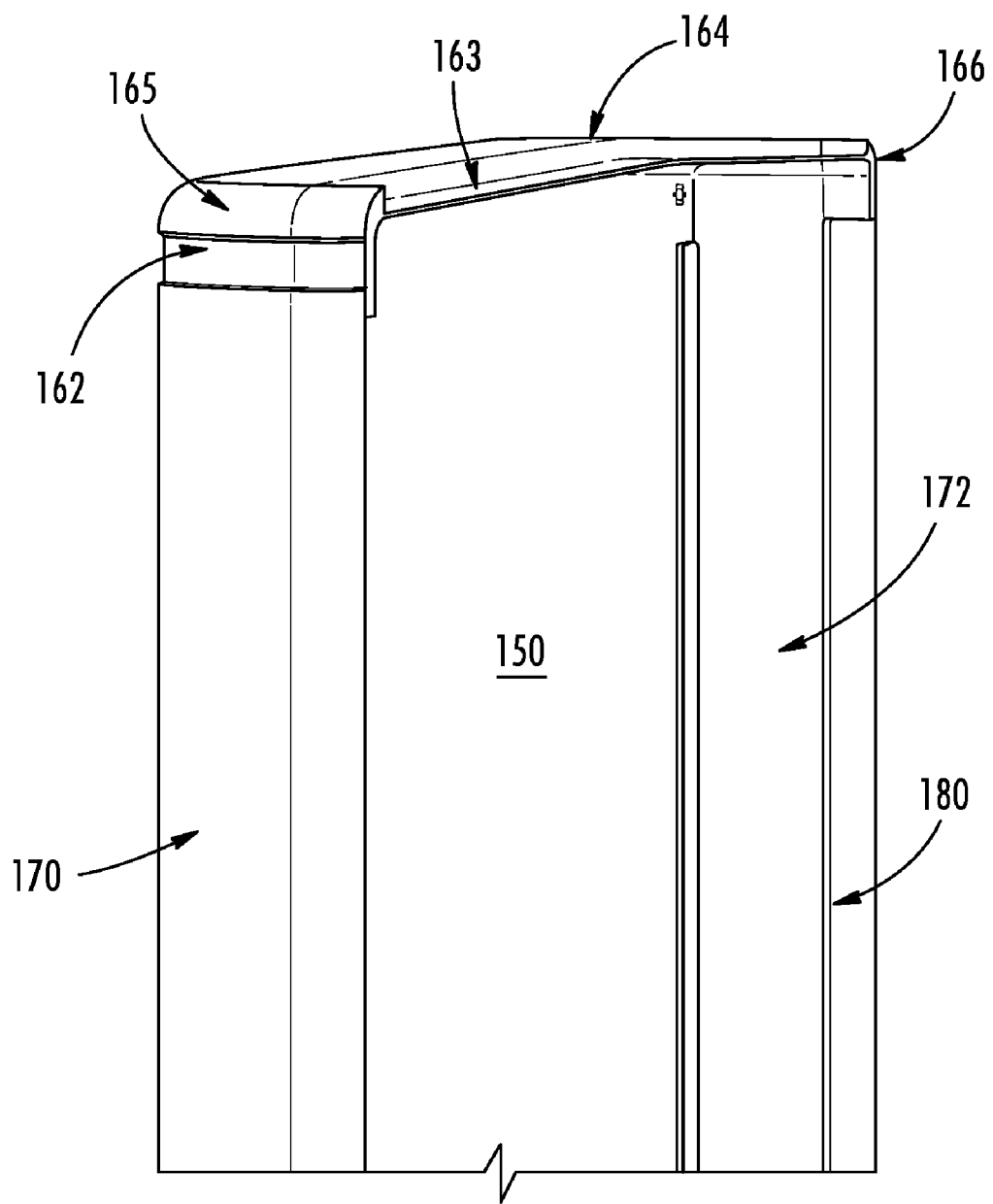
Figure 13:
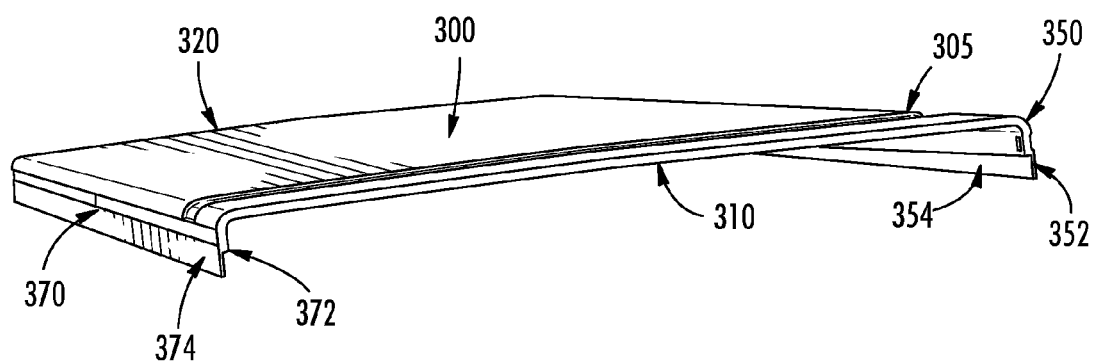
Figure 14:
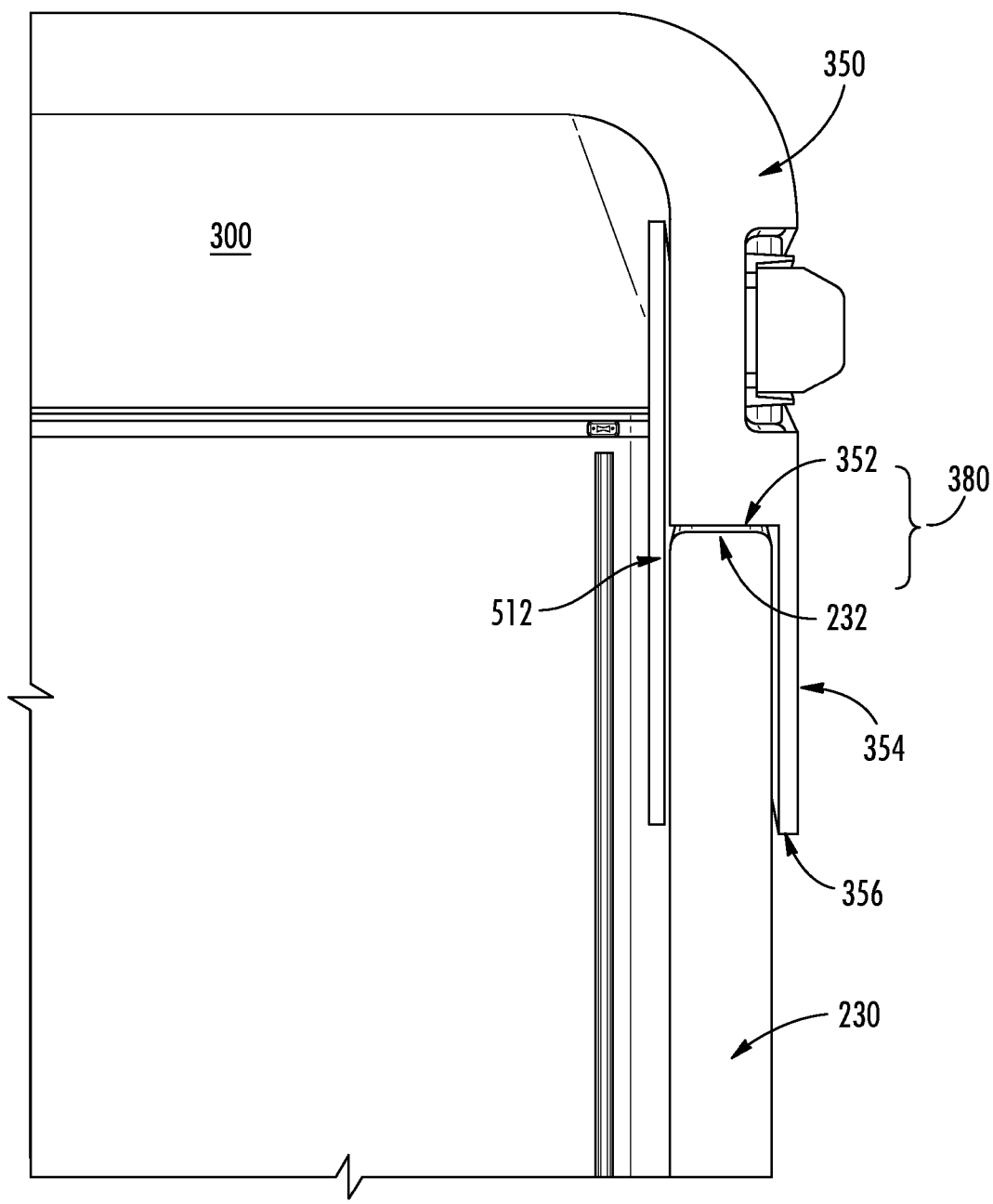
Figure 15:
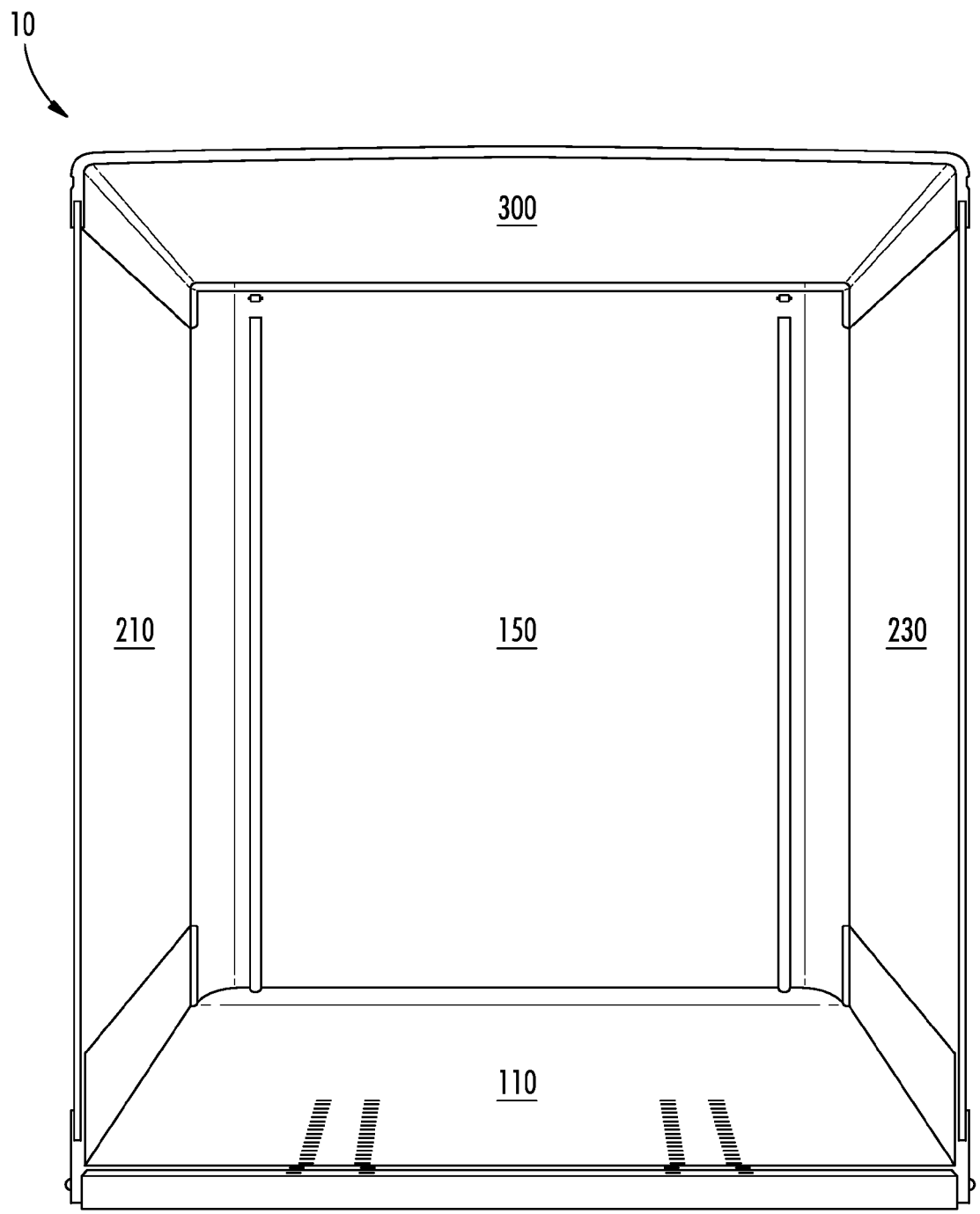
Figure 17A:
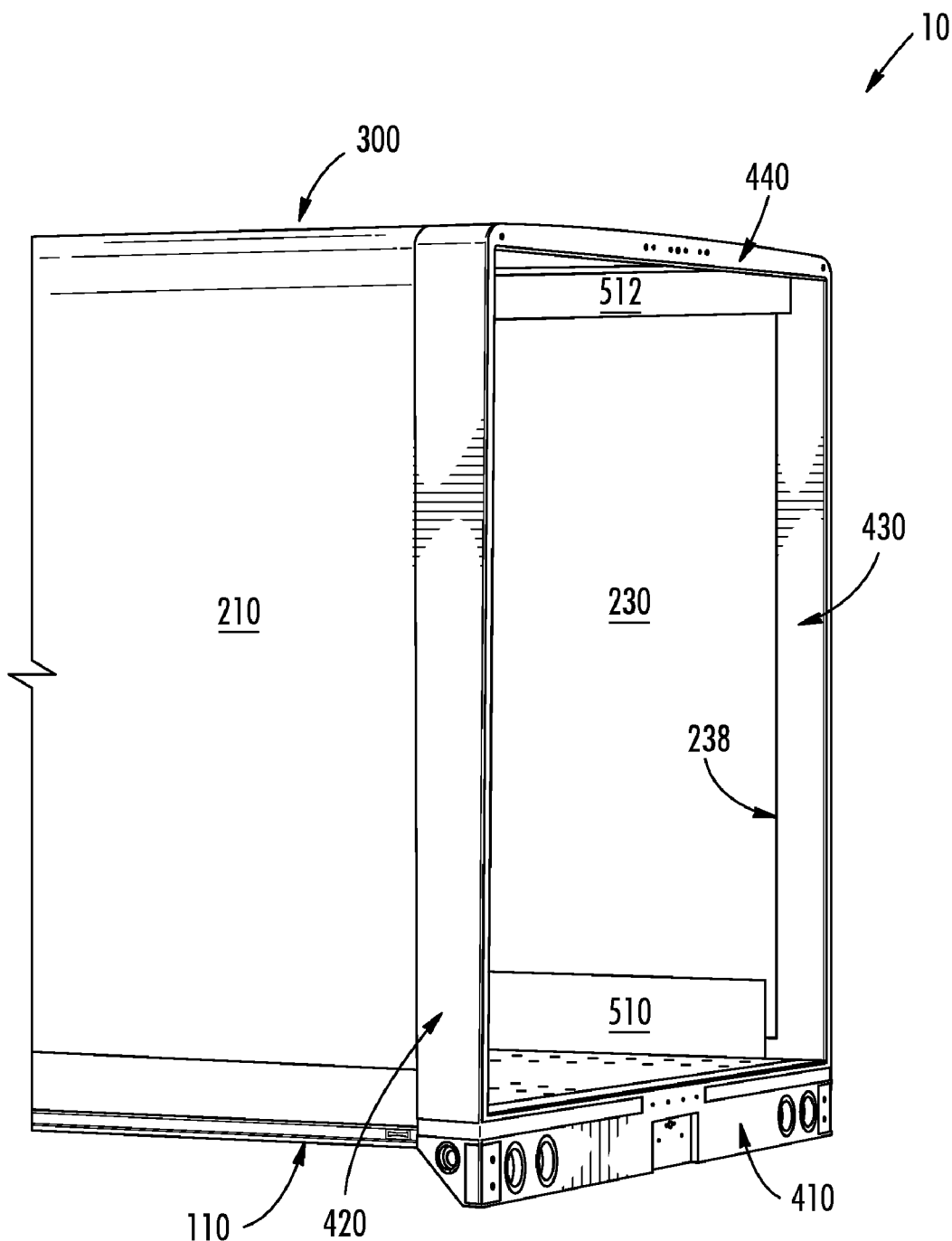
Figure 17B:
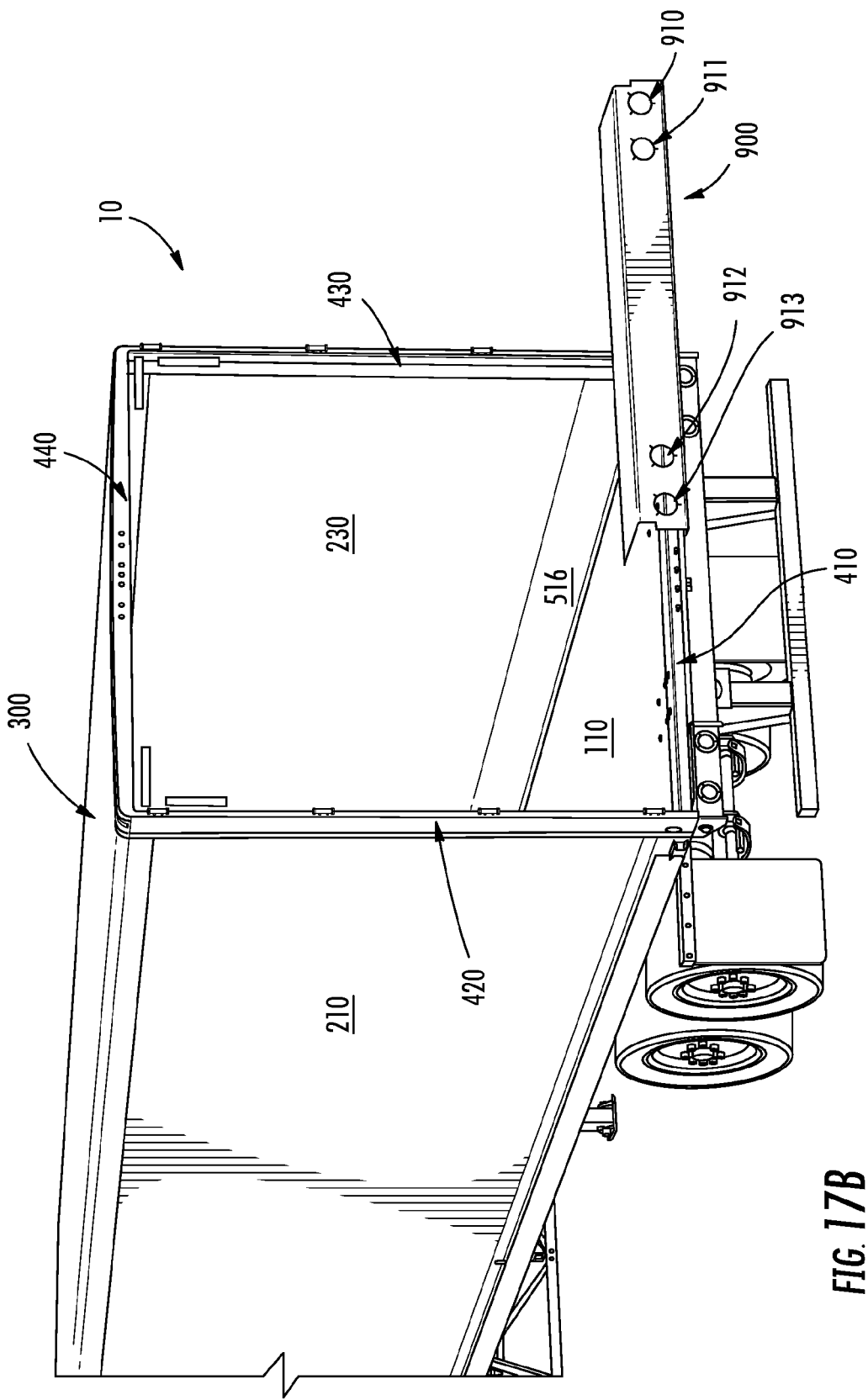
Figure 18:
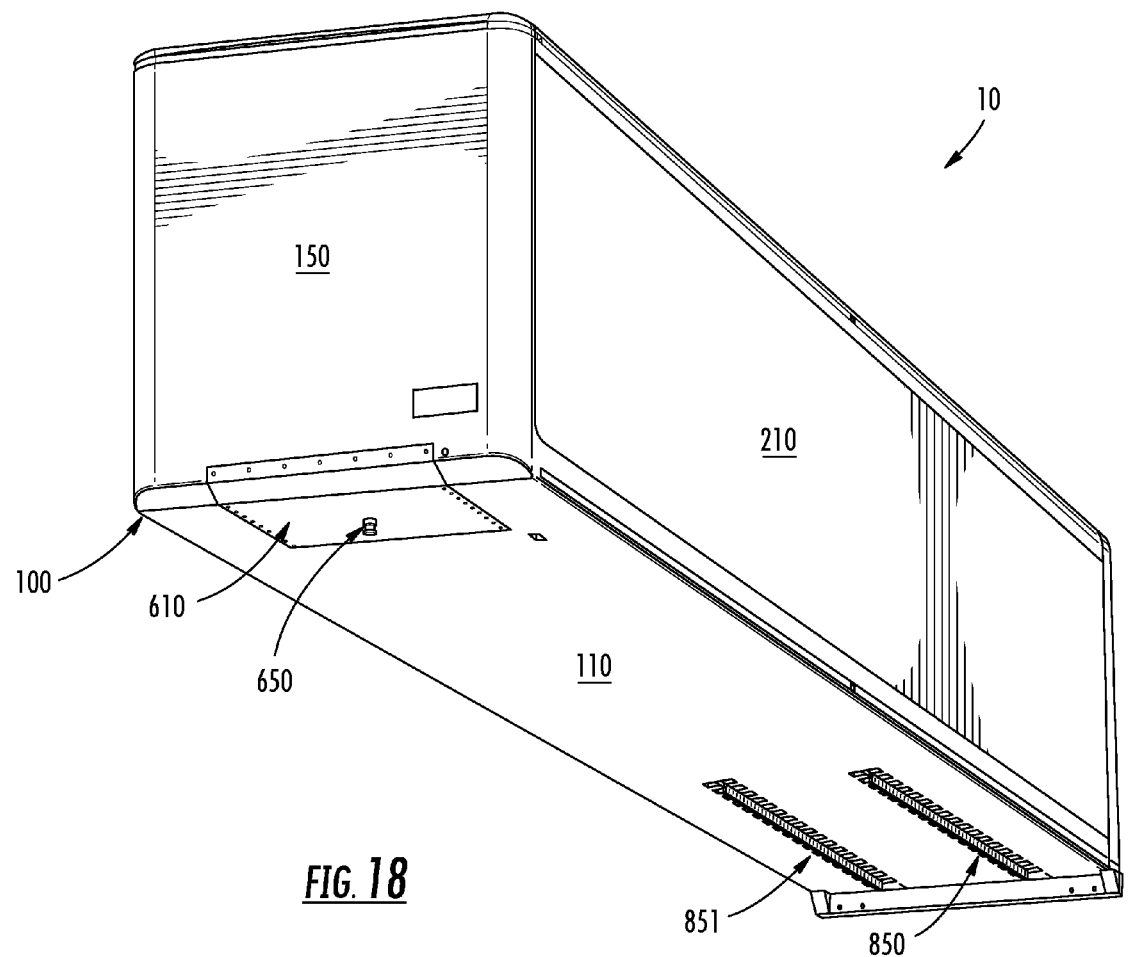
Figure 19:
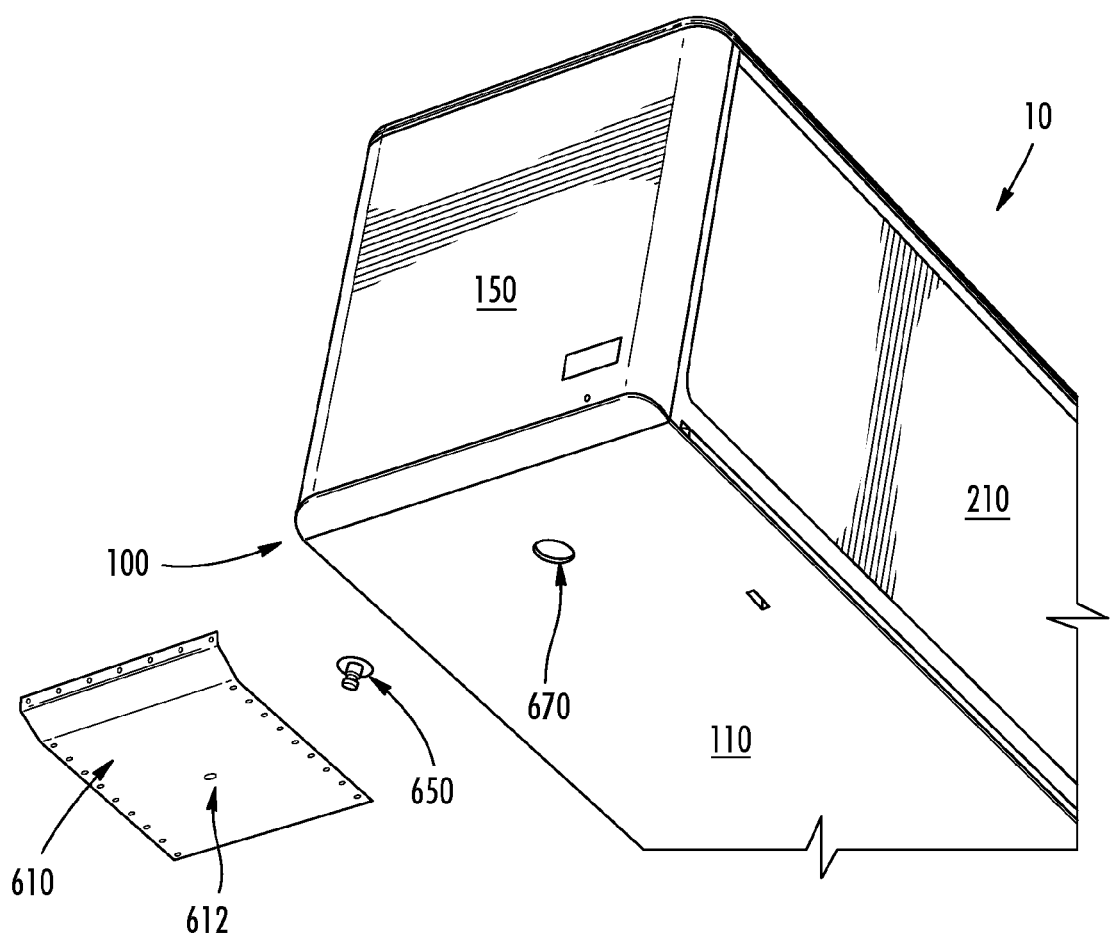
Figure 20A:
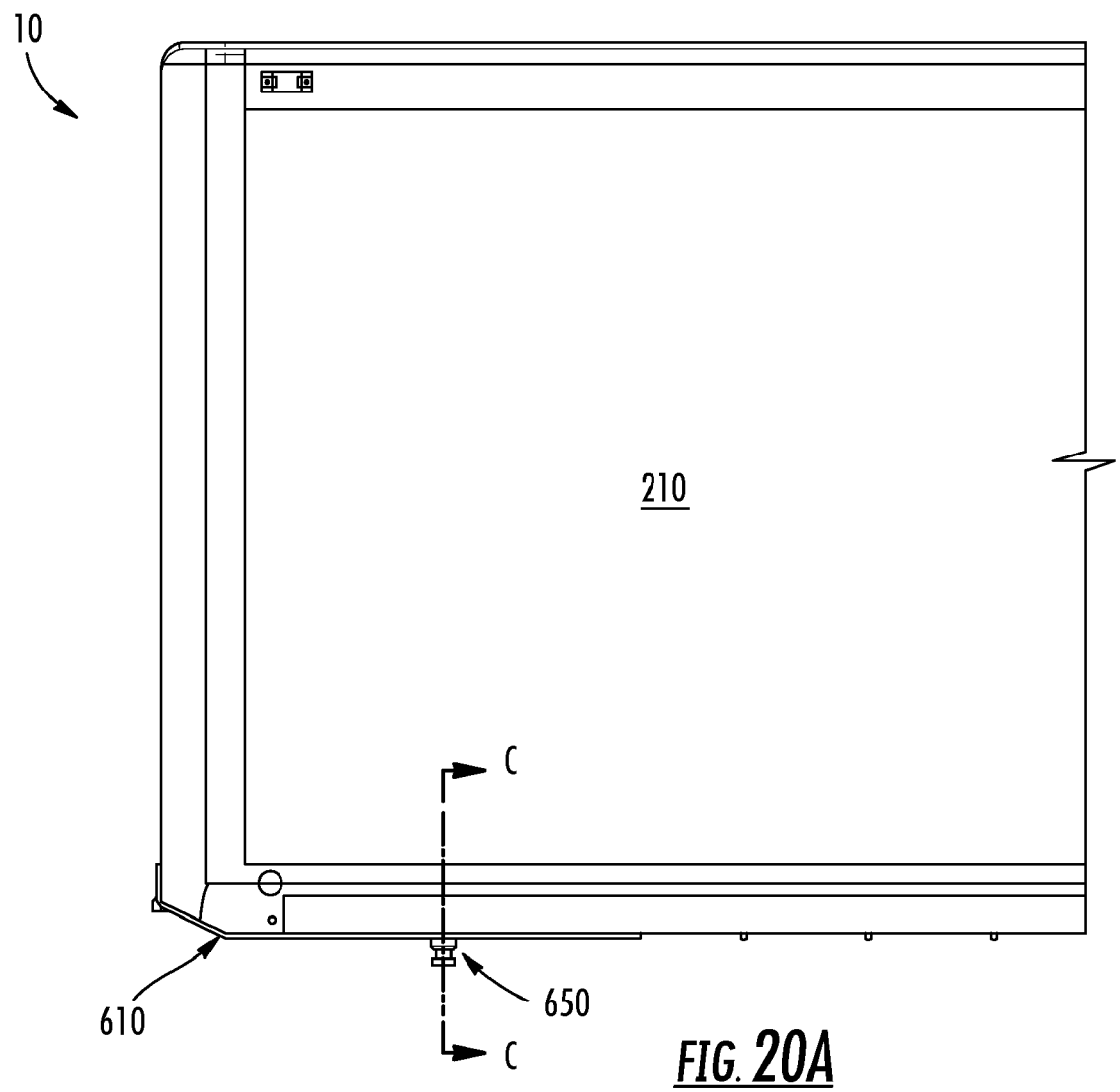
Figure 20C:
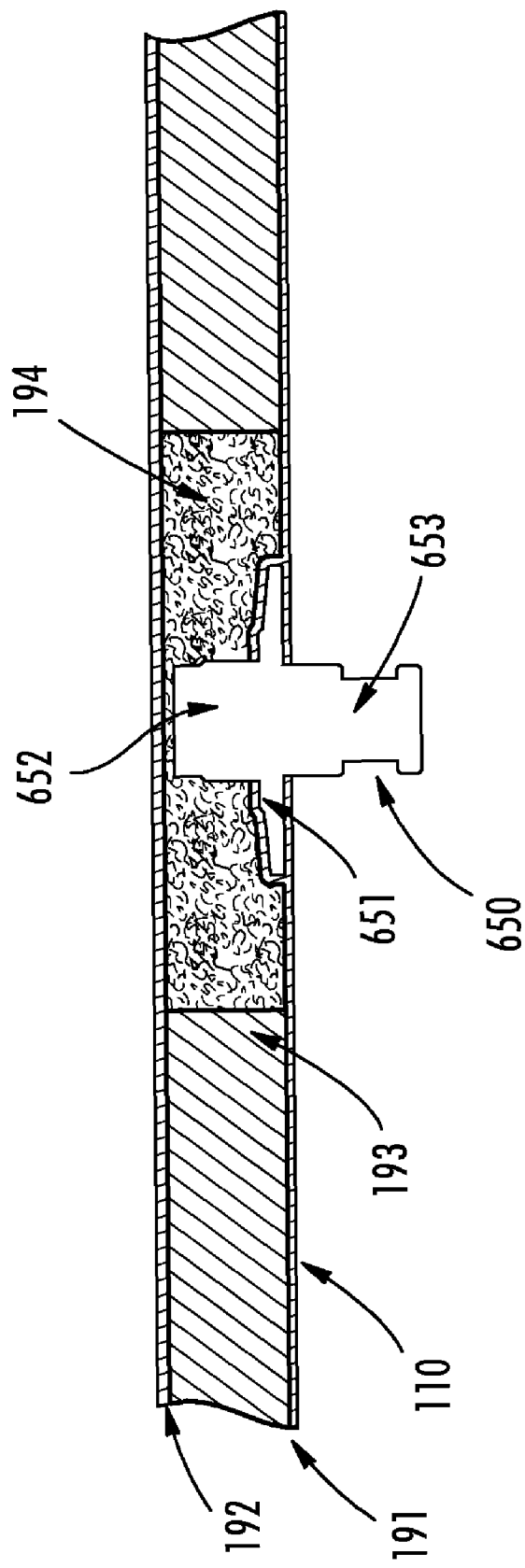
Figure 24:
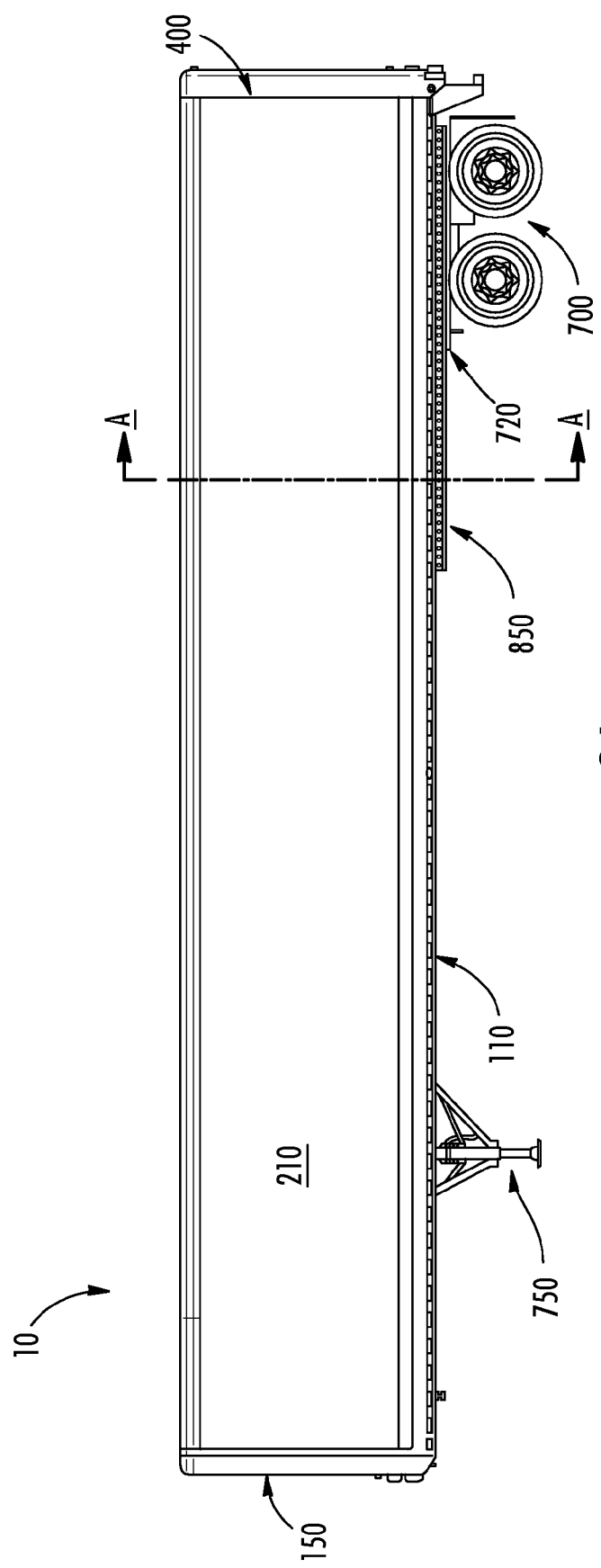
Figure 28:
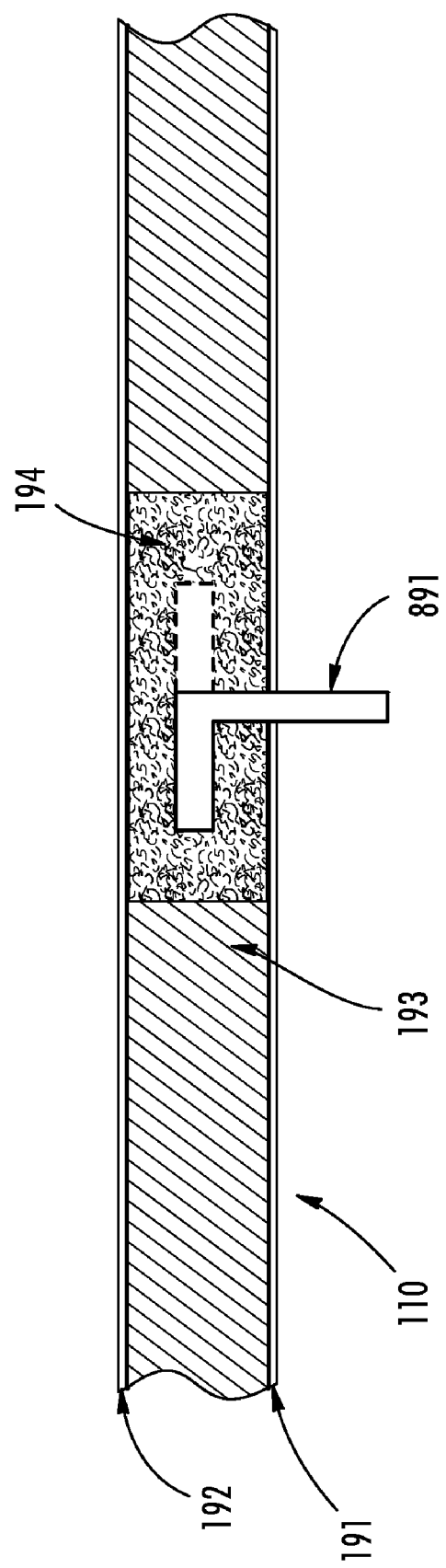

Having thus described the invention in general terms, reference will now be made to the accompanying drawings, which are not necessarily drawn to scale, and wherein:

FIG. 1 is a perspective view of an integral floor unit and front wall assembly according to one embodiment of the invention;

FIG. 2 is a front perspective view of a trailer according to one embodiment of the invention;

FIG. 3 is a rear perspective view of a trailer according to one embodiment of the invention revealing aspects of the bottom of the trailer;

FIG. 4 is a perspective view of an integral floor unit and front wall assembly combined with a rear frame according to embodiments of the invention;

FIG. 5 is a rear view of a rear frame component according to one embodiment of the invention;

FIG. 6 is a front view of a rear frame component according to one embodiment of the invention;

FIG. 7 is a perspective view of an integral floor unit and front wall assembly according to one embodiment of the invention revealing interior aspects of the assembly;

FIG. 8 is an exploded view of a trailer according to one embodiment of the invention;

FIG. 9A is a detail view of one embodiment of the invention illustrating the connection between the floor unit and a sidewall;

FIG. 9B is a detail view of another embodiment of the invention illustrating the connection between the floor unit and a sidewall;

FIG. 9C is a detail view of still another embodiment of the invention illustrating the connection between the floor unit and a sidewall;

FIG. 9D is a detail view of yet another embodiment of the invention illustrating the connection between the floor unit and a sidewall;

FIG. 10 is a rear view of a front wall according to one embodiment of the invention illustrating aspects of the interior of the wall;

FIG. 11 is a cross-section of a top view of a trailer according to one embodiment of the invention illustrating the connection between the front wall and a sidewall;

FIG. 12 is a detail view of the upper rear of front wall according to one embodiment of the invention;

FIG. 13 is a perspective view of a roof according to one embodiment of the invention;

FIG. 14 is a detail view of one embodiment of the invention illustrating the connection between the roof and a sidewall;

FIG. 15 is a rear view of a trailer according to one embodiment of the invention illustrating the interconnection of the integral floor unit and front wall assembly with the roof and the opposing sidewalls;

FIG. 16 is a partially exploded view of a trailer according to one embodiment of the invention illustrating the rear frame removed from the remaining structural components of the trailer;

FIG. 17A is a partial rear view of a trailer according to one embodiment of the invention illustrating the combined rear frame, floor unit, roof, and opposing sidewalls;

FIG. 17B is a partially exploded view of a trailer according to one embodiment of the invention illustrating a reinforcing plate that may be attached to a portion of the rear edge of the floor unit and partially cover the bottom frame component of the rear frame;

FIG. 18 is a bottom perspective view of a trailer according to one embodiment of the invention;

FIG. 19 is a partially exploded view of the front of a trailer according to one embodiment of the invention illustrating a coupler plate and a king pin removed from the trailer;

FIG. 20A is a partial side view of a trailer according to one embodiment of the invention illustrating a king pin and a coupler plate;

FIG. 20B is a detail view of a cross-section along line C-C from FIG. 20A of a portion of the floor unit with the king pin integrally formed within the floor unit;

FIG. 20C is a detail view of a cross-section of a portion of a floor unit according to another embodiment of the invention illustrating the integration of a king pin within a floor unit formed of a specific composite structure;

FIG. 21 is a rear view of a trailer according to one embodiment of the invention;

FIG. 22 is a front view of a trailer according to one embodiment of the invention;

FIG. 23 is a partial bottom view of a trailer according to one embodiment of the invention;

FIG. 24 is a side view of a trailer according to one embodiment of the invention;

FIG. 25 is a cross-section of the trailer according to the embodiment of FIG. 25 along the line A-A;

FIG. 26 illustrates the detail view of the portion labeled C of the trailer according to the embodiment of FIG. 25;

FIG. 27 is a partial side view of a trailer according to one embodiment of the invention illustrating a plurality of suspension plates spaced along one side of the trailer for attachment of a suspension assembly;

FIG. 28 is a detail view of a cross-section along line B-B from FIG. 27 of a floor unit according to one embodiment of the invention illustrating the integration of a hardpoint connector (particularly a suspension plate) within a floor unit formed of a specific composite structure; and FIG. 29 is a side perspective view of the rear portion of a trailer according to one embodiment of the invention particularly illustrating a channel formed in the top component of the rear frame.

DETAILED DESCRIPTION OF THE INVENTION

The present inventions now will be described more fully hereinafter with reference to the accompanying drawings, in which one, but not all embodiments of the inventions are illustrated. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

The present invention is directed to composite structural components that find particular use in the formation of structures for storage and transfer of cargo or any goods generally transported in commerce. In particular embodiments, the invention provides at least one structural component formed of a composite material. As more fully described below, composite materials allow for the formation of structural components that provide strength and durability at a reduced overall weight in comparison to conventional materials, such as steel and wood. The structural components provided by the invention are particularly useful in that they can be of a modular nature. In other words, the components can be designed to be easily and quickly joined together to form the overall desired structure. Moreover, the components can be provided in a variety of sizes to form structures having a variety of sizes.

Some components according to the present invention may be integrally formed, using heat, pressure, adhesive materials, and/or other composite material processing steps that will be appreciated by one skilled in the art such that the component may be provided in substantially one piece, such that few or no fasteners may be required to form the component. The term "integrally formed" or "integrated" as used herein is defined as the joining of one or more structural components, particularly structural components comprising a composite material, to form a unitary structure such that the structural components may not be separated by non-destructive means. For example, two individual components joined through use of rivets alone would not be considered "integrated" according to the invention because the rivets could be removed with only minor, localized structural disturbances, which could be fixed, and the previously riveted components could be re-used for substantially their originally intended purpose. Rather, "integrally formed" components according to the invention are only separable by means that are so destructive as to render the components unusable for their originally intended purposes. According to some embodiments, the component may be integrally formed using a vacuum infusion process wherein the surfaces of the component may be defined by a mold into which material forming the component may be vacuum infused. Furthermore, spacer devices (coated in a mold-release material, for example) may also be introduced into the mold in order to prevent the infusion of material into one or more cavities of the mold that may be desired for defining open spaces (e.g., channels or recesses for later housing various trailer accessory components or for improving specific qualities of the trailer, such as water run-off). In another example, the component may be integrally formed from several pultruded sub-assemblies which may be integrally bonded using heat, pressure, and/or adhesives. In such embodiments, the components are essentially fused into a single, integral structure, and the original, separate components could not be separated and substantially retain their original structure so as to be re-used for the original intended purpose.

According to some embodiments of the present invention, various components useful in the formation of a trailer, such as a floor unit component, a front wall component, a sidewall component, a roof component, a frame component, and a door component, may comprise at least one composite material. For example, in some embodiments, the at least one composite material used to form one or more components may include, but is not limited to: fiberglass; E-glass; S-glass; carbon; balsa; polyurethane foam; metal foil sheet; foam insulating material; composite materials; and combinations thereof. According to one exemplary embodiment, a component according to the invention may comprise a sandwich structure comprising several layers of composite material forming a vacuum infused panel, which may include: inner and outer E-glass skin material, a core material between the skins (e.g., polyurethane (PU) foam), and one or more optional layers (e.g., foil layers) disposed between the inner and outer fiberglass skin.

In order to provide certain desirable properties including, but not limited to, insulating capacity and structural soundness, the various composite components can be of varying thickness. The various components may be, in some embodiments, up to approximately 6 inches thick. However, according to various embodiments of the present invention, the thicknesses of the components may be varied in order to optimize the structural capacity of a trailer formed using the components, any desired insulating quality of a trailer formed using the components, and/or the overall weight of such a trailer. Furthermore, the thicknesses and/or density of the components may also vary and/or taper over the length and width of the individual component.

In certain embodiments, the floor unit component of a trailer according to the invention may particularly be thicker than the other structural components of the trailer. For example, the floor unit may have a thickness of up to about 6 inches, up to about 5 inches, or up to about 4 inches. In specific embodiments, the floor unit may have a thickness of about 2 inches to about 6 inches, about 3 inches to about 5 inches, or about 3.5 inches to about 4.5 inches. In some embodiments, the floor unit has a thickness of about 4 inches.

The front wall, sidewalls, and roof components of the inventive trailer may have varying thicknesses, or they may all have a thickness that is substantially similar. In some embodiments, the front wall, sidewalls, and roof may have a thickness of up to about 4 inches. In specific embodiments, the front wall, sidewalls, and roof may have a thickness of about 0.25 inches to about 3 inches, about 0.5 inches to about 2 inches, or about 0.5 inches to about 1.5 inches. In some embodiments, the front wall, sidewalls, and roof have a thickness of about 1 inch.

As described generally above, certain components according to the invention may be integrally formed from at least one composite material to form a unitary assembly (e.g., an integrated floor unit and front wall assembly). The remaining structural components useful in forming a trailer according to the invention (such as the roof component, sidewall components, rear frame component, and/or doors) may also comprise one or more composite materials chosen for optimal insulating and/or structural characteristics. Furthermore, these structural components may also comprise a variety of other materials, which may include, but are not limited to: fiber reinforced polymer material; fiber reinforced polymer composite; a solid laminate, a pultruded or vacuum-infused sandwich panel (e.g., a panel having upper and lower skins with a core therebetween), or a pultruded panel (e.g., a panel having upper and lower skins with vertical or diagonal webs therebetween). Exemplary core materials include wood, foam, and various types of honeycomb. Exemplary polymer resin materials include thermosetting resins, such as unsaturated polyesters, vinyl esters, polyurethanes, epoxies, phenolics, and mixtures thereof. The fiber reinforcing elements may comprise E-glass fibers, although other reinforcing elements such as S-glass, carbon fibers, KEVLAR®), metal (e.g., metal nano-fibers), high modulus organic fibers (e.g., aromatic polyamides, polybenzamidazoles, and aromatic polyimides), and other organic fibers (e.g., polyethylene and nylon) may be used. Blends and hybrids of such materials may also be used as a reinforcing element. Other suitable composite materials that may be used as the reinforcing element include whiskers and fibers constructed of boron, aluminum silicate, or basalt. Exemplary fiber reinforced panels and methods of making such panels are disclosed in U.S. Pat. No. 5,794,402; U.S. Pat. No. 6,023,806; U.S. Pat. No. 6,044,607; U.S. Pat. No. 6,108,998; U.S. Pat. No. 6,645,333; and U.S. Pat. No. 6,676,785, all of which are incorporated herein in their entirety. In addition, according to some embodiments, the structural components of the present invention may also comprise a pultruded sandwich panel having a core and two laminated skins secured to opposite sides of the core. The core could comprise a number of different materials, including foam or wood (e.g., balsa wood). An exemplary commercial embodiment of a suitable sandwich panel is the TRANSONITE® composite panels available from Martin Marietta Composites of Raleigh, N.C. According to some embodiments, the core of the sandwich panel may be formed of a foam material with a plurality of fibers extending through the foam and both laminated skins, thus connecting the two laminated skins secured to each opposing surface of the foam core. Such a structure could also be formed using other core materials.

In certain embodiments, various components provided according to the invention may be referred to as "structural component". As used herein, the term "structural component" is intended to refer to components that can form part of the major structure of a trailer, railcar, cargo container, or other like container that can be stationary or mobile and is used to store or transport cargo. In particular, a "structural component" according to the invention can mean a floor unit, a front wall, a sidewall, a rear wall, a roof, or a frame. Such components, when combined, form the main components of a structure, such as a trailer. Thus, a "structural component" can be distinguished from other components, such as hardware, that simply interconnects structural components.

One embodiment of a structural component according to the invention is shown in FIG. 1, which shows an integrated composite floor unit and front wall assembly 100, which comprises a floor unit 110 and front wall 150. The floor unit 110 includes a front portion 112, a rear edge 115, and two side portions 120 and 122. The front wall 150 is integrally formed with the floor unit 110 and rises up from the front portion 112 of the floor unit. The front wall 150 includes a top portion 162, and two side portions 170 and 172.

The floor unit component of the present inventive trailer is a unique component that differs greatly from a "floor" as typically recognized in the trailer industry. Typically, the term "floor" indicates a metal or wood surface that is mounted on a frame or frame cross members and on which cargo is laid. For example, a floor in a conventional trailer may simply be one or more pieces of metal or wood (e.g., plywood) that are attached to a frame. According to the present invention, however, a floor component can function as one or more of a chassis, frame, frame cross member, or a floor in the conventional sense. Thus, the term "floor" according to the present invention includes a broader functional meaning beyond simply a piece of plywood sheathing. The present disclosure makes use of the phrase "floor unit" to indicate this variety of structural and functional aspects.

In light of the above, the floor unit of the invention can be described as being both a flooring surface and a chassis (or a "floor/chassis"). In certain embodiments, the use of the floor unit in the inventive trailer can be described as a floor that expressly does not require a separate floor frame.

The integrated composite floor unit and front wall assembly 100 is a unique modular component that forms the basis for a variety of storage and transportation structures. The assembly comprises numerous features that allow it to be easily combined with further structural components to form the desired finished structure. For example, the assembly can be combined with further composite structures (e.g., composite sidewalls and a composite roof) to form a structure that is substantially completely formed of composite materials. In fact, as further described below, the assembly can even be combined with composite frame components. The use of substantially completely composite structural components is particularly beneficial in light of the modular nature of the components. The term "modular nature" means that the composite structural components can be formed with a variety of projections, grooves, notches, and the like that allow the components to fit easily together. Moreover, the modular nature of the components also increases the durability of the finished structure. Of course, the integrated composite floor unit and front wall assembly can also be combined with conventional structural components (e.g., aluminum sidewalls or aluminum roof), if desired, to form a combination structure, or a structure that combines both conventional structural components and composite structural components.

As previously pointed out, an integrated composite assembly according to the invention is not specifically limited to an integrated floor unit and front wall assembly. For example, the invention would also encompass an integrated roof and front wall assembly. It would be expected that a person of skill in the art viewing the disclosure herein around the embodiment of an integrated floor unit and front wall assembly would recognize how to extend that disclosure to prepare other integrated composite assemblies. Accordingly, it should be understood that the disclosure around an integrated floor unit and front wall assembly is meant to be illustrative of the invention and should not be viewed as limiting the scope thereof.

The present invention encompasses a variety of structures including, but not limited to, semi-trailers, railcars, cargo containers, and the like. In a specific embodiment, the invention is particularly directed to semi-trailers, which may be referred to herein as simply a trailer. This is a particularly advantageous embodiment because of the ability to overcome the shipping limitation arising from maximum load limits on U.S. highways. By forming a trailer using an integrated composite floor unit and front wall assembly, particularly in combination with further composite structural components, the trailer has a reduced empty weight in comparison to a trailer formed using only conventional structural components. The weight of a conventional trailer often causes it to weigh out before it cubes out. In other words, there is wasted volume that cannot be filled with cargo without exceeding the weight limit. The lighter composite trailer of the invention can include a greater weight of cargo, thus increasing load efficiency and reducing transportation costs. This means that more cargo can be shipped in a single trailer, thus reducing overall shipping costs.

In one aspect, the invention is thus directed to a storage or shipping container. Of course, it is understood that a storage or shipping container can be maintained in a single place or made mobile. For example, a semi-trailer can be substantially stationary (i.e., when not attached to a truck) or can be mobile when attached to a truck. In light of the advantages described above in relation to trailers, this aspect of the invention is described below particularly in relation to a trailer. It is to be understood that such description is only made in relation to certain embodiments of the invention to meet the description requirements, and the invention should thus not be construed as being limited to only trailers.

One embodiment of a trailer 10 according to the invention is illustrated in FIG. 2, which shows a front, top perspective view and FIG. 3, which shows a rear, bottom perspective view of the trailer 10. As seen in FIG. 2, the trailer 10 comprises an integrated composite floor unit and front wall assembly 100 including a floor unit 110 and a front wall 150, as described above. The trailer 10 further comprises two opposing sidewalls 210 (FIG. 3) and 230, and a roof, 300. The trailer can also comprise a rear frame component 400, which provided a unifying element for connecting the rear portions of the floor unit 110, sidewalls 210 and 230, and the roof 300. Moreover, the rear frame component can be used to hingedly attach one or more doors. As seen in FIG. 3, two doors 470 and 480 are hingedly attached to the rear frame 400. In other embodiments, only a single door could be used. Moreover, the door could be installed on rails (e.g., a roll-up door), which rails could be attached to the roof and/or the rear frame component of the inventive trailer.

The modular nature of the trailer is further illustrated below wherein the interconnection of the various trailer components is described. For example, FIG. 4 shows the connection of the integrated composite floor unit and front wall assembly 100 and the rear frame component 400. This connection is further seen in relation to FIG. 5, which shows a rear perspective view of the rear frame component 400 and FIG. 6, which shows a front perspective view of the rear frame component 400.

The rear frame component 400 comprises a bottom frame component 410, two side frame components 420 and 430, and a top frame component 440. These individual components can be separate components that are combined to form the completed rear frame component 400. In preferred embodiments, the rear frame component 400 is a single piece. For example, the rear frame component can be formed of a composite material and can be molded as a single, uniform component. The use of composite materials to form a molded rear frame component is further beneficial in that one or more recesses can be molded into the rear frame component to allow for the easy inclusion of a variety of additional components. For example, FIG. 5 illustrates four molded-in light fixture recesses 411, 412, 413, and 414. Also illustrated is a molded-in identification plate recess 415. Beneficially, other composite components of the trailer according to various embodiments of the invention can also include one or more recesses adapted for receiving further accessories or other components.

In specific embodiments, the rear frame component 400 is particularly adapted to receive elements from other structural components of the inventive trailer and facilitate the attachment together of the various trailer components, such as the rear edge of the floor unit, the rear edges of the sidewall panels, and the rear edge of the roof panel. In particular, the bottom component 410 of the rear frame 400 can comprise a groove 412 for receiving the rear edge 115 of the floor unit 110. The groove 412 can be formed of a lip 414 on which the floor unit 110 rests and a lower entry frame plate 415, which is positioned above the floor unit. This groove 412 provides a "snap-fit" type connection between the floor unit 110 and the rear frame component 400. The connection can simply comprise a tongue 116 formed on the rear portion 115 of the floor unit 110 sliding into the groove 412 in the rear frame component 400. The tongue 116 can simply be an extension of the floor unit itself or can alternately be an extension of the floor unit that can have a different shape or different dimensions from the floor unit (e.g., be narrower and/or thinner than the remaining floor unit). For example, the tongue 116 can be slightly thinner than the remaining portions of the floor unit such that the floor unit is at the same level with the lower entry frame plate 415 of the rear frame component 400. Such an embodiment is particularly illustrated in FIG. 7.

The rear frame component 400 can also comprise indentations 422 and 432 formed in the side components 420 and 430. The indentations are formed such that the inner surface of the rear edge of the side component is partially cut-out and is thinner in dimension that the remaining portion of the side components. Such a cut-out provides a lip 423 and 433 on each side component on which the rear portion of the respective sidewall can rest. Preferably, at least the side components 420 and 430 of the rear frame component 400 are thicker in dimension than the sidewalls 210 and 230 so that the rear ends of the sidewalls 210 and 230 fit into the indentations 422 and 432 and the inner surface of the sidewalls and the side components of the rear frame are substantially uniform and even. Alternately, the rear portions of the sidewalls 210 and 230 can have different dimensions than the remaining portions of the sidewalls 210 and 230, particularly be thinner in dimension, to fit into the indentations 422 and 432 in the side components 420 and 430 of the rear frame 400 and provide a substantially uniform and even connection.

The rear frame component 400 can still further comprise an indentation 445 formed in the top component 440. The indentation is formed such that the outer surface of the rear edge of the top component is partially cut-out and is thinner in dimension that the remaining portion of the top component. Such a cut-out provides an area on the top component on which the rear portion of the roof can rest. Preferably, at least the top component 440 of the rear frame component 400 is thicker in dimension than the roof 300 so that the rear end of the roof 300 fits into the indentation 445 and the outer surface of the roof and the top component of the rear frame are substantially uniform and even. Alternately, the rear portion of the roof 300 can have different dimensions than the remaining portions of the roof 300, particularly be thinner in dimension, to fit into the indentation 445 in the top component 440 of the rear frame 400 and provide a substantially uniform and even connection.

Another view of the integrated composite floor unit and front wall assembly 100 is illustrated in FIG. 7, which provides a rear perspective view of the assembly. As is evident in the view of this embodiment, the rear edge 115 of the floor unit 110 includes a tongue 116 that has dimensions that are different from the dimensions of the remaining portions of the floor unit 110. In particular, the thickness of the tongue 116 is less than the thickness of the remaining portions of the floor unit 110. As noted previously, this difference in dimensions facilitates the interconnection between the tongue 116 of the floor unit 110 and the groove 412 formed in the bottom component 410 of the rear frame 400.

The modular nature of the trailer according to various embodiments of the present invention is illustrated in FIG. 8, which shows an exploded view of a trailer 10. As more fully described by the following, the various structural components of the trailer 10 fit together via a series of joints, which are designed to be covered and/or structurally reinforced on one or both sides of the joints (i.e., interior to the trailer and/or exterior to the trailer). The trailer may thus particularly be described in relation to having an interior and an exterior. It is understood that the combination of the various structural components results in the formation of a substantially box-shaped or rectangular three-dimensional structure that has an internal or interior volume that can be filled with cargo. Thus, surfaces or components that would be accessible from the interior of the finished trailer can be referred to as interior surfaces or components or as being positioned to be interior to the trailer. Likewise, surfaces or components that would be accessible from the exterior of the finished trailer can be referred to as exterior surfaces or components or as being positioned to be exterior to the trailer. The use of descriptive words, such as interior and exterior, should not be viewed as necessarily limiting the scope of the inventive structure but are used only for clarification and to enable a complete description of the various components of the inventive trailer, particularly when the location of one or more components is to be described. Moreover, such descriptive words may also be used in relation to specific components of an unfinished trailer, and it is understood that the use of such words in relation to a single component rather than a completed trailer can be related to the position of the component in a later, completed trailer.

Trailers according to the present invention include two opposing sidewall panels. In specific embodiments, one or both sidewalls are formed of a composite material. The sidewalls can comprise simply a single panel or can each be the combination of two or more panels. The modular nature of the trailer according to certain embodiments of the present invention allows for the sidewalls to have a highly simplified structure. For example, the sidewalls may comprise a single, substantially flat panel having a designed thickness, which can vary depending upon the material used to form the sidewall and any other desired characteristics, such as insulating properties. The sidewalls can be described as having a top edge 212 or 232, a bottom edge 214 or 234, a front edge 216 or 236, and a rear edge 218 or 238, as illustrated in relation to the sidewalls 210 and 230 shown in FIG. 8.

In certain embodiments, the sidewalls can be formed so that there is no distinguishable difference between the front edge and the rear edge (i.e., the sidewall could be rotated 180° in a horizontal plane and still interconnect with the remaining structural components of the inventive trailer as necessary to form the sidewall for the trailer). Likewise, the sidewalls can be formed so that there is no distinguishable difference between the top edge and the bottom edge (i.e., the sidewall could be rotated 180° in a vertical plane and still interconnect with the remaining structural components of the inventive trailer as necessary to form the sidewall of the trailer). This is another example of the beneficial modular nature of the invention. In light of the above, it is understood that the following description of the sidewalls made in reference to a front edge, rear edge, top edge, and bottom edge is simply provided to allow for complete description of the sidewalls, and the use of the terms "front edge", "rear edge", "top edge", and "bottom edge" in relation to the sidewalls should not be construed as limiting the invention. Moreover, in some embodiments, the sidewalls themselves are interchangeable. Likewise, there may be no structural difference between the interior surface of the sidewall and the exterior surface of the sidewall.

The interaction of a sidewall 230 with the floor unit 110 of the integrated composite floor unit and front wall assembly 100 is illustrated in FIG. 9A-FIG. 9D. As seen therein, the side portion 122 of the floor unit 110 is particularly adapted to receive the bottom edge 234 of the sidewall panel 230. Of course, it is understood that a similar configuration could be present in relation to the other sidewall.

According to the embodiment illustrated in FIG. 9A-FIG. 9D, the side portion 122 of the floor unit 110 has an upward orientation. This orientation can be further described as the side portion 122 including a section that is curved upward or that simply extends upward from the floor unit 110. The upwardly oriented side portions according to the invention can have a length of up to about 24 inches, up to about 18 inches, or up to about 12 inches. In other embodiments, the upwardly oriented side portions of the floor unit can have a length of about 3 inches to about 24 inches, about 3 inches to about 18 inches, about 3 inches to about 12 inches, about 6 inches to about 18 inches, or about 6 inches to about 12 inches. The length of the upwardly oriented side portions of the floor unit is measured from the top surface of the floor unit to the terminal end of the upwardly oriented side portion. Preferably, the upwardly oriented side portions of the floor unit are oriented in relation to the floor unit to have an angle θ of about 90° so that the sidewalls of the trailer are oriented perpendicular to the floor unit. Although it is not necessarily required that the side portions of the floor unit have an upward orientation, such orientation is particularly useful for facilitating the modular nature of the inventive trailer. Moreover, the inclusion of the upwardly oriented side portions maximizes the overall portion of the trailer that can be formed as a single, integrated piece. In other words, the upwardly oriented side portions of the floor unit decrease the overall height of the sidewall, which beneficially allows for the sidewall to be prepared as an overall smaller single piece, which both improves the manufacturability of the sidewall and increases the structural strength of the sidewall.

As illustrated in FIG. 9A, the upwardly oriented side portion 122 of the floor unit 110 aligns with the bottom edge 234 of the sidewall 230. Thus, a lap joint 280 is formed. This lap joint 280 is conveniently made possible because of the specific structure of the upwardly oriented side portion 122 of the floor unit 110. In particular, the upwardly oriented side portion 122 of the floor unit 110 comprises a first terminal edge 140 that is jointed with the bottom edge 234 of the sidewall 230 (i.e., the first terminal edge of the upwardly oriented side portion is in physical connection with or is abutting the bottom edge of the sidewall). The upwardly oriented side portion 122 of the floor unit 110 also comprises an overhang component 142 that extends beyond the first terminal edge 140 of the upwardly oriented side portion 122 of the floor unit 110 and covers the joint 280 between the first terminal edge 140 of the upwardly oriented side portion 122 of the floor unit 110 and the bottom edge 234 of the sidewall 230. This overhang component 142 is located on the exterior of the trailer and can also be described as a lap extension. Moreover, the lap extension can be described in relation to an end thereof, which can be termed the second terminal edge 143 of the upwardly oriented side portion 122 of the floor unit 110, this second terminal edge 143 being the portion of the upwardly oriented side portion 122 that is most distal to the floor unit 110. This structure can also be seen in FIG. 7, which illustrates the upwardly oriented side portion 120 and 122, the first terminal edge 130 and 140, and the overhang component 132 and 142. This view also illustrates how the first terminal edge 130 and 140 can extend substantially the entire length of the floor unit 110, particularly substantially the entire length of the upwardly oriented side portion 120 and 122 of the floor unit 110, to receive the bottom edge of the sidewall.

As illustrated in FIG. 9A, the lap joint is non-flush; however, the invention is not so limited. For example, the sidewall 230 could include a cut-out section for receiving the overhang component 142 such that the exterior surface of the overhang component 142 (and the upwardly oriented side portion 122 of the floor unit 110 generally) is flush with the exterior surface of the sidewall 230.

In an alternate embodiment, illustrated in FIG. 9B, the joint formed at the connection of the sidewall 230 and the upwardly oriented side portion 122 of the floor unit 110 may take on a tongue and groove configuration. Specifically, the first terminal edge 140 of the upwardly oriented side portion 122 of the floor unit 100 can be shaped to have a groove formed therein. Such groove can extend substantially the entire length of the upwardly oriented side portion 122 of the floor unit 110. Alternately, a plurality of grooves of discrete length could be formed along the length of the upwardly oriented side portion 122 of the floor unit 110. To interact with the grooves according to the these embodiments, the bottom edge 234 of the sidewall 230 can be shaped to have a tongue 235 that is dimensioned to fit into the groove formed in the upwardly oriented side portion 122 of the floor unit 110. Preferably, the tongue 235 extends along the length of the sidewall 230 such that the length of the tongue 235 substantially corresponds to the length of the tongue formed at the first terminal end 140 of the upwardly oriented side portion 122 of the floor unit 110. In embodiments comprising a plurality of grooves of discrete length, the bottom edge 234 of the sidewall 230 can comprise a plurality of tongues 235 of discrete length that align with and engage the plurality of grooves of discrete length formed in the upwardly oriented side portion 122 of the floor unit 110. Of course, any jointing method known in the art could be used according to the invention.

In certain embodiments, reinforcing means can be provided in the area of the joint formed where the bottom edge of the sidewall meets the terminal edge of the upwardly oriented side portion of the floor unit. For example, the first terminal edge 140 of the upwardly oriented side portion 122 of the floor unit and the bottom edge 234 of the sidewall 230 could be adhered through the use of appropriate polymers, resins, glues, or the like. This may be particularly beneficial in further embodiments, such as illustrated in FIG. 9C. As illustrated therein, the floor unit 110 and the sidewall 110 are joined by attaching a portion of the lower, interior surface of the wall to at least a portion of the exterior surface of the upwardly oriented side portion 122 of the floor unit 110. In such embodiments, the noted surfaces function as faying surfaces, and the two faying surfaces can be attached using a variety of means, including (but not limited to) bonding, bolting, or both bonding and bolting. In another embodiment illustrated in FIG. 9D, the faying surface provided on the side portion of the floor unit 110 is increased by altering the structure of the floor unit to include both an upwardly oriented side portion 122 and a downwardly oriented side portion 123. This increases the overall surface contact area between the floor unit and the sidewall.

In specific embodiments, the reinforcing means can comprise further structural components. As illustrated in FIG. 9A, a lower joint plate 510 is attached at an upper portion thereof to the interior surface of the sidewall panel 230 and at a lower portion thereof to the interior surface of the upwardly oriented side portion 122 of the floor unit 110. As illustrated in FIG. 9A, the lower joint plate 510 is located such that a bottom edge of the lower joint plate 510 is in connection with the upwardly facing surface of the floor unit 110. Such location is not required; rather, it is only desirable that the lower joint plate 510 be positioned such that it covers the lap joint 280 and can be attached to one or both of the sidewall 230 and the upwardly oriented side portion 122 of the floor unit 110. A lower joint plate 510 is also illustrated in the embodiment shown in FIG. 9B.

The lower joint plate 510 can be formed from any material useful for providing structural support to the lap joint 280, such as preventing the sidewall 230 from slipping inwardly and losing contact with the first terminal edge 140 of the upwardly oriented portion 122 of the floor unit 110. For example, the lower joint plate could comprise metal, wood, or synthetic materials, such as plastics. In a preferred embodiment, the lower joint plate is formed of a composite material.

The lower joint plate can be attached to the sidewall and the upwardly oriented portion of the floor unit by a variety of means. For example, the components could be adhered, such as through the use of appropriate polymers, resins, or glues. Further attachment means could include the use of mechanical fasteners, such as bolts or the like. Moreover, a combination of attachment means could be used, including both bonding and using mechanical fasteners.

The dimensions of the lower joint plate can vary. In the exploded view provided in FIG. 8, the lower joint plate 510 (and 560 for the opposing sidewall 210) extends substantially the entire length of the sidewall 230 (or 210) (i.e., from approximately the point where the sidewall 230 (or 210) meets the front wall 150 to approximately the point where the sidewall 230 (or 210) meets the rear frame 400). This length can be somewhat shorter; however, it is preferred that the lower joint plate 510 (or 560) substantially covers the entire lap joint formed where the bottom edge of the sidewall meets the first terminal edge of the upwardly oriented portion of the floor unit. In some embodiments, the length of the joint plate can be described as substantially corresponding to the length of the floor unit or substantially corresponding to the length of the sidewall.

The width of the lower joint plate (i.e., the height of the plate measured from the bottom edge to the top edge thereof) can also vary. In specific embodiments, the joint plate has a width of about 1 inch to about 18 inches. In other embodiments, the joint plate has a width of about 1 inch to about 12 inches, about 2 inches to about 10 inches, about 4 inches to about 10 inches, or about 4 inches to about 8 inches. The thickness of the lower joint plate can vary based upon the type of material used. In some embodiments, the lower joint plate has a minimum thickness of about 0.03 inches, or an average thickness of about 0.03 inches to about 3 inches, about 0.05 inches to about 2 inches, or about 0.1 inches to about 1 inch. In one embodiment, the thickness is about 0.145 inches.

As seen in FIG. 8, and as more fully described below, the trailer of the invention can include additional joint plates, such as upper joint plate 512 and 562, front joint plate 514 and 564, and rear joint plate 516 and 566. In some embodiments, these joint plates can be separate components and can be separately incorporated into the inventive trailer 10. In other embodiments, the joint plates on a single side of the trailer can be combined to form a sidewall frame that can be attached to the interior surface of the sidewall. In such embodiments, the frame preferentially comprises an exterior border that extends beyond the edges of the sidewall panel such that, when the sidewall panel is connected with the floor unit (as described above) and with the front wall, roof, and rear frame (as described below), the sidewall frame overlaps joints formed between the sidewall panel and the floor unit, front wall, roof, and rear frame. As illustrated in FIG. 8, the joint plates are separate components. As such, the separate joint plates could be combined to form a single, unitary sidewall frame. Alternately, the sidewall frame could be originally formed as a single, unitary component. In either embodiment, it is preferable for the joint plates (or the sidewall frame) to comprise a composite material.

In certain embodiments, the front wall component of the inventive trailer is designed similarly to the floor unit component to engage the sidewalls and further facilitate the modular nature of the trailer. As seen in FIG. 10, the front wall 150 of the integrated composite floor unit and front wall assembly 100 includes a top portion 162 and two side portions 170 and 172, which can particularly have a rearward orientation. This orientation can be further described as the side portions 170 and 172 including a section that is curved toward the rear of the trailer or that simply extends rearward from the front wall 150. The rearwardly oriented side portions according to the invention can have a length of up to about 24 inches, up to about 18 inches, or up to about 12 inches. In other embodiments, the rearwardly oriented side portions of the front wall can have a length of about 3 inches to about 24 inches, about 3 inches to about 18 inches, about 3 inches to about 12 inches, about 6 inches to about 18 inches, or about 6 inches to about 12 inches. The length of the rearwardly oriented side portions of the front wall is measured from the interior surface of the front wall to the terminal end of the rearwardly oriented side portion. Preferably, the rearwardly oriented side portions of the front wall are oriented in relation to the front wall to have an angle θ of about 90° so that the sidewalls of the trailer are oriented perpendicular to the front wall. Although it is not necessarily required that the side portions of the front wall have a rearward orientation, such orientation is particularly useful for facilitating the modular nature of the inventive trailer. Moreover, the inclusion of the rearwardly oriented side portions maximizes the overall portion of the trailer that can be formed as a single, integrated piece. In other words, the rearwardly oriented side portions of the front wall decrease the overall length of the sidewall, which beneficially allows for the sidewall to be prepared as an overall smaller single piece, which increases the structural strength of the sidewall.

The interaction of a sidewall 230 with the front wall 150 of the integrated composite floor unit and front wall assembly 100 is particularly illustrated in the cross-section shown in FIG. 11, which is taken at approximately the midpoint of the height of a trailer according to an embodiment of the invention. Thus, from a downward perspective, such as seen in FIG. 11, the side portion 172 of the front wall 150 is particularly adapted to receive the front edge 236 of the sidewall panel 230. Of course, it is understood that a similar configuration could be present in relation to the other sidewall 210 and the corresponding side portion 170 of the front wall 150.

As illustrated in FIG. 11, the rearwardly oriented side portion 172 of the front wall 150 aligns with the front edge 236 of the sidewall 230 to form a lap joint 285. This lap joint 285 is made possible because of the specific structure of the rearwardly oriented side portion 172 of the front wall 150. In particular, the rearwardly oriented side portion 172 of the front wall 150 comprises a first terminal edge 180 that is jointed to the front edge 236 of the sidewall 230 (i.e., the first terminal edge of the rearwardly oriented side portion is in physical connection with or is butted up against the front edge of the sidewall). The rearwardly oriented side portion 172 of the front wall 150 also comprises an overhang component 182 that extends beyond the first terminal edge 180 of the rearwardly oriented side portion 172 of the front wall 150 and covers the joint 285 between the first terminal edge 180 of the rearwardly oriented side portion 172 of the front wall 150 and the front edge 236 of the sidewall 230. This overhang component 182 is located on the exterior of the trailer and can also be described as lap extension. Moreover, the lap extension can be described in relation to an end thereof, which can be termed the second terminal edge 183 of the rearwardly oriented side portion 172 of the front wall 150, this second terminal edge 183 being the portion of the rearwardly oriented side portion 172 that is most distal to the front wall 150. As seen in FIG. 10, the first terminal edge 180 can extend substantially the entire length of the front wall 150, particularly substantially the entire length of the rearwardly oriented side portion 172 of the front wall 150, to receive the front edge of the sidewall. In specific embodiments, the overhang component from the floor unit and the front wall may be formed to be coextensive. In other words, the overhang components may flow seamlessly from the overhang component of the floor unit to the overhang component of the front wall.

Of course, as described above, the joint formed by the meeting of the rearwardly oriented side portion 172 and the front edge 236 of the sidewall 230 can take on various conformations. Reference is made to FIG. 9B, FIG. 9C, and FIG. 9D, as it is understood that all such embodiments would likewise apply to any of the joints described herein formed by the meeting to two or more structural components.

In certain embodiments, reinforcing means can be provided in the area of the lap joint 285 on the interior of the trailer. For example, the first terminal edge 180 of the rearwardly oriented side portion 172 of the front wall 150 and the front edge 236 of the sidewall 230 could comprise a series of corresponding slots and tabs that would facilitate an interlocking of the components. Further, the first terminal edge 180 of the rearwardly oriented side portion 172 of the front wall 150 and the front edge 236 of the sidewall 230 could be adhered through the use of appropriate polymers, resins, glues, or the like. Moreover, in specific embodiments, the reinforcing means can comprise further structural components. As described above in relation to the lap joint formed at the connection of the bottom edge of the sidewall with the side portion of the floor unit, a joint plate could be included on the interior of the trailer. In relation to the connection between the front edge of the sidewall and the front wall, a front joint plate 514 could be used, as illustrated in FIG. 8. The front joint plate 514 can be attached to one or both of the sidewall and the rearwardly oriented portion of the front wall. Such attachment could be as described previously. The front joint plate can also be formed from any material previously noted.

The dimensions of the front joint plate can vary. In the exploded view provided in FIG. 8, the front joint plate 514 (and 564 for the opposing sidewall 210) extends substantially the entire height of the sidewall 230 (or 210) (i.e., from approximately the point where the sidewall 230 (or 210) meets the floor unit 110 to approximately the point where the sidewall 230 (or 210) meets the roof 300). This length can be somewhat shorter; however, it is preferred that the front joint plate 514 (or 564) substantially covers the entire lap joint formed where the front edge of the sidewall meets the first terminal edge of the rearwardly oriented portion of the front wall. In some embodiments, the length of the joint plate can be described as substantially corresponding to the height of the front wall or substantially corresponding to the height of the sidewall. The remaining dimensions of the joint plate can be as otherwise described herein.

In certain embodiments, the top portion 162 of the front wall 150 comprises an indentation 163, that can be formed such that the outer surface of the top portion 162 of the front wall 150 is partially cut-out and is thinner in dimension that the remaining areas of the top portion 162 of the front wall 150. Such a cut-out provides an area on the top portion 162 of the front wall 150 on which the front portion of the roof can rest. Preferably, at least the top portion 162 of the front wall 150 is thicker in dimension than the roof 300 so that the front end of the roof 300 fits into the indentation 163 and the outer surface of the roof and the top portion of the front wall are substantially uniform and even. Alternately, the front portion of the roof 300 can have different dimensions than the remaining portions of the roof 300, particularly be thinner in dimension, to fit into the indentation 163 in the top portion 163 of the front wall 150 and provide a substantially uniform and even connection.

The indentation 163 in the top portion 162 of the front wall 150 can be further seen in FIG. 12, which provides a more detailed view of this portion of the front wall 150. Moreover, in the embodiment illustrated in FIG. 12, it is seen that the top portion 162 of the front wall 150 can be somewhat sloped. For example, the top portion 162 of the front wall 150 can have a greater height near the middle 164 of the top portion 162 and can slope downward from the middle 164 to the sides 165 and 166 of the top portion 162. The provision of such a slope is particularly beneficial when the roof of the trailer has a similar slope, which can facilitate drainage from the roof and provide improved aerodynamic aspects to the trailer. In other embodiments, the roof can have a substantially curved shape.

A roof 300 according to one embodiment of the invention is shown in FIG. 13. As seen therein, the roof 300 comprises a front edge 310, a rear edge 320, and two side portions 350 and 370. In certain embodiments, the roof can be formed so that there is no distinguishable difference between the front edge and the rear edge (i.e., the roof could be rotated 180° in a horizontal plane and still interconnect with the remaining structural components of the inventive trailer as necessary to form the roof for the trailer). This is another example of the beneficial modular nature of the invention. In light of the above, it is understood that the following description made in reference to a front edge and a rear edge is simply provided to allow for complete description of the roof, and the use of the terms "front edge" and "rear edge" in relation to the roof should not be construed as limiting the invention.

In one embodiment, a roof component of the invention particularly comprises one or more molded-in components. For example, the roof can include one or more channels formed therein to facilitate removal of liquid (e.g., rain or melting snow) from the roof. In a specific embodiment, a roof 300 comprises a channel 305 extending substantially side-to-side across the roof 300. In other embodiments, one or more channels could extend substantially from the front to the back of the roof 300. In other embodiments, the roof could include additional channels extending in a variety of directions to facilitate flow of liquid off of the roof. Such channels could also be formed in other components of the inventive trailer. For example, as seen in FIG. 29, a channel 307 may be formed in the top frame component 440 of the rear frame 400.

The interaction of a sidewall 230 with the roof 300 is illustrated in the detailed view provided in FIG. 14. As seen therein, the side portion 350 of the roof 300 is particularly adapted to receive the top edge 232 of the sidewall panel 230. Of course, it is understood that a similar configuration could be present in relation to the other sidewall 210 and its connection with the roof 300.

According to the embodiment illustrated in FIG. 14, the side portion 350 of the roof 300 has a downward orientation. This orientation can be further described as the side portion 350 including a section that is curved downward or that simply extends downward from the roof 300. The downwardly oriented side portions according to the invention can have a length of up to about 24 inches, up to about 18 inches, or up to about 12 inches. In other embodiments, the downwardly oriented side portions of the roof can have a length of about 3 inches to about 24 inches, about 3 inches to about 18 inches, about 3 inches to about 12 inches, about 6 inches to about 18 inches, or about 6 inches to about 12 inches. The length of the downwardly oriented side portions of the roof is measured from the bottom surface of the roof (i.e., interior to the trailer) to the terminal end of the downwardly oriented side portion. Preferably, the downwardly oriented side portions of the roof are oriented in relation to the roof to have an angle θ of about 90° so that the sidewalls of the trailer are oriented perpendicular to the roof. Although it is not necessarily required that the side portions of the roof have a downward orientation, such orientation is particularly useful for facilitating the modular nature of the inventive trailer.

As illustrated in FIG. 14, the downwardly oriented side portion 350 of the roof 300 aligns with the top edge 232 of the sidewall 230, thus forming a lap joint 380. This lap joint 380 is conveniently made possible because of the specific structure of the downwardly oriented side portion 350 of the roof 300. In particular, the downwardly oriented side portion 350 of the roof 300 comprises a first terminal edge 352 that is jointed to the top edge 232 of the sidewall 230 (i.e., the first terminal edge of the downwardly oriented side portion is in physical connection with or is butted up against the top edge of the sidewall). The downwardly oriented side portion 350 of the roof 300 also comprises and an overhang component 354 that extends beyond the first terminal edge 352 of the downwardly oriented side portion 350 of the roof 300 and covers the joint 380 between the first terminal edge 352 of the downwardly oriented side portion 350 of the roof 300 and the top edge 232 of the sidewall 230. This overhang component 354 is located on the exterior of the trailer and can also be described as a lap extension. Moreover, the lap extension can be described in relation to an end thereof, which can be termed the second terminal edge 356 of the downwardly oriented side portion 350 of the roof 300, this second terminal edge 356 being the portion of the downwardly oriented side portion 350 that is most distal to the roof 350. This structure can also be seen in FIG. 13, which illustrates the downwardly oriented side portion 350 and 370, the first terminal edge 352 and 372, and the overhang component 354 and 374. The first terminal edge 352 and 372 can extend substantially the entire length of the roof 300, particularly substantially the entire length of the downwardly oriented side portion 350 and 370 of the roof 300, to receive the top edge of the sidewall. Of course, as described above, other joints could be formed instead of a lap joint, including a tongue and groove joint.

In certain embodiments, reinforcing means can be provided in the area of the lap joint 380 on the interior of the trailer. For example, the first terminal edge 352 of the downwardly oriented side portion 350 of the roof and the top edge 232 of the sidewall 230 could comprise a series of corresponding slots and tabs that would facilitate an interlocking of the components. Further, the first terminal edge 352 of the downwardly oriented side portion 350 of the roof and the top edge 232 of the sidewall 230 could be adhered through the use of appropriate polymers, resins, glues, or the like. Moreover, the adhering means could be used along the interface between the interior surface of the overhang component 354 and the exterior face of the adjoining area of the sidewall. Such further adhering means would also be applicable to all similar joints in the inventive trailer (e.g., the overhang portion at the joints between the front wall and the sidewalls and the joints between the floor unit and the sidewalls). In specific embodiments, the reinforcing means can comprise further structural components. As illustrated in FIG. 14, an upper joint plate 512 is attached at a lower portion thereof to the interior surface of the sidewall panel 230 and at an upper portion thereof to the interior surface of the downwardly oriented side portion 350 of the roof 300. It is desirable that the upper joint plate 512 be positioned such that it covers the lap joint 380 and can be attached to one or both of the sidewall 230 and the downwardly oriented side portion 350 of the roof 300. Such attachment could be as described previously. The upper joint plate can also be formed from any material previously noted.

The dimensions of the upper joint plate can vary. In the exploded view provided in FIG. 8, the upper joint plate 512 (and 562 for the opposing sidewall 210) extends substantially the entire length of the sidewall 230 (or 210) (i.e., from approximately the point where the sidewall 230 (or 210) meets the front wall 150 to approximately the point where the sidewall 230 (or 210) meets the rear frame 400). This length can be somewhat shorter; however, it is preferred that the upper joint plate 512 (or 562) substantially covers the entire lap joint formed where the top edge of the sidewall meets the first terminal edge of the downwardly oriented portion of the roof. In some embodiments, the length of the joint plate can be described as substantially corresponding to the length of the roof or substantially corresponding to the length of the sidewall. Other dimensions of the joint plate can be as otherwise described herein.

Although the upper frame plate and the lower frame plate are described above separately, it is understood that in specific embodiments, the two components may be substantially identical in construction and dimension. Accordingly, the upper and lower frame plates could be interchangeable (i.e., not identical but similar enough to function as either the front frame plate or the rear frame plate). In other words, the frame plates could be of a single construction that could be used as one or both of the upper frame plate and lower frame plate. Similarly, the front frame plate and the rear frame plate could likewise be identical or interchangeable In combination, the integrated floor unit and front wall assembly 100 (formed of the floor unit 110 and front wall 150), the two sidewalls 210 and 230, and the roof 200 form the shell of the trailer 10 illustrated in the embodiment of FIG. 15. As seen in this rear view, the combined components form a container that is closed on the front, top, bottom, and sides and that is substantially rectangular in cross section.

As further illustrated in FIG. 16, these components can also be combined with the rear frame component 400, which is particularly beneficial to provide added strength and support to the rear portion of the trailer 10. The modular nature of the inventive trailer is further evident in this embodiment. As described previously in relation to FIG. 6 in particular, the rear frame component 400 includes a number of grooves, indentations, ledges, and the like effective to receive specific elements of the floor unit 110, sidewalls 210 and 230, and roof 300. In FIG. 16, the rear frame component 400 is illustrated slightly removed from the remaining portions of the trailer. When connected with the remaining portions of the trailer, though, the tongue 116 of the floor unit 110 interacts with the groove formed on the front portion of the bottom component 410 of the rear frame 400. Similarly, the rear edges 218 and 238 of the sidewalls 210 and 230 engage the indentations formed in the side components 420 and 430 of the rear frame 400. For example, as seen in FIG. 16, the rear edge 238 of the sidewall 230 neatly engages the indentation 432 in the side component 430 of the rear frame 400. Still further, the rear edge 320 of the roof 300 engages the indentation formed on the top component 440 of the rear frame 400. As previously described, in some embodiments, the indentation on the top frame component 440 functions as a ledge upon which the rear edge 320 of the roof 300 rests.

A partial rear view of the trailer 10 according to one embodiment with the rear frame 400 attached is illustrated in FIG. 17A. In this view, the various indentations, grooves, and the like formed in the rear frame 400 to receive further structural components are fully engaged with the other structural components. For example, the indentation 432 in the side component 430 of the rear frame 400 (FIG. 16) is no longer visible but is engaged by the rear edge 238 of the sidewall 230. As further seen in FIG. 17A, the upper frame plate 512 slightly overlaps the rear frame 400, but the lower frame plate 510 does not overlap the rear frame 400. It is understood that, in other embodiments, the upper frame plate could be shorter (or shifted toward the front of the trailer) so as to not overlap the rear frame, and/or the lower frame plate could be longer (or shifted toward the rear of the trailer) so as to overlap the rear frame plate. Still further, a rear frame plate (e.g., component 516 or 566 in FIG. 8) could be present and at least partially cover the area wherein the rear edge of the sidewall engages the rear frame.

In some embodiments, it can be beneficial for a trailer according to the invention to include a reinforcing plate on the floor unit and or on the bottom component of the rear frame component. For example, FIG. 17B illustrates a partially exploded view of the rear portion of a trailer. As seen therein, a reinforcing plate 900 can be shaped to cover a portion of the rear surface of the floor unit 110. The reinforcing plate 900 can also be shaped to cover at least a portion of the bottom component 410 of the rear frame 400. In the embodiment illustrated, the reinforcing plate 900 is angled (e.g., an approximately 90° angle) to partially wrap the bottom component 410 of the rear frame 400, thus at least partially covering two surfaces of the bottom component 410 of the rear frame 400. Such reinforcing plate can be formed from a metal material, such as steel or aluminum. As illustrated in FIG. 17B, the reinforcing plate 900 includes apertures 910, 911, 912, and 913 for receiving additional components, such as lights, and the reinforcing plate can be formed to incorporate other components, as may be desirable. The reinforcing plate can also be useful to reinforce attachment of other trailer components. For example, a bumper 800 may be attached to the bottom surface of the floor unit near the rear of the floor unit, and the bumper may be bolted through the floor unit and also through the reinforcing plate.

In certain embodiments, the components described heretofore substantially comprise the structure of a trailer according to the invention. Of course, in further embodiments, a trailer according to the present invention can comprise one or more further components. For example, in one embodiment, as illustrated in FIG. 18, a trailer 10 according to the invention can include a coupler plate 610 attached to the exterior of the integrated floor unit and front wall assembly 100. Preferably, the coupler plate 610 is attached near the front of the integrated floor unit and front wall assembly 100, and the coupler plate 610 may be located completely on the floor unit 110 or may be attached to both the floor unit 110 and the front wall 150. In the embodiment shown in FIG. 18, the coupler plate 610 is attached to both the floor unit 110 and the front wall 150 and is substantially molded to the shape and contour of the integrated floor unit and front wall assembly 100 at the area of attachment.

The coupler plate can be particularly useful to provide increased strength at the area of attachment to the trailer. For example, in some embodiments, the trailer of the invention can include a component useful for coupling the trailer to a vehicle, such as the tractor portion of a tractor trailer (e.g., securing the trailer to a fifth wheel of a tractor or other prime mover). The coupler plate can be formed of any material that provides sufficient strength and rigidity to facilitate the function of the coupler plate to provide increased strength. In particular, the coupler plate is formed of a material useful to protect the trailer floor unit from being damaged by repeated friction between the floor unit and, for example, a fifth wheel, when coupled using a king pin. In specific embodiments, the coupler plate comprises a metal or metal alloy, particularly steel.

In the embodiment illustrated in FIG. 18, the trailer 10 further comprises a king pin 650 for securing the trailer to a vehicle. The king pin 650 can be attached to the trailer by a variety of means. For example, in one embodiment, the king pin 650 is attached directly to the metal coupler plate 610, such as by welding a metal king pin to a metal coupler plate. In another embodiment, the king pin 650 can be attached to the floor unit 110 of the integrated floor unit and front wall assembly 100. For example, FIG. 19 illustrates an embodiment according to the invention wherein the floor unit 110 of a trailer 10 includes an aperture 670 for receiving a portion of the king pin 650. According to such embodiments, the king pin 650 can be inserted through the aperture 670 and be connected to the floor unit 110 of the trailer 10. The coupler plate 610, if present, can comprise a corresponding aperture 612 through which the kin pin 670 can extend. The aperture 612 of the coupler plate 610 could be sized so that the king pin 650 snugly fits through the coupler plate aperture 612, and the coupler plate can function to provide further support for the connection of the king pin 650 to the floor unit 110 of the trailer 10.

In specific embodiments, a king pin can be integrally formed into a floor unit component according to the invention. For example, FIG. 20A illustrates a trailer incorporating an integrally formed king pin 650 and a coupler plate 610. FIG. 20B illustrates a detail view of a cross-section along line C-C from FIG. 20A showing the floor unit 110 including a king pin 650. Also illustrated in FIG. 20B is a coupler plate 610 attached to the exterior of the floor unit 110 with the king pin 650 extending through an aperture 612 in the coupler plate 610. In such an embodiment, the king pin can be placed into a floor unit mold, and the composite material used to make the floor unit can be placed into the mold to form the floor unit with the king pin integrally formed therein. When the floor unit comprises some manner of sandwich panel, as described previously, that includes a core material, the core material may be pre-cut to fit around the king pin. After the core material is included in the mold, the entire structure may be infused with resin or other infusing material so that the king pin becomes formed within the floor unit (i.e., is integrally formed within the floor unit).

One preferred embodiment is illustrated in FIG. 20C, which also illustrates a detail view of a floor unit 110 with a king pin 650 integrally formed therein. In this embodiment, the area around the king pin 650 is further reinforced with an additional reinforcing plug 194, which can particularly comprise a composite material. In FIG. 20C, the additional reinforcing plug is a resin plug. Of course, other types of reinforcing materials (including wood or metal) could be used around the king pin so long as the material is useful for increasing the strength and stability of the king pin as integrally molded within the floor unit component. In a particular embodiment, the reinforcing plug comprises a resin material combined with a defined fiber content, such as about 10% to about 50% by weight (based on the overall weight of the reinforcing plug), about 15% to about 50% by weight, about 20% to about 50% by weight, about 20% to about 45% by weight, about 20% to about 40% by weight, or about 25% to about 35% by weight fiber. In certain embodiment, the resin comprises the remaining weight of the reinforcing plug minus the fiber content. In specific embodiment, the resin comprises about 50% to about 90% by weight, about 50% to about 85% by weight, about 50% to about 80% by weight, about 55% to about 80% by weight, about 60% to about 80% by weight, or about 65% to about 75% by weight of the reinforcing plug, based on the overall weight of the plug.

According to such embodiments, the present invention thus comprises a composite structural component, such as a composite floor unit, having a hardpoint connector integrally formed therein. As used herein, a "hardpoint connector" is understood to refer to any structure that is designed to function as a rigid anchor, such as for attachment of a separate trailer component or to rigidly attach another apparatus to the trailer of the invention. In particular, the hardpoint connector can facilitate connection of the floor unit component of a trailer to an additional piece of hardware (e.g., a bogey or suspension assembly, a bumper, or a landing apparatus) or to a vehicle, such as a king pin for attaching a trailer to a fifth wheel. In particular embodiments, the composite structural component comprises a composite component material and a hardpoint connector integrally formed therein. In other embodiments, the composite component comprises a composite component material, the hardpoint connector, and a reinforcing plug surrounding the hardpoint connector and integrally formed within the composite structural component. In some embodiments, the terms "hardpoint connector" and "rigid anchor device" may be interchangeable.

The present invention also comprises methods of preparing a composite structural component having a hardpoint connector integrally formed therein. In one embodiment, the method of preparing the composite component comprises providing a mold, placing a hardpoint connector into the mold, and placing a composite material into the mold with the hardpoint connecter therein such that the hardpoint connector is integrally formed within the composite component.

The composite component having a hardpoint connector integrally formed therein is particularly described below, with methods of preparation thereof, in specific relation to a composite floor unit. This merely describes specific embodiments of this aspect of the invention and should not be construed as limiting the invention. Rather, any composite structural component could be formed with a hardpoint connector formed therein, as described according to the invention.

In certain embodiments, a floor unit component according to the invention can be formed of a sandwich panel comprising a lower skin 191, an upper skin 192, and a core material 193 disposed between the upper and lower skins. FIG. 20C particularly illustrates a floor unit 110 according to this embodiment having a king pin 650 integrally formed therein. In particular, the king pin 650 can be described as having a rim 651, an upper body 652, and a lower body 653. In specific embodiments, the upper body 652 and the rim 651 may be formed within the trailer floor unit 110, and the lower body 652 may extend or protrude from the floor unit and be accessible from the exterior of the trailer. Thus, the upper body and the rim of the king pin may particularly be formed within the trailer floor unit.

In one embodiment, the floor unit can be made by the following steps: (a) placing a king pin within a floor unit mold; (b) placing a lower skin material into the floor unit mold such that the skin material covers the rim 651 of the king pin 650; (c) placing a core material into the mold over the lower skin; (d) placing an upper skin material over the core material; (e) and infusing the materials contained within the mold with an infusing material, such as a resin, to form the composite floor unit having a king pin integrally formed therein. The method may further include, after step (e), curing the infused material to form the final composite floor unit with the king pin integrally formed therein. Still further, depending upon the type of composite construction used to prepare the floor unit, the method may further comprise inserting one or more fibers that extend through the skins and the core. Such fibers may particularly be inserted before resin infusion or after resin infusion (preferably prior to complete curing of the composite floor unit structure) to provide improved durability (e.g., to prevent de-lamination of the skins from the core).

In alternate embodiments, after step (b), the method may further comprise placing a reinforcing plug 194 into the mold around the king pin. The reinforcing plug can be pre-formed as a solid piece that includes a cut-out portion to receive the upper portion of the king pin. For example, the reinforcing plug can be machined to the dimensions of the upper portion of the king pin to fit snugly around the king pin. In such embodiments, the reinforcing plug can have a variety of dimensions. For example, the reinforcing plug can be shaped to have a thickness that substantially corresponds to the thickness of the composite floor unit in which it is to be included. Preferably, the thickness is slightly less than the thickness of the floor unit so that the reinforcing plug is contained completely within the composite floor unit. The width and length of the reinforcing plug can vary depending upon the area of use. When used around the king pin, the width of the reinforcing plug can be less than the overall width of the floor unit component and greater than the width of the king pin. The length of the reinforcing plug and/or the width of the reinforcing plug can preferably be about 4 inches to about 10 feet, about 6 inches to about 8 feet, about 6 inches to about 6 feet, about 8 inches to about 4 feet, about 8 inches to about 2 feet, or about 8 inches to about 18 inches. In specific embodiments, the step of placing a reinforcing plug into the mold around the king pin is carried out between steps (b) and (c) or between steps (c) and (d). Of course, when carried out after step (c), the core material placed in the mold includes a cut-out portion to receive the reinforcing plug.

The rear frame 400 of the trailer can, in certain embodiments, define a doorway for entrance into the trailer 10. One such embodiment is illustrated in FIG. 21, which shows two doors 470 and 480 attached to the frame 400 with a hinge 475. While each door could be attached using a single hinge, in specific embodiments, a plurality of hinges is used for each door. For example, the embodiment of FIG. 21 uses four hinges 475 for each door. Thus, the trailer of the invention can be described as comprising one or more doors hingedly attached to the rear frame component. The doors can be formed of any material useful for forming trailer doors, including metal or wood. In specific embodiments, the one or more doors of the inventive trailer comprise composite panels.

In addition to the hinges, additional hardware can also be associated with the doors and/or the rear frame. For example, the trailer can further comprise locking means. In the embodiment illustrated in FIG. 21, the locking means comprise a vertically positioned bar 490 that includes a handle 491 and that rotates in a horizontal plane and slides in a vertical plane. A latch 492 can be included to secure the handle 491 flush against the door 480. The bar 490 is slidably attached to the door 480 using one or more guide clamps 493. A locking receptacle 495 is attached to the rear frame 400, and when the bar 490 engages the locking receptacle 495, the door 480 cannot be opened. Of course, a similar construction can be present in relation to the remaining door 470, as illustrated in FIG. 21. Such hardware components can be attached to the door and rear frame by different means, depending upon the type of material used to form the door and the rear frame. When a composite material is used to form the door and/or the rear frame, the hardware components, which are typically metallic, according to preferred embodiments, can be bonded to the composite component and/or attached using mechanical fasteners, such as bolts or the like. In one embodiment, a metallic piece of hardware is attached to a composite component by both bonding and using mechanical fasteners.

Of course, a trailer that is intended for transportation by being pulled behind a vehicle can also include one or more wheel assemblies. The trailer 10 illustrated in FIG. 21 includes four wheels and tires as part of a conventional suspension assembly 700 (i.e., formed of metallic materials). This suspension assembly 700 is further illustrated in FIG. 22, which provides a front perspective view of the trailer 10 from FIG. 21. The trailer can also include further conventional components, such as front lift assembly 750, and a bumper 800. In specific embodiments, the suspension assembly can be formed of composite materials. In further embodiments, the suspension assembly can comprise from two to 20 wheels (including single axle conformations, one or more super singles with up to five axles, and tandem configurations).

Again, the modular nature of the trailer according to the present invention is illustrated by the ability to easily use multiple different kinds of suspension assemblies. As seen in FIG. 22 and FIG. 23, the trailer 10 according to certain embodiments, includes at least one rail 850 that is attached to the bottom (exterior) surface of the floor unit 110 of the trailer 10 and that extends along a defined length of the trailer 10. Preferably, the rail 850 is attached near the rear portion of the trailer, which is where a suspension system would typically be placed. Of course, if multiple suspension systems were desired, the rail could extend substantially the entire length of the trailer, or a plurality of rails could be present at different positions along the length of the trailer. In a preferred embodiment, two rails are included and are positioned substantially parallel to one another. In particular embodiments, a rail used for attaching a suspension system can have a length of about 1 foot to about 25 feet, about 2 feet to about 22 feet, about 4 feet to about 20 feet, or about 6 feet to about 18 feet. The rail is preferably formed to have a series of apertures 855 whereby the suspension assembly can be attached to the rail. In the embodiment of FIG. 23, the trailer 10 includes two rails 850 and 851, and the suspension assembly 700 is positioned between the rails and is attached to the rails. Specifically, the suspension assembly can be attached to the rails using mechanical fasteners, such as bolts or the like, connected to the suspension assembly through the apertures provided in the rails.

A side view of a trailer 10 according to an embodiment of the invention is shown in FIG. 24. A cross-section of this embodiment of the trailer through line A-A is shown in FIG. 25. This cross-section particularly passes through a section illustrating the connection of the rails 850 and 851 to the floor unit 110 of the trailer 10 and to the suspension assembly 700. This attachment is even further illustrated in the detail view provided in FIG. 26.

As seen in FIG. 26, the trailer floor unit 110 comprises a groove 870 (two such grooves are visible in FIG. 26) that receives an end portion of a connection plate 860. In this embodiment, the connection plate 860 is substantially U-shaped having a central body and two end portions, the central body being adjacent the bottom (external) surface of the floor unit 110, and the two end portions being positioned in the grooves 870. This is a particularly beneficial arrangement because it allows for a variety of attachment means. For example, the connection plate 860 can be bonded to the trailer floor unit 110. Alternately, the connection plate 860 can be fastened to the trailer floor unit 110 using mechanical fasteners, such as bolts or the like. In the embodiment of FIG. 26, the connection plate is both bonded and mechanically fasted with two bolts 880. The grooves 870 allow for the bolts 880 to extend through the floor unit 110 and the connection plate 860 without substantially protruding below the level of the bottom (external) surface of the trailer floor unit 110. Thus, the trailer floor unit can be described as comprising one or more grooves for recessedly accepting one or more components to facilitate attachment of a suspension assembly to the trailer. The connection plate can be formed of a variety of materials, including metals or metal alloys and composite materials. In one embodiment, the connection plate comprises steel. In other embodiments, the connection plate may be face mounted to the trailer floor unit (i.e., not recessed in a groove).

As seen in FIG. 23, the floor unit 110 of the trailer 10 can comprise a plurality of grooves 870 to facilitate attachment of the suspension assembly 700 to the trailer 10. In one embodiment, the trailer floor unit comprises multiple rows of two aligned grooves extending along a partial length of the trailer floor unit, preferably near the rear of the trailer. In particular, the trailer floor unit can comprise two series of the multiple rows of two aligned grooves, the two series being aligned substantially in a parallel fashion. In certain embodiments, each row of the two grooves can comprise a connection plate that is attached to the exterior of the floor unit such that at least a portion of the connection plate (e.g., the two end portions of the U-shaped connection plate) is recessed in the grooves. The body portion of the connection plate is exposed on the bottom (exterior) surface of the floor unit and can be connected directly to the suspension assembly or can be connected to further components.

In specific embodiments, such as illustrated in FIG. 26, the rail 850 is attached to the connection plate 860. In this manner, the connection plate 860 facilitates connection of the suspension assembly 700 to the trailer floor unit 110. For example, the suspension assembly 700 can include a slider box 720 that can be positioned between the two rails 850 and 851 and fastened thereto. The length of the rails and the plurality of apertures formed therein allow for the slider box to positioned anywhere along the length of the rails. The rails in turn are attached to the connector plate, which is attached to the trailer floor unit. The number of connector plates for each rail can vary depending upon the length of the rails. In some embodiments, the trailer comprises one connector plate per two linear feet of rail, one connector plate per one linear foot of rail, two connector plates per linear foot of rail, or even more connector plates. The rails can be attached to the connector plate by any effective means, such as welding. Of course, when one or both of the rails and connector plate are formed of a non-metal material, attachment could be other means, such as bonding or the use of mechanical fasteners, such as bolts or the like.

In other embodiments, attachment of components, such as a suspension assembly, can be via one or more types of hardpoint connectors that are integrally formed within the trailer floor unit. For example, FIG. 27 illustrates a partial side view of a trailer 10 according to the invention comprising a floor unit 110 that includes three suspension plates 891, 892, and 893 spaced along one side of the trailer 10 for attachment of a suspension assembly. While not seen in this view, three further suspension plates are provided along the opposing side of the trailer for furthering attachment of the suspension assembly. The suspension plates can include one or more apertures formed therein to facilitate attachment of a suspension assembly, such as by bolting. Whereas the earlier described embodiment provides for a sliding suspension assembly attachment, this embodiment provides for a fixed suspension assembly attachment. Of course, in further embodiments, more or less suspension plates could be formed within the floor unit.

The integral forming of the suspension plates within the composite floor unit can be as generally described previously in relation to hardpoint connectors generally. One embodiment is illustrated in FIG. 28, which shows a detail view (a cross-section along the line B-B of FIG. 27) of a composite floor unit 110 with a suspension plate 891 integrally formed therein. The suspension plate 891 is surrounded by a reinforcing plug 194 (e.g., a fiber-reinforced resin material) and is thus integrally formed within the floor unit 110. As shown in FIG. 28, the suspension plate 891 is substantially L-shaped, the horizontal arm providing improved strength and stability of the suspension plate within the reinforcing plug, and thus within the composite floor unit. In alternate embodiments, the suspension plate could include a further horizontal arm (as illustrated by the dashed lines) and be substantially T-shaped. Of course, any number of shapes and conformations could be used according to the invention to stabilize and strengthen the integrally formed hardpoint connector within the composite floor unit.

A method of preparing a composite floor unit comprising an integrally formed hardpoint connector, such as a suspension plate, can include the following steps: (a) placing a lower skin material 191 into a floor unit mold that comprises a receptacle or aperture for receiving an exposed portion of a suspension plate 891; (b) placing into the mold, and on top of the lower skin material, a reinforcing plug 194 having a suspension plate 891 included therewith such that a portion of the suspension plate is surrounded by the resin plug and a portion of the suspension plate protrudes from the reinforcing plug and is exposed; (c) placing a core material 193 into the mold over the lower skin 191; (d) placing an upper skin material 192 over the core material 193; (e) and infusing the materials contained within the mold with an infusing material, such as a resin, to form the composite floor unit having a suspension plate integrally formed therein. The method may further include, after step (e), curing the infused material to form the final composite floor unit with the suspension plate integrally formed therein. In alternate embodiments, steps (b) and (c) can be reversed. The reinforcing plug with the suspension plate formed therein can be pre-formed and simply "dropped" into the mold at the time of forming the floor unit. For example, the plug/plate structure can be formed by providing a mold, placing the suspension plate into the mold, and filling the mold with a the material to be used to form the reinforcing plug (e.g., a fiber reinforced resin) such that a portion of the suspension plate remains exposed and is not surrounded by the reinforcing plug. After the resin has sufficiently hardened, the reinforcing plug with the suspension plate formed therein can be used in the method described above to prepare a composite floor unit. The reinforcing plug with the suspension plate formed therein can be further processed prior to introduction into the above-described method, such as by cutting the plug to a desired shape.

As noted above, the reinforcing plug is provided having a suspension plate (or other hardpoint connector) included therewith. This inclusion can encompass multiple embodiments. For example, the hardpoint connector could be formed within the resin plug (e.g., put into the plug before curing of the resin such the hardpoint connector is completely formed within the resin plug). In other embodiments, the resin plug could be pre-formed, and an aperture can be formed therein for receiving the hardpoint connector (e.g., a suspension plate or any like material useful for attaching external components to the composite structural component). Preferably, the aperture in the resin plug is machined to have tolerances closely relating to the dimensions of the hardpoint connector. The hardpoint connector can be inserted into the aperture to form a plug connector unit (i.e., the resin plug with the hardpoint connector included therein). In some embodiments, the hardpoint connector can be attached to the resin plug merely by the frictional forces within the aperture caused by the "tight" fit of the hardpoint connector therein. In alternate embodiments, the hardpoint connector could be formed within the aperture. For example, a resin, glue, or like material could be placed in the aperture prior to insertion of the hardpoint connector. Likewise, a bonding agent could be inserted into the aperture after insertion of the hardpoint connector or after inclusion of the plug connector unit in the composite component mold. When bonding is used, the dimensions of the aperture can vary. Thus, only a small amount of bonding agent could be used to secure the hardpoint connector within the aperture. Alternately, a large aperture could be formed, and greater amount of bonding agent (e.g., fiber reinforced resin) could be used around the hardpoint connector to bond it within the resin plug and/or the composite component.

Although the suspension plate is described above in relation to attachment of a suspension component to the trailer, other hardpoint connectors could also be integrally formed within the trailer floor unit to facilitate attachment of other trailer components. For example, equivalent connector plates could be used to attach the lift assembly 750 or the bumper 800.

In at least one embodiment of the invention, the structural components of a trailer according to the invention are formed completely of composite materials. Specifically, the integrated floor unit and front wall assembly, the roof, the sidewalls, the rear frame component, and the rear door or doors may all be comprised completely of composite materials. This can provide considerable advantages with regard to the empty weight of the trailer and the net cargo weight capacity of the trailer in relation to conventional trailers (e.g., formed of steel frame members, aluminum panels, and wood floors). Thus, a trailer according to the invention having an integrated floor unit and front wall assembly, roof, sidewalls, rear frame component, and rear door or doors all comprised completely of composite materials provides a light weight, durable trailer with low maintenance requirements.

As previously discussed, conventional 53 foot trailers formed using steel, aluminum, and wood structural components typically have an average empty weight of about 15,000 pounds. The trailers according to the present invention formed using composite materials are beneficially much lower in weight. In certain embodiments, a trailer according to the present invention has an average overall empty weight of less than about 14,000 pounds, less than about 13,500 pounds, less than about 13,000 pounds, less than about 12,500 pounds, less than about 12,000 pounds, less than about 11,500 pounds, less than about 11,000 pounds, less than about 10,500 pounds, or less than about 10,000 pounds.

The reduced average overall empty weight of a trailer according to the invention can also be extended to trailers of other lengths. For example, other trailers have a standard length of 48 feet. A composite 48 foot trailer according to the present invention may have an average overall empty weight of less than about 13,000 pounds, less than about 13,000 pounds, less than about 12,500 pounds, less than about 12,000 pounds, less than about 11,500 pounds, less than about 11,000 pounds, less than about 10,500 pounds, less than about 10,000 pounds, less than about 9,500 pounds, or less than about 9,000 pounds.

The composite trailer provided by the present invention is also an improvement over conventional trailers in light of the durability of the inventive trailer. Conventional trailers formed of steel, aluminum, and wood structural components typically have a useful first lifetime of about 7-9 years. The term "useful lifetime" in relation to a trailer refers to the time the trailer can be used for the transportation of cargo. Many trailers will be transitioned several times during their lifetime. A conventional trailer may begin is life in the transportation of heavy bulk cargo. This initial lifetime can be referred to as the "primary lifetime" of the trailer. This primary lifetime can mean the time during which the trailer is still deemed capable of performing its primary intended purpose. Ability to perform the primary intended purpose can be determined by applicable government standards or based on typical industry standards.

After about 3-5 years of service, the durability of the conventional trailer tends to decrease, and the trailer may be transitioned to use in the transportation of lighter weight cargo. This period can be referred to as the "secondary lifetime" of the trailer. Finally, the conventional trailer may be transitioned out of service in transportation and may be moved to use as a stationary storage unit. A trailer according to the present invention can be used for its primary purpose (i.e., transportation of cargo, heavy or light) for its full lifetime. In particular, a composite trailer according to the invention can have a primary useful lifetime of at least 10 years, at least 11 years, or at least 12 years, or even more. In particular embodiments, the trailer of the invention can have a primary useful lifetime of two times the primary useful lifetime of a conventional trailer. In other embodiments, the trailer of the invention can have a primary useful lifetime of three times the primary useful lifetime of a conventional trailer. This is possible since the composite materials used to form the inventive trailer are not subject to the same damage as the materials used in conventional trailers. For example, the wood floors of typical trailers tend to rot, particularly when used in the transportation of wet cargo. Moreover, to reduce weight, many conventional trailers are formed using very thin gauge aluminum. While this reduces the trailer weight (although not to the extent possible according to the present invention), it also reduces the durability of the conventional trailer and makes it more susceptible to damage. Still further, the metal components of conventional trailers are subject to corrosion, and this is not applicable with the composite materials used according to the present invention.

The use of composite materials to form the structural components of a trailer according to the invention is also particularly advantageous to reduce wind resistance of the moving trailer. Accordingly, in specific embodiments, the inventive trailer may also comprise aspects that improved the aerodynamic nature of the trailer. For example, the upwardly oriented side portions of the floor unit, the downwardly oriented side portions of the roof, and the rearwardly oriented side portions may each be substantially rounded on the exterior of the trailer (e.g., have a curved profile) to increase air flow around the trailer. Such curved profiles are not easily achieved using conventional materials, such as steel frames and aluminum sheets where corners formed by the joining of materials are substantially right angles. The composite materials of the present invention, however, can be easily formed to have a curved nature that is specifically designed to maximize wind flow around the corners. This ability even extends to the rear frame component, which could also be formed to have a shape that increases wind flow around the rear of the trailer and reduces drag on the trailer.

In other embodiments, the front wall of the trailer may be particularly adapted to increase aerodynamic aspects of the trailer. For example, the front wall, rather than having a substantially flat face, could be formed to be substantially conical. Again, such a shape is not easily formed with conventional materials. Composite structural components, however, can be easily formed to have desired shapes that improve aerodynamic aspects of the trailer.

In addition to the above, the composite components used to form a trailer according to the present invention also provide for a thermal efficiency not otherwise seen with conventional trailers. In particular, the composite components used according to the invention can be particularly formed to provide a desired thermal efficiency, such as through the use of polyurethane foam materials.

For example, Table 1 provides a UA analysis summary for a composite trailer prepared according to the present invention. The UA analysis indicates that the inventive trailer has an average U value of 0.21 and an average R value of 4.7. By comparison, Table 2 provides a UA analysis summary for a conventional trailer, and the UA analysis indicates that the conventional trailer has an average U value of 0.86 and an average R value of only 1.2. In both examples, the R value includes 1.0 R from air film resistance. Thus, it is clear that a trailer prepared according to the present invention provides an inherent thermal efficiency that far exceeds conventional trailers.

TABLE 1

(Inventive Trailer)

| Trailer Component | UA |
|---|---|
| Sidewalls<br>(1 in. fiber-reinforced composite panel with urethane foam core) | 215.4 |
| Roof<br>(1 in. fiber-reinforced composite panel with urethane foam core) | 98.3 |
| Front wall<br>(1 in. fiber-reinforced composite panel with balsa core) | 16.7 |
| Floor Unit<br>(3 in. fiber-reinforced composite panel with balsa core) | 78.2 |
| Doors<br>(1 in. fiber-reinforced composite panel with urethane foam core) | 17.5 |
| Total | 426.1 |
| Average U Value | 0.21 |
| Average R Value | 4.7 |

TABLE 2

(Conventional Trailer)

| Trailer Component | UA |
|---|---|
| Sidewalls | 959.8 |
| Roof | 440.4 |
| Front wall | 75.5 |
| Floor Unit | 168.0 |
| Doors | 76.1 |
| Total | 1719.8 |
| Average U Value | 0.86 |
| Average R Value | 1.2 |

The above comparison was carried out using computer finite element analysis (FEA). The conventional trailer was formed from 1/8 in. thick aluminum sheets and extruded side posts, floor beams, and roof bows (2-4 in. thick).

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the invention. Although specific terms are employed herein, they are used in a generic and descriptive sense only and not for purposes of limitation.

That which is claimed:

1. A modular composite trailer comprising:
   A) two opposing composite sidewall panels, each having a top edge, a bottom edge, a front edge, and a rear edge;
   B) a composite roof panel having two side portions, a front edge, and a rear edge, the roof panel side portions being adapted to receive the top edges of the sidewall panels;
   C) an integrated composite floor unit and front wall assembly comprising:
      i) a floor unit having a front portion, a rear edge, and two side portions, the floor unit side portions being adapted to receive the bottom edges of the sidewall panels; and
      ii) a front wall integrally formed with and rising up from the front portion of the floor unit, the front wall having a top portion adapted to receive the front edge of the roof panel and having two side portions adapted to receive the front edges of the sidewall panels; and
   D) a composite rear frame having a bottom frame component adapted to receive the rear edge of the floor unit, two side frame components adapted to receive the rear edges of the sidewall panels such that each, single sidewall panel extends entirely between the front wall and the rear frame, and a top frame component adapted to receive the rear edge of the roof panel;
   the components being combined to form the trailer having an interior and an exterior and
   wherein the trailer has a length of about 53 feet and has an average overall empty weight of less than about 12,000 pounds.

2. The modular composite trailer of claim 1, wherein one or more of the sidewall panels, the roof panel, the integrated floor unit and front wall assembly, and the rear frame comprise a composite material selected from the group consisting of
   a fiber reinforced polymer material;
   a fiber reinforced polymer composite;
   a solid laminate; and
   combinations thereof.

3. The modular composite trailer of claim 2, wherein the fiber reinforced polymer composite is selected from the group consisting of:
   a pultruded sandwich panel comprising an upper skin, a lower skin, and a core disposed substantially between the upper and lower skins;
   a vacuum-infused sandwich panel comprising an upper skin and a lower skin and a core disposed substantially between the upper and lower skins;
   a pultruded panel comprising an upper skin and a lower skin and a web material disposed substantially between the upper and lower skins; and
   combinations thereof.

4. The modular composite trailer of claim 1, wherein the roof panel side portions have a downward orientation.

5. The modular composite trailer of claim 4, wherein the downwardly oriented side portions of the roof panel align with the top edges of the sidewalls to form a joint.

6. The modular composite trailer of claim 5, wherein the joint is a lap joint or a tongue and groove joint.

7. The modular composite trailer of claim 4, wherein the downwardly oriented side portions of the roof panel are adapted to receive the top edges of the sidewall panels by comprising a first terminal edge that is jointed to the top edge of the sidewall and an overhang component that extends beyond the first terminal edge and covers the joint between the first terminal edge of the downwardly oriented side portion and the top edge of the sidewall on the exterior of the trailer.

8. The modular composite trailer of claim 4, further comprising a joint plate attached to the downwardly oriented side portions of the roof panel on the interior of the trailer.

9. The modular composite trailer of claim 8, wherein the joint plate is further attached to the sidewall near the top edge of the sidewall.

10. The modular composite trailer of claim 8, wherein the joint plate comprises a composite material.

11. The modular composite trailer of claim 1, wherein the floor unit side portions have an upward orientation.

12. The modular composite trailer of claim 11, wherein the upwardly oriented side portions of the floor unit align with the bottom edges of the sidewalls to foun a joint.

13. The modular composite trailer of claim 12, wherein the joint is a lap joint or a tongue and groove joint.

14. The modular composite trailer of claim 11, wherein the upwardly oriented side portions of the floor unit are adapted to receive the bottom edges of the sidewall panels by comprising a first terminal edge that is jointed to the bottom edge of the sidewall and an overhang component that extends beyond the first terminal edge and covers the joint between the first terminal edge of the upwardly oriented side portion and the bottom edge of the sidewall on the exterior of the trailer.

15. The modular composite trailer of claim 11, further comprising a joint plate attached to the upwardly oriented side portions of the floor unit on the interior of the trailer.

16. The modular composite trailer of claim 15, wherein the joint plate is further attached to the sidewall near the bottom edge of the sidewall.

17. The modular composite trailer of claim 15, wherein the joint plate comprises a composite material.

18. The modular composite trailer of claim 1, wherein the front wall side portions have a rearward orientation.

19. The modular composite trailer of claim 18, wherein the rearwardly oriented side portions of the front wall align with the front edges of the sidewalls to form a joint.

20. The modular composite trailer of claim 19, wherein the joint is a lap joint or a tongue and groove joint.

21. The modular composite trailer of claim 18, wherein the rearwardly oriented side portions of the front wall are adapted to receive the front edges of the sidewall panels by comprising a first terminal edge that is jointed to the front edge of the sidewall and an overhang component that extends beyond the first terminal edge and covers the joint between the first terminal edge of the rearwardly oriented side portion and the front edge of the sidewall on the exterior of the trailer.

22. The modular composite trailer of claim 18, further comprising a joint plate attached to the rearwardly oriented side portions of the front wall on the interior of the trailer.

23. The modular composite trailer of claim 22, wherein the joint plate is further attached to the sidewall near the front edge of the sidewall.

24. The modular composite trailer of claim 22, wherein the joint plate comprises a composite material.

25. The modular composite trailer of claim 1, wherein the top portion of the front wall comprises an indentation for receiving the front edge of the roof panel.

26. The modular composite trailer of claim 1, wherein the rear frame is a one-piece, molded structure.

27. The modular composite trailer of claim 1, wherein bottom component of the rear frame comprises a groove for receiving the rear edge of the floor unit.

28. The modular composite trailer of claim 1, wherein the side components of the rear frame comprise an indentation for receiving the rear edge of the sidewall.

29. The modular composite trailer of claim 1, wherein the top component of the rear frame comprises an indentation for receiving the rear edge of the roof panel.

30. The modular composite trailer of claim 1, wherein the rear frame component defines a doorway for entrance into the trailer.

31. The modular composite trailer of claim 1, further comprising one or more doors hingedly attached to the rear frame component.

32. The modular composite trailer of claim 31, wherein the one or more doors comprise composite panels.

33. The modular composite trailer of claim 1, wherein one or more of the sidewall panels, the roof panel, the integrated floor unit and front wall assembly, and the rear frame comprise a molded recess or channel.

34. The modular composite trailer of claim 1, further comprising a reinforcing plate attached to the floor unit near the rear edge thereof and extending across the bottom component of the rear frame.

35. The modular composite trailer of claim 1, further comprising a metal coupler plate attached to the exterior of the floor unit component of the integrated composite floor unit and front wall assembly near the front wall.

36. The modular composite trailer of claim 35, wherein the coupler plate is bonded, bolted, or both bonded and bolted.

37. The modular composite trailer of claim 1, further comprising a king pin assembly for securing the trailer to a vehicle.

38. The modular composite trailer of claim 1, further comprising one or more suspension elements attached to the exterior of the floor unit.

39. The modular composite trailer of claim 38, wherein the exterior of the floor unit comprises one or more grooves for recessedly accepting the one or more components for attachment of a suspension assembly to the trailer.

40. The modular composite trailer of claim 38, further comprising one or more suspension plates integrally formed within the floor unit and including an exposed portion for attachment of a suspension assembly to the trailer.

41. The modular composite trailer of claim 1, wherein the trailer has an average overall empty weight of less than about 11,000 pounds.

42. A modular trailer comprising the following components:
A) two opposing sidewalls;
B) a roof;
C) a front wall; and
D) a composite floor unit having one or more hardpoint connectors integrally formed therein.

43. The modular trailer of claim 42, wherein the hardpoint connector is a metal plate for attachment of a suspension assembly or a lift assembly.

44. The modular trailer of claim 42, wherein the two opposing sidewalls are formed of composite material.

45. The modular trailer of claim 42, wherein the roof is formed of composite material.

46. The modular trailer of claim 1, wherein the floor unit is both a flooring surface and a chassis.

47. A modular structural component comprising a composite structural component having one or more hardpoint connectors integrally formed therein.

48. The modular trailer of claim 42, wherein the hardpoint connector is at least partially embedded within the composite floor unit.

49. The structural component of claim 47, wherein the hardpoint connector is at least partially embedded within the composite structural component.

* * * * *

UNITED STATES PATENT AND TRADEMARK OFFICE
CERTIFICATE OF CORRECTION

PATENT NO.         : 8,186,747 B2
APPLICATION NO.    : 12/177639
DATED              : May 29, 2012
INVENTOR(S)        : Jeff Bloodworth et al.

It is certified that error appears in the above-identified patent and that said Letters Patent is hereby corrected as shown below:

In the Claims:

At column 35, Claim #12, line #5, "foun a joint." should read --form a joint.--

Signed and Sealed this
Twenty-eighth Day of August, 2012

David J. Kappos
*Director of the United States Patent and Trademark Office*